(12) United States Patent
Srivastava

(10) Patent No.: US 12,524,374 B2
(45) Date of Patent: Jan. 13, 2026

(54) QUANTUM MECHANICAL LOGIC FOR CLASSICAL COMPUTATION

(71) Applicant: Ankur Srivastava, Dubai (AE)

(72) Inventor: Ankur Srivastava, Dubai (AE)

( * ) Notice: Subject to any disclaimer, the term of this patent is extended or adjusted under 35 U.S.C. 154(b) by 576 days.

(21) Appl. No.: 18/147,453

(22) Filed: Dec. 28, 2022

(65) Prior Publication Data

US 2024/0111729 A1  Apr. 4, 2024

Related U.S. Application Data

(60) Provisional application No. 63/413,198, filed on Oct. 4, 2022.

(51) Int. Cl.
*G06F 16/174* (2019.01)
*G06F 17/18* (2006.01)
*G06N 10/20* (2022.01)

(52) U.S. Cl.
CPC .......... *G06F 16/1744* (2019.01); *G06F 17/18* (2013.01); *G06N 10/20* (2022.01)

(58) Field of Classification Search
CPC ..... G06F 16/1744; G06F 17/18; G06N 10/20; G06N 10/00; G06N 10/40
See application file for complete search history.

(56) References Cited

U.S. PATENT DOCUMENTS

| | | | | |
|---|---|---|---|---|
| 2002/0188424 A1* | 12/2002 | Grinstein | ............... | G16B 25/10 702/183 |
| 2008/0201277 A1* | 8/2008 | Ozdemir | ............... | G08B 31/00 706/11 |
| 2014/0317597 A1* | 10/2014 | Marks | ............... | G06F 8/30 717/109 |
| 2015/0199178 A1* | 7/2015 | Shi | ............... | G06F 7/588 708/254 |
| 2019/0304092 A1* | 10/2019 | Akselrod-Ballin | .... | G06N 3/084 |
| 2020/0065945 A1* | 2/2020 | Schafer | ............... | G06T 5/50 |
| 2020/0279185 A1* | 9/2020 | Wiebe | ............... | G06N 3/047 |
| 2021/0255856 A1* | 8/2021 | Cao | ............... | G06N 10/60 |
| 2021/0351790 A1 | 11/2021 | Guilford et al. | | |

(Continued)

OTHER PUBLICATIONS

Invitation to Pay Additional Fees and, Where Applicable, Protest Fee in International Application No. PCT/IB2023/057658, mailed on Nov. 3, 2023, 19 pages.

(Continued)

*Primary Examiner* — Ryan Barrett
(74) *Attorney, Agent, or Firm* — Fish & Richardson P.C.

(57) ABSTRACT

Methods, systems, and apparatus for logical reverse computing and circular compression and decompression. In one aspect, a method for compressing a classical binary data input includes obtaining a classical binary data input; performing classical operations on the classical binary data input to obtain metadata for the classical binary data input, the metadata comprising statistical operators, wherein the classical operations are based on the ensemble interpretation of quantum mechanics; applying swap gates to the metadata to compress the metadata, wherein the swap gates swap data as a one-way function and application of the swap gates is defined by values of the statistical operators; and providing the compressed metadata as a compressed classical binary data input.

77 Claims, 33 Drawing Sheets

SSP GENERATOR TO FINAL OUTPUT

(56) References Cited

U.S. PATENT DOCUMENTS

2022/0198315 A1* 6/2022 Wang ................. G06N 10/60
2023/0410439 A1* 12/2023 Baughman ............ G06T 19/006

OTHER PUBLICATIONS

Liang et al., "Lossless compression of medical images using Hilbert space-filling curves," Computerized Medical Imaging and Graphics, Jan. 8, 2008, 32(3):174-182.
Qin et al., "A Universal Placement Technique of Compressed Instructions for Efficient Parallel Decompression," IEEE Transactions on Computer-Aided Design of Integrated Circuits and Systems, Aug. 2009, 28(8):1224-1236.
International Search Report and Written Opinion in International Application No. PCT/IB2023/057658, mailed on Feb. 1, 2024, 30 pages.
International Preliminary Report on Patentability in International Application No. PCT/IB2023/057658, mailed on Apr. 17, 2025, 21 pages.

* cited by examiner

EXAMPLE #1

| IAE[1] (size = 2) | 00 10 01 01 01 01 00 00 01 00 01 00 01 00 01 10 00 10 11 |
|---|---|
| IAE[2] | 00  01  10  11<br>7    8    3    1 |
| $R_h$ Distribution | 8 / 19 = 42.10% |
| Compression | 8 bits/ 38 bits = 21.05% |

EXAMPLE #2

| IAE[1] (size = 4) | 0010 0101 0101 0000 0100 0100 0100 0110 0010 1101 0011 0001 0010 1110 0011 0011 0000 1010 0010 0101 1100 0100 1110 0101 1111 0010 1110 0101 1110 1011 1010 0111 1111 0011 1010 0000 1101 0000 1100 0100 1100 0110 0000 1010 0011 0100 0010 0000 0011 0000 0010 0000 0110 1111 0110 0010 0110 1010 0000 1010 0011 1100 0011 1100 0010 0000 0010 1111 0100 1100 0110 0101 0110 1110 0110 0111 0111 0100 0110 1000 0010 0000 0011 0101 0010 0000 0011 0000 0010 0000 0101 0010 0010 0000 0010 1111 0100 0110 0110 1001 |
|---|---|
| IAE[2] | 0000 0001 0010 0011 0100 0101 0110 0111 1000 1001 1010 1011 1100 1101 1110 1111<br>15     1     16    10     9      8      1      3      1      1      6      1      6      2      5      5 |
| $R_h$ Distribution | 16 / 100 = 16% |
| Compression | 16 bits / 400 bits = 4.00% |

EXAMPLE #3

| IAE[1] (size = 2) | 01 01 11 11 00 11 10 |
|---|---|
| IAE[2] | 00  01  10  11<br>1    2    1    3 |
| $R_h$ Distribution | 3 / 7 = 42.85% |
| Compression | 3 bits / 14 bits = 2.14% |

EXAMPLE #4

| IAE[1] (size = 4) | 0101 1111 0011 1001 0110 1011 1110 1011 1000 0110 0111 0000 1010 1101 1010 1100 0110 1001 1001 0100 1110 1100 0000 0000 0010 1110 0111 1000 1110 1101 0101 1101 0101 1011 0011 0000 0001 |
|---|---|
| IAE[2] | 0000 0001 0010 0011 0100 0101 0110 0111 1000 1001 1010 1011 1100 1101 1110 1111<br>4      1      1      2      1      3      3      2      2      3      2      3      2      3      4      1 |
| $R_h$ Distribution | 4 / 37 = 10.81% |
| Compression | 4 bits / 148 bits = 2.70% |

FIG. 22

ANALYSIS TABLE #1:: PER ROUND STATISTICS (CONSERVATIVE VALUES)

| | | | | | | | | | |
|---|---|---|---|---|---|---|---|---|---|
| A | Min Input | 16 | 96 | 512 | 2,560 | 12,288 | 57,344 | 262,144 | 1,179,648 | 5,242,880 |
| B | Data Factor | 1 | 2 | 4 | 8 | 16 | 32 | 64 | 128 | 256 |
| C | Binary Size | 2 | 3 | 4 | 5 | 6 | 7 | 8 | 9 | 10 |
| D | Data Patterns | 4 | 8 | 16 | 32 | 64 | 128 | 256 | 512 | 1024 |
| E | Total Packets (A/C) | 8 | 32 | 128 | 512 | 2,048 | 8,192 | 32,768 | 131,072 | 524,288 |
| F | Packets per DP (E/D) | 2 | 4 | 8 | 16 | 32 | 64 | 128 | 256 | 512 |
| G | $R_h$ Distrubtion | 2% | 3% | 4% | 5% | 6% | 7% | 8% | 9% | 10% |
| H | $R_h$ Packets (peaked) | 0.16 | 0.96 | 5.12 | 25.6 | 122.88 | 573.44 | 2,621.44 | 11,796.48 | 52,428.8 |
| I | Compression (in %) (H/A) | 1.00% | 1.00% | 1.00% | 1.00% | 1.00% | 1.00% | 1.00% | 1.00% | 1.00% |

A. <u>Minimum Input</u> is size of stream that is of conservative size. Only a multiple of 2 entries per data packets, where 1 data packet has one entry ($R_l$) and the other one has three ($R_h$)

B. <u>Data Factor</u> is a multiple of the input data size. The jump of data factor is applied as a multiple of 2 to justifies the size of the input stream when the binary size is appended.

C. <u>Binary Size</u> is the slicing value when reading the in input

D. <u>Data Patterns</u> are the number of possible IAE[2] Data Patterns (DP).

E. <u>Total Packets</u> is obtained when input size is divided in the binary size to obtain the number of packets in the input stream.

F. <u>Packets Per DP</u> is the standard value of total number of packets per DP G. <u>Rh Distribution</u> is the value of $R_h$ count with increased deviation.

H. <u>Rh Packets</u> (peaked) is the number of $R_h$ Packets as per the value of G I. <u>Compression</u> is the calculation of 1 bit removal from all $R_h$ packets that results in compression (%)

ANALYSIS TABLE #2:: PER ROUND STATISTICS (AVERAGE VALUES)

| | | | | | | | | | |
|---|---|---|---|---|---|---|---|---|---|
| A | Min Input | 16 | 96 | 512 | 2,560 | 12,288 | 57,344 | 262,144 | 1,179,648 | 5,242,880 |
| B | Data Factor | 1 | 2 | 4 | 8 | 16 | 32 | 64 | 128 | 256 |
| C | Binary Size | 2 | 3 | 4 | 5 | 6 | 7 | 8 | 9 | 10 |
| D | Data Patterns | 4 | 8 | 16 | 32 | 64 | 128 | 256 | 512 | 1024 |
| E | Total Packets (A/C) | 8 | 32 | 128 | 512 | 2,048 | 8,192 | 32,768 | 131,072 | 524,288 |
| F | Packets per DP (E/D) | 2 | 4 | 8 | 16 | 32 | 64 | 128 | 256 | 512 |
| G | Peak of $R_h$ | 10% | 10% | 10% | 15% | 15% | 15% | 20% | 20% | 20% |
| H | $R_h$ Packets (peaked) | 0.8 | 3.2 | 12.8 | 76.8 | 307.2 | 1,228.8 | 6,553.6 | 26,214.4 | 104,857.6 |
| I | Compression (in %) (H/A) | 5.00% | 3.33% | 2.50% | 3.00% | 2.50% | 2.14% | 2.50% | 2.22% | 2.00% |

FIG. 23

QUANTUM MECHANICAL LOGIC FOR CLASSICAL COMPUTATION

CROSS-REFERENCE TO RELATED APPLICATIONS

This application claims priority to U.S. Provisional Application No. 63/413,198, filed Oct. 4, 2022, the contents of which are incorporated herein by reference in their entirety.

BACKGROUND

The ensemble interpretation of quantum mechanics states that any Quantum Multi-Element (QME) system can be identified by a mathematical object known as a statistical observable properties derivation or simply statistical probabilities instead of exhaustively listing all qubit combinations. Statistical probabilities are generated by statistical operators that are dynamically defined variables for a quantum system. The generation and definition of statistical probabilities of a quantum state replaces the requirements of listing qubit states or gate corrections of a QME system. This enables QME systems to be defined solely by their statistical probabilities and not by the state of individual qubits. Such a representation results in massive savings in the area of storage and memory as only the meta data, e.g., statistical probabilities, of the QME are saved to storage. However, while the ensemble interpretation of quantum mechanics holds true in the quantum realm, it cannot be directly applied to classical computing.

SUMMARY

This disclosure describes technologies for logical reverse computing and circular compression and decompression.

In general, one innovative aspect of the subject matter described in this specification may be embodied in methods for compressing a classical binary data input, the methods including: obtaining a classical binary data input; performing classical operations on the classical binary data input to obtain metadata for the classical binary data input, the metadata comprising statistical operators, wherein the classical operations are based on the ensemble interpretation of quantum mechanics; applying swap gates to the metadata to compress the metadata, wherein the swap gates swap data as a one-way function and application of the swap gates is defined by values of the statistical operators; and providing the compressed metadata as a compressed classical binary data input.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus (e.g., one or more computers or computer processors), cause the apparatus to perform the actions.

In general, another innovative aspect of the subject matter described in this specification may be embodied in methods that include the actions of obtaining a classical binary data input; performing classical operations on the classical binary data input to obtain metadata for the classical binary data input, the metadata comprising statistical operators that generate outputs with characteristics of the classical binary data input, wherein the classical operations are based on the ensemble interpretation of quantum mechanics; and providing the metadata for use in subsequent computations Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus (e.g., one or more computers or computer processors), cause the apparatus to perform the actions.

In general, another innovative aspect of the subject matter described in this specification may be embodied in methods that include the actions of receiving metadata for the classical binary data input, the metadata comprising statistical operators, wherein the classical operations are based on the ensemble interpretation of quantum mechanics; applying swap gates to the metadata to compress the metadata, wherein the swap gates swap data as a one-way function and application of the swap gates is defined by values of the statistical operators; and providing the compressed metadata as a compressed classical binary data input.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus (e.g., one or more computers or computer processors), cause the apparatus to perform the actions.

The foregoing and other embodiments can each optionally include one or more of the following features, alone or in combination. In some implementations the compressed classical binary data input has a same entropy as the classical binary data input.

In some implementations the metadata comprises, for each of one or more predetermined sizes, the classical binary data input partitioned into multiple data packets with lengths equal to the predetermined size, wherein the one or more predetermined sizes correspond to respective virtual Hilbert spaces.

In some implementations the metadata comprises values representing data patterns occurring in the classical binary data input.

In some implementations the metadata comprises correlation values that represent virtual quantum entanglement measures of the classical binary data input.

In some implementations the metadata comprises values representing counts of occurrences of data patterns in the classical binary data input.

In some implementations the counts of occurrences of data patterns in the classical binary data input comprise counts representing unique data patterns in a proper or improper subset of the classical binary data input.

In some implementations the values of the statistical operators comprise statistical probabilities generated from the counts of occurrences of data patterns in the classical binary data input.

In some implementations applying swap gates to the metadata to compress the metadata comprises swapping occurrences of a data pattern with a highest count with a bit string that is shorter than the data pattern with the highest count, the bit string comprising a concatenation of i) a virtual quantum entanglement measure of the data pattern with the lowest count and ii) the remaining bits of the data pattern with the lowest count, excluding the last bit of the data pattern with the lowest count.

In some implementations the metadata comprises a classical quantum multi-element (CQME) system, wherein the CQME system comprises the classical binary data input partitioned into data packets, wherein each data packet comprises a correlation value that represents a virtual quantum entanglement measure and a data pattern defining a type of the data packet.

In some implementations the values of the statistical operators comprise probabilities defining statistical properties of the CQME.

In some implementations the metadata comprises an optimal arithmetic compound that characterizes the classical binary data input and stores the values of the statistical operators, wherein the optimal arithmetic compound is selected from multiple candidate arithmetic compounds, each of the multiple candidate arithmetic compounds corresponding to virtual quantum states in a respective virtual Hilbert space.

In some implementations the optimal arithmetic compound i) has a same length as the classical binary data input, ii) has a same entropy as the classical binary data input, and iii) comprises at least one singularity.

In some implementations the multiple candidate arithmetic compounds form a superposition plane of the virtual quantum states.

In some implementations the optimal arithmetic compound is selected from the multiple candidate arithmetic compounds through a virtual time measurement of the virtual quantum states.

In some implementations the method further comprises outputting the compressed classical binary data input; or iteratively processing the compressed classical binary data input until a target data compression ratio is achieved, the iterative processing comprising, for each iteration: performing the classical operations on a classical binary data input for the iteration to generate metadata for the iteration; applying swap gates to the metadata for the iteration to compress the metadata for the iteration; providing the compressed metadata for the iteration as input for a subsequent iteration.

In general, another innovative aspect of the subject matter described in this specification may be embodied in methods for decompressing a classical compressed binary data input, the method comprising: obtaining a compressed classical binary data input; generating candidate metadata for the compressed classical binary data input, the metadata comprising values of statistical operators for respective portions of the compressed binary data input, wherein the statistical operators are based on the ensemble interpretation of quantum mechanics; applying, based on the values of the statistical operators, kernel filters to the candidate metadata to identify valid metadata for the classical compressed binary data input; applying swap gates to the valid metadata to decompress the valid metadata, wherein the swap gates swap data as a one-way function and application of the swap gates is defined by values of the statistical operators for the valid metadata; and providing the decompressed valid metadata as the decompressed compressed classical binary data input.

The foregoing and other embodiments can each optionally include one or more of the following features, alone or in combination. In some implementations the decompressed compressed classical binary data input has a same entropy as the classical compressed binary data input.

In some implementations providing the decompressed valid metadata as the decompressed compressed classical binary data input comprises performing logical reverse computing.

In some implementations applying the kernel filters to the candidate metadata comprises identifying metadata that corresponds to portions of the compressed binary data input that i) do not include a unique data pattern, ii) satisfy a condition of virtual quantum entanglement, and iii) have a largest bit length.

In some implementations applying swap gates to the valid metadata to decompress the valid metadata comprises: identifying a second most unique data pattern in a portion of the compressed binary data input; identifying a most unique data pattern in the portion of the compressed binary data input; swapping occurrences of a data pattern representing a virtual quantum entanglement value that occur before the second most unique data pattern with a bit string that is longer than the virtual quantum entanglement value, wherein the bit string that is longer than the virtual quantum entanglement value corresponds to a data pattern with a highest number of repetitions; and swapping occurrences of a data pattern representing the data pattern with a highest number of repetitions that occur before the second most unique data pattern and the most unique data pattern with a bit string that is longer than the data pattern with a highest number of repetitions, wherein the bit string that is longer than the data pattern with a highest number of repetitions corresponds to a concatenation of the virtual quantum entanglement value and an opposite of a pattern structure value.

In some implementations the metadata comprises, for each of one or more predetermined sizes, the classical binary data input partitioned into multiple data packets with lengths equal to the predetermined size, wherein the one or more predetermined sizes correspond to respective virtual Hilbert spaces.

In some implementations the metadata comprises values representing data patterns occurring in the classical binary data input.

In some implementations the metadata comprises correlation values that represent virtual quantum entanglement measures of the classical binary data input.

In some implementations the metadata comprises values representing counts of occurrences of data patterns in the classical binary data input.

In some implementations the counts of occurrences of data patterns in the classical binary data input comprise counts representing unique data patterns in a proper or improper subset of the classical binary data input.

In some implementations the values of the statistical operators comprise statistical probabilities and identifiers generated from the counts of occurrences of data patterns in the classical binary data input.

In some implementations the metadata comprises a classical quantum multi-element (CQME) system, wherein the CQME system comprises the classical binary data input partitioned into data packets, wherein each data packet comprises a correlation value that represents a virtual quantum entanglement measure and a data pattern defining a type of the data packet.

In some implementations the values of the statistical operators comprise probabilities defining statistical properties of the CQME.

In some implementations the metadata comprises an optimal arithmetic compound that characterizes the classical binary data input and stores the values of the statistical operators, wherein the optimal arithmetic compound is selected from multiple candidate arithmetic compounds, each of the multiple candidate arithmetic compounds corresponding to virtual quantum states in a respective virtual Hilbert space.

In some implementations the optimal arithmetic compound i) has a same length as the classical binary data input, ii) has a same entropy as the classical binary data input, and iii) comprises at least one singularity.

In some implementations the multiple candidate arithmetic compounds form a superposition plane of the virtual quantum states.

In some implementations the optimal arithmetic compound is selected from the multiple candidate arithmetic compounds through a virtual time measurement of the virtual quantum states.

In some implementations the method further comprises outputting the decompressed classical compressed binary data input; or iteratively processing the compressed classical binary data input until a target data decompression ratio is achieved, the iterative processing comprising, for each iteration: generating candidate metadata for the classical compressed binary data input for the iteration; applying kernel filters to the candidate metadata for the iteration to identify valid metadata for the iteration; applying swap gates to the valid metadata to decompress the valid metadata for the iteration; and providing the decompressed valid metadata for the iteration as input for a subsequent iteration.

In general, another innovative aspect of the subject matter described in this specification may be embodied in a system that includes a first chipset, wherein the first chipset comprises a first data port to receive input data and comprises a second data port to provide a final arithmetic compound, and wherein the first chipset is configured to perform operations comprising converting the input data into the final arithmetic compound, the final arithmetic compound comprising a first intermediate arithmetic element (IAE) dataset, a second IAE dataset, and a third IAE dataset, wherein the final arithmetic compound is a virtual quantum representation of the input data, wherein the first IAE dataset comprises a first component value defining a virtual quantum entanglement of the input data and comprises a second component value defining a data pattern structure of the input data, wherein the second IAE dataset comprises statistical operators that define data pattern counts associated with the data pattern of the input data first IAE dataset, and wherein the third IAE dataset comprises an ancilla dataset defining statistical probabilities associated with the input data.

The foregoing and other embodiments can each optionally include one or more of the following features, alone or in combination. In some implementations the system further comprises a second chipset, wherein the second chipset is arranged to receive, as an input to the second chipset, the final arithmetic compound, and wherein the second chipset is configured to compress at least a portion of the final arithmetic compound into a compressed dataset.

In some implementations the system further comprises a third chipset, wherein the third chipset is arranged to receive, as an input to the third chipset, the compressed dataset, and wherein the third chipset is configured to decompress the compressed dataset into the input data.

In some implementations the first chipset and the second chipset are integrated on a single board.

In some implementations converting the input data into the final arithmetic compound comprises generating a plurality of candidate Hilbert space (HS) datasets from the input data.

In some implementations the first chipset is configured to instantiate a configuration table, wherein the first chipset further comprises: a first memory; a parallel address data bus; and a plurality of HS storage modules, wherein generating the plurality of candidate HS datasets comprises: obtaining, by the parallel address bus, the input data from the first memory; obtaining a plurality of size parameters from the configuration table; transmitting, in parallel, a plurality of copies of the input data, from the parallel address bus, to the plurality of HS storage modules, respectively, wherein each copy of the plurality of copies of the input data is transmitted in a different bit transmission size according to a respective size parameter from the plurality of size parameters.

In some implementations the system further comprises a second memory, wherein generating the plurality of candidate HS datasets comprises: generating a plurality of intermediate arithmetic compounds, the plurality of intermediate arithmetic compounds being associated with different sizes, wherein each intermediate arithmetic compound comprises a corresponding data pattern array across which the input data is distributed based on the size associated with the intermediate arithmetic compound, a corresponding statistical operator matrix, and a corresponding ancilla matrix comprising statistical probabilities for the corresponding data pattern array; and storing the plurality of intermediate arithmetic compounds as the plurality of candidate HS datasets in the second memory.

In some implementations, for each intermediate arithmetic compound, the input data is divided into one or more data patterns, wherein each data pattern of the one or more data patterns has the size associated with the intermediate arithmetic compound, and the one or more data patterns are stored across one or more elements of the corresponding data pattern array, respectively, wherein, for each intermediate arithmetic compound, the corresponding statistical operator matrix comprises, for each different data pattern in the corresponding data pattern array, a count of the data pattern and an index value corresponding to the data pattern.

In some implementations, for each data pattern of the one or more data patterns, a first bit of the data pattern is a virtual quantum entanglement and remaining one or more bits of the data pattern are a pattern structure.

In some implementations, for each intermediate arithmetic compound, the statistical probabilities of the corresponding ancilla matrix comprise a highest occurring data pattern in the corresponding data pattern array and a lowest occurring data pattern in the data pattern array.

In some implementations generating the plurality of intermediate arithmetic compounds comprises, for each copy of the input data of the plurality of copies of the input data that is transmitted from the parallel address bus to the plurality of HS storage modules: detecting a pre-circuit breaker event; detecting a final circuit breaker event; and finalizing completion of an intermediate arithmetic compound corresponding to the copy of input data upon detecting the final circuit breaker event.

In some implementations converting the input data into the final arithmetic compound comprises: combining the plurality of intermediate arithmetic compounds into a plurality of potential final arithmetic compounds; and filtering the plurality of potential final arithmetic compounds to select the final arithmetic compound.

In some implementations filtering the potential final arithmetic compounds to select the final arithmetic compound comprises applying fuzzy logic rules to the plurality of potential final arithmetic compounds.

In some implementations the system further comprises a second chipset, wherein the second chipset is arranged to receive, as an input to the second chipset, the final arithmetic compound, and wherein the second chipset is configured to compress at least a portion of the final arithmetic compound into a compressed dataset.

In some implementations the second chipset is configured to compress at least the portion of the final arithmetic compound into the compressed dataset based on the statistical probabilities associated with the first IAE dataset.

In some implementations the second chipset comprises a plurality of swap gates configured to compress the final arithmetic compound into the compressed dataset.

In some implementations the second chipset comprises a first error correction module configured to enable processing of data by the plurality of swap gates and disable processing of data by the plurality of swap gates.

In some implementations the first error correction module is configured to: identify a least frequently occurring data pattern in the final arithmetic compound; and disable processing of data when the least frequently occurring data pattern in the final arithmetic compound is identified.

In some implementations the second chipset comprises a second error correction module, wherein the second correction module is configured to: determine when data is on an output port of the second chip set; and allow the plurality of swap gates to read new data when it is determined that data is on the output port of the second chip set.

In some implementations the plurality of swap gates comprises a plurality of sub-modules, wherein the plurality of sub-modules comprises a first swap module configured to: identify when a least frequently occurring data pattern of the final arithmetic compound is present; and writes the least frequently occurring data pattern to the final arithmetic compound.

In some implementations the plurality of sub-modules comprises a second swap module configured to: identify when a highest frequently occurring data pattern of the final arithmetic compound is present; and perform a first swap operation on the final arithmetic compound to obtain at least one first swapped parameter, wherein performing the first swap operation comprises replacing a last bit of the least frequently occurring data pattern.

In some implementations the plurality of swap gates are configured to perform a second swap operation on the least frequently occurring data pattern in the final arithmetic compound to obtain at least one second swapped parameter, and wherein the plurality of sub-modules comprises a third swap module configured to: identify when the least frequently occurring data pattern of the final arithmetic compound is present; and store the at least one second swapped parameter in memory.

In some implementations the plurality of sub-modules comprises a fourth swap module configured to pass an else-case data pattern from the final arithmetic compound to the output port of the second chipset, wherein the else-case data pattern comprises a data pattern that has not been identified by the first sub-module, the second sub-module, and the third sub-module.

In some implementations the second chipset is configured to pass the compressed dataset back to the first chip set.

In some implementations the system further comprises a third chipset, wherein the third chipset is configured to decompress the compressed dataset to obtain a decompressed dataset.

In some implementations the third chipset comprises a plurality of reverse one way swap gates configured to decompress the compressed dataset.

In some implementations the third chipset is configured to decompress the compressed dataset by performing operations comprising: receiving the compressed dataset as an input data stream; generating candidate metadata for the compressed dataset; and applying a plurality of kernel filters to the candidate metadata to identify valid metadata.

In some implementations applying the plurality of kernel filters to the candidate metadata comprises identifying portions of the compressed dataset that do not include a unique data pattern, that satisfy a virtual quantum entanglement condition, and that have a specified bit length.

In some implementations the operations of the third chipset further comprise: applying a plurality of reverse one way swap gates to the valid metadata to obtain the decompressed dataset.

In some implementations applying the plurality of reverse one way swap gates comprises: identifying an occurrence of a second most unique data pattern occurring in the compressed dataset as a first data event; swapping each occurrence of a data pattern corresponding to a virtual quantum entanglement value in the compressed dataset before the first data event with a first predefined bit string; and swapping each occurrence of a data pattern associated with a highest number of occurrences in the compressed dataset before the first data event with a second predefined bit string.

In general, another innovative aspect of the subject matter described in this specification may be embodied in a chip set that is configured to perform operations comprising converting a classical dataset to a classical quantum multi-element (CQME) dataset and an ancilla matrix that contains statistical properties of the CQME dataset.

The foregoing and other embodiments can each optionally include one or more of the following features, alone or in combination. In some implementations the operations comprise compressing the CQME dataset.

In some implementations compressing the CQME dataset comprises applying at least one one-way swap gate to the CQME dataset.

In some implementations the operations comprise decompressing a compressed CQME dataset.

The subject matter described in this specification can be implemented in particular embodiments so as to realize one or more of the following advantages.

A system implementing the presently described techniques can achieve a target amount of lossless data compression. In addition, the compression is endless in the sense that a compressed data stream can be iteratively provided for re-compression as it does not use classical compression information theory. In classical compression, an algorithm undertakes one round of compression and a second round of compression results in an opposite effect, that is the second round of compression increases the size instead of data compression. This happens since classical compression information theory searches for repetitions or common patterns and then replaces them via a reference in an index header. As classical compression changes the entropy of the input file it limits the algorithm from performing lookup(s) for repetitions as repetitions and patterns cease to exist.

In addition, a system implementing the presently described techniques can store inputs and outputs in memory as a lookup table, where the number of inputs and outputs is theoretically unlimited and in practice only implemented by the capabilities of the chip hardware. In some implementations the lookup table can also be compressed, to increase optimal usage of storage space and theoretically to ensure that the module does not runs out of storage space. Hence, logical reverse computing is achieved (e.g., as a result of the presently described one way swap gates) because data is not lost and is retrievable from storage memory. Logical reverse computing is further confirmed as the presently described AAR, BFX, and rBFX chip generate a lower heat signature as compared to existing classical computing. This is due to the fact that a processor is not deployed to re-calculate an output from an input. Instead, the data can be simply looked up which generates considerably lower heat than AND, OR, NAND and other classical gates. Therefore, if a closed state Turing machine is prepared using the presently described AAR, BFX, and rBFX chips of all possible inputs and outputs, then the output can be reversed without computation as the output can be reversed into an input solely based on memory lookups.

In addition, a system implementing the presently described techniques is able to transmit compressed data over wireless, wired, optical, classical and other non-classical modes to achieve high speed data transmission. This data transmission can be further speed enhanced by implementing rainbow or lookup tables for frequently occurring data streams.

In addition, a system implementing the presently described techniques incorporates various mechanisms to improve processing efficiency, e.g., by discarding the processing of some parallel data streams based on corresponding criteria.

The details of one or more embodiments of the subject matter of this specification are set forth in the description below. Other features, aspects, and advantages of the subject matter will become apparent from the description and the claims.

BRIEF DESCRIPTION OF THE DRAWINGS

FIG. 22 shows compression ratios achieved using the techniques described in this disclosure for an example bit stream with varying values of the variable SIZE FIG. 23 shows statistics per round for multiple compression processes.

Like reference symbols in the various drawings indicate like elements.

DETAILED DESCRIPTION

Overview

Figure 1A:
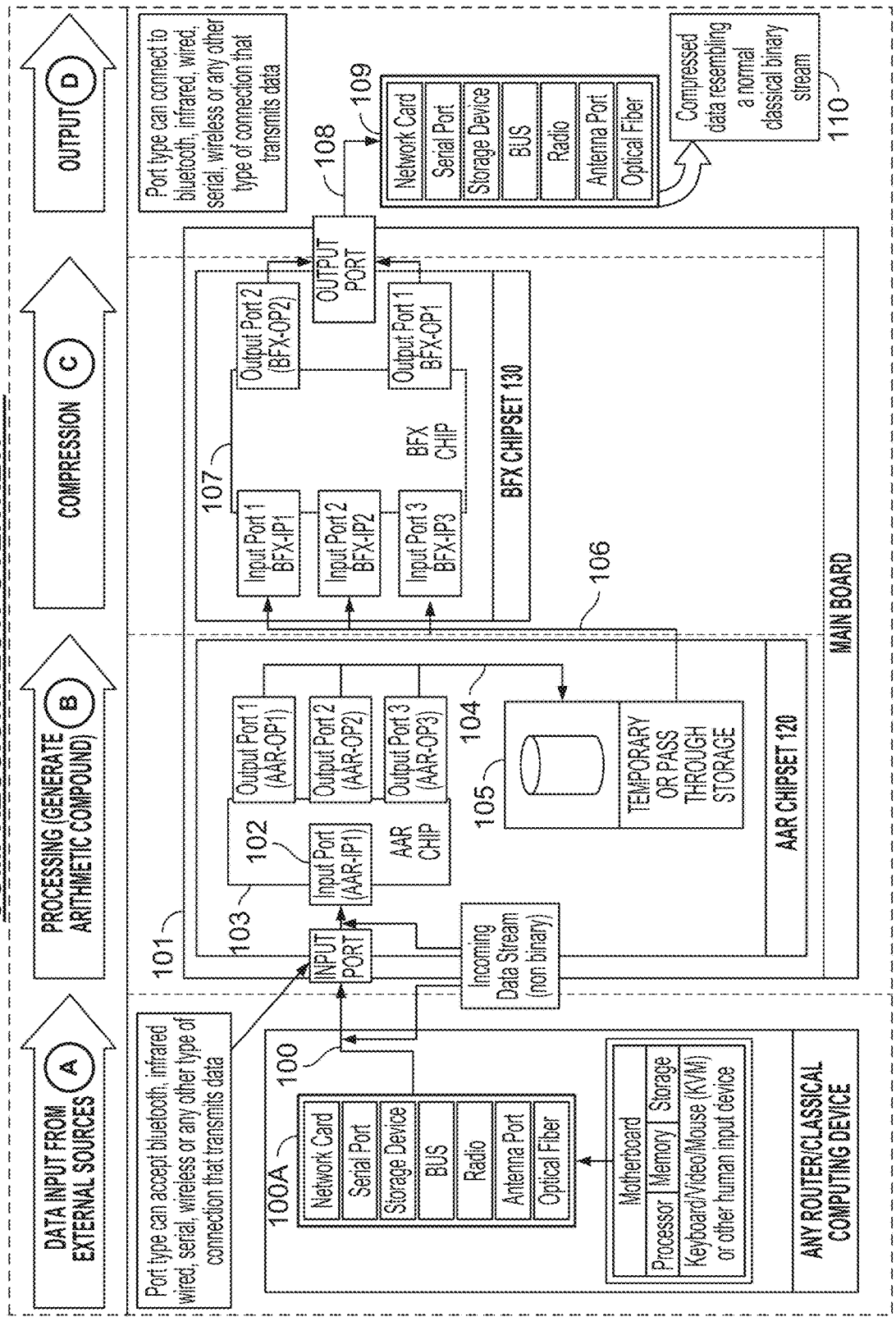
FIG. 1A is a block diagram of an example AAR chipset and BFX chipset performing data compression.

The present disclosure describes techniques for compressing and decompressing classical data using quantum mechanical principles. In particular, the techniques include embedded hardware and software routines that apply quantum mechanical logic taken from the ensemble interpretation of quantum mechanics and other quantum mechanical principles, e.g., time-measurement, entanglement information, and superposition, to classical data streams to achieve logical reverse computing.

The ensemble interpretation of quantum mechanics states that any Quantum Multi-Element (QME) system can be identified by a mathematical object known as a statistical observable properties derivation or simply statistical probabilities instead of exhaustively listing all qubit combinations. Statistical probabilities are generated by statistical operators that are dynamically defined variables for a quantum system. The generation and definition of statistical probabilities of a quantum state replaces the requirements of listing qubit states or gate corrections of a QME system. This enables QME systems to be defined solely by their statistical probabilities and not by the state of individual qubits. Such a representation results in massive savings in the area of storage and memory as only the meta data, e.g., statistical probabilities, of the QME are saved to storage. However, while the ensemble interpretation of quantum mechanics holds true in the quantum realm, it cannot be directly applied to classical computing.

The present disclosure includes a novel process that enables classical data to be represented as a Classical Quantum Multi-Element (CQME) system (where in this context the term "system" is used to refer to a representation of the classical data set as a collection of statistical operators and probabilities characterizing the input data). In the CQME representation, each data element's virtual quantum state is defined by statistical operators and statistical probabilities while preserving the output as a classical data stream output. This is achieved by transitioning classical data using quantum mechanical processes of converting data into virtual quantum states, generating statistical operators and probabilities, classical data waves, super positioning planes and applying fuzzy logic to provide an output of the classical input as a CQME in a classical format. The final output contains a CQME system and an associated ancilla matrix that contains the CQME system's statistical properties. This transition is achieved by breaking down a classical data stream into binary sets which are further divided into two components—first, a power or virtual quantum entanglement measure and second, Data Patterns (DP) that define the type of data set. This enables the classical data stream to be represented in a quantum mechanical format so that the ensemble interpretation can be applied to generate statistical operators to represent the data as a CQME system. The novel representation of classical data as a CQME system enables dynamic generation of statistical operators that represent data patterns of the original classical data stream. The distribution of the data patterns in the CQME are represented by probabilities that enable compression and decompression of the original classical data stream. A CQME system (with data and statistical probabilities) is represented as waves that permit operations using the quantum mechanical principles of time measurement, wave collapse, fuzzy logic for compression.

The representation of classical data as a CQME creates a novel interface between classical and quantum data realms, termed in this disclosure as a quantum classical interface that accepts classical data, converts the classical data into a quantum mechanical representation, performs classical and/or quantum operations on the quantum mechanical representation, and outputs the processed data as classical data.

The techniques described in this disclosure can be implemented using one or more of the following chips: an Advanced Arithmetic Rotations (AAR) chipset (also referred to as "chip," for short) that is configured to process a classical data input and generate a corresponding CQME dataset (also referred to as CQME, for short), a Binary Fourier X-gate (BFX) chip that is configured to compress an output received from the AAR chip, and a Reverse Binary Fourier X-gate (rBFX) chip that is configured to decompress data that has been compressed by the BFX chip.

The AAR chip accepts input data and converts the classical data into a CQME through identification of pre-defined statistical operators. The AAR chip generates three matrices referred to herein as Intermediate Arithmetic Elements (IAE)—IAE[1], IAE[2] and IAE[3]—which are collectively referred to herein as an arithmetic compound. The first matrix IAE[1] contains a data stream whose elements are represented by a data pattern that includes two components. The first component is a bit that represents a power or virtual quantum entanglement value of the data pattern. The second component includes the remaining bits which define the pattern of the stream. This representation converts the data stream into a CQME for future quantum mechanical applications. Each element in the CQME has a data pattern that is represented by an index value in the second matrix IAE[2]. The index value in IAE[2] corresponds to a dynamic memory referred to as a register value that holds the count of the repetitions of the data pattern in IAE[1]. The matrix IAE[2] represents the statistical distribution or statistical operators of the CQME. The third matrix IAE[3] is a two dimensional matrix generated by the AAR chip that is referred to as the ancilla matrix. The third matrix IAE[3] is populated by the AAR chip to hold the statistical probabilities of the CQME. Therefore, the AAR chip is configured to generate data or a CQME in IAE[1] and a series of statistical operators in IAE[2] that in-turn enables the AAR chip to generate statistical probabilities of the input data stream and populate IAE[3].

The output of the AAR chip can be provided for various applications apart from the BFX chip. Using the output of the AAR chip, each individual application can independently process the output, e.g., the statistical probabilities in IAE[3] or statistical operators in IAE[2], for its own novel applications. The AAR chip also performs quantum mechanical logic on the CQME to generate a representation of the CQME data as waves and super positioning planes to create an array of CQME streams that can represent the input data via statistical probabilities. To uncover a single, optimal and error free CQME in IAE[1] and statistical operators in IAE[2] system, the AAR chip applies logical operations that are based on principles of quantum mechanics, e.g., timed measurement and super positioning on classical data, and fuzzy logic to generate the final output that is provided to the BFX chip.

The BFX chip accepts a CQME, e.g., data from the AAR chip, and compresses it using multiple swap gates (as described below with reference to FIG. 13 and FIG. 14) that are defined by the statistical probabilities in IAE[3]. The outputs of the ancilla matrix are dynamic. The swap gates are one-way operational gates in the BFX chip and are different from traditional classical swap gates. They do not simply replace A< >B but are dynamically configured to swap data as a one-way function. These swap gates are dynamically defined by values of the statistical operators in IAE[2] (e.g., the probabilities in IAE[3]) and enable data compression. The compressed data can be re-routed back to the AAR chip to initiate further rounds of compression. The operator can send the data back as many times as needed to continue to compress data or direct them to external output.

The rBFX chip is configured to decompress data, e.g., data output from the BFX chip. The rBFX chip reads input data and is configured to re-generate the original output using logical engines that interpret CQME input back into classical data.

FIG. 1A is a block diagram of an example AAR chipset 120 and BFX chipset 130 performing an example data compression process. FIG. 1A shows one iteration of data compression, where input data 100 is processed to output compressed data 110. However, the example data compression process can be iterated to achieve a target amount of compression, where at each iteration a compressed data output from a previous iteration is provided as input for the current iteration.

At stage (A) of the example data compression process, input data 100 is provided from a router or classical computing device to the AAR chipset 120 via an input port in a main board 101. In this example, the AAR chip 103 and the BFX chip 107 are integrated on one board 101, which can be updated based on specific integration requirements. The input data can include data from any source 100A, e.g., data from a network card, serial port, storage device, BUS, radio, antenna port, or optical fibre. The input port can be a Bluetooth port, infrared wired port, serial port, wireless port, or any other type of connection that transmits data.

At stage (B) of the example data compression process, the input data 100 is processed by the AAR chipset 120 to generate a data object referred to herein as an arithmetic compound. FIG. 1A provides a high level overview of the operations performed by the AAR chipset 120. A detailed description of the operations performed by the AAR chipset 120 are described in detail below with reference to FIGS. 4-11C.

The input data 100 is transmitted from the input port to an AAR-IP1 input port 102 on the AAR chipset 120. In some implementations the input data 100 can be a non-binary data stream. In these implementations the AAR chipset 120 can convert the input data 100 to a binary format for further processing, e.g., using standard techniques.

To generate the arithmetic compound, the AAR chipset 120 is configured to process the input data in binary format and save the processed data in a format referred to herein as a Hilbert Space (HS). In this disclosure, the term "Hilbert Space" is understood to refer to a virtual Hilbert space that is analogous to the state space for pure states of a quantum mechanical system in a mathematically rigorous formulation of quantum mechanics. This analogy will become more apparent below, see, e.g., the description of FIG. 4 below. This particular format enables logical reverse computing, as described below with reference to FIG. 3B. The AAR chipset 120 is configured to generate a multi-dimension variable, Temp_VAR Hilbert space, with the following elements—(a) Input, (b) Output and (c) Hidden Variable or references of a previous ancilla matrix or IAE[3] (the ancilla matrix and IAE[3] will be described below in detail). The pointer to Temp_VAR Hilbert space is stored in the Hilbert space to be passed back to the AAR chipset 120 for future/further processing. This enables faster processing for similar inputs by means of advanced lookups as the Hilbert space contains advanced relations and inner products of previous inputs and outputs. In subsequent iterations of compression, the data, Temp_VAR Hilbert space, is further compressed to minimise its required space, e.g., in memory, storage, etc., and can contain additional inner products of several matrices and their complex inner products cross referenced to identify the input and output data. These complex relationship values are held in the Hilbert space defined as a vector value as per its bit size.

In the first iteration of data compression, the Hilbert space is a vector value as defined by the input bit size. In the second and subsequent iterations to re-compress data, the values take the form of scalars that occur when the AAR chipset 120 re-routes the output to the input port. The re-routed data forms scalar values since they are derived by combining or a product value of several vectors. The partitioning and scalar relationship is stored by the processor in a separate Hilbert space for enhanced/faster processing to achieve logical reverse computing. These scalar values of the inner products are mapped as interconnected three-dimensional arrays in classical storage or as a web of interconnected states in quantum storage. These values can also be stored as three-dimensional geometric values, which would result in smaller interim memory requirements. The scalar values within the Hilbert space are also defined as inner products of states, previous index values, CQMEs and ancilla matrices that form a Euclidean vector space.

After the AAR chipset 120 has processed the input data 100, the AAR chipset 120 is configured to transfer the processed data to a temporary storage 105 via three separate outputs 104 AAR-OP1, AAR-OP2 and AAR-OP3. The temporary storage 105 is configured to hold the values or pass them to the BFX chipset 130 as per the operator defined settings (see, e.g., the configuration table 403 of FIG. 4). The values can be preserved for storage events or transferred in real time to the next inline board/chip for time critical or real time processing.

During stage (C) of the example data compression process, the BFX chipset 130 is configured to receive data 106 from the temporary storage 105, compress the received data, and write the compressed data to an output port as a binary stream 108. The output port can be a Bluetooth port, infrared, wired port, serial port, wireless port, or any other type of connection that transmits data. FIG. 1A provides a high-level overview of the operations performed by the BFX chipset 130. A detailed description of the operations performed by the BFX chipset 130 are described in detail below with reference to FIGS. 12-14.

During stage (D) of the example data compression process, the binary stream 108 is passed to an external connected device 109 that is configured to accept a classical binary stream, e.g., a network card, serial port, storage device, BUS, radio, antenna port, or optical fibre, etc. The external connected device 109 can then provide the compressed data output 110 as output, e.g., to be stored or transmitted to another device, or as input for a subsequent iteration of compression.

The example data compression process ensures that all applications of quantum mechanical, ensemble interpretation and processing logic on data occurs in the AAR chip 103 and the BFX chip 107 while preserving the output binary stream 108 as a classical data stream. This process provides a quantum-classical interface that accepts binary input, converts and applies quantum mechanical logic to classical data, and outputs a CQME system in classical data format. Hence, the quantum-classical interface implementation generates statistical probabilities of any classical system to be represented as a virtual quantum state description in a classical format.

As discussed above, data compressed by the AAR chipset 120 and BFX chipset 130, e.g., data 110, can be decompressed by an rBFX chip. Although not shown in FIG. 1A, the rBFX chip is configured to reuse several components and logical routines of the AAR chip 103 and the BFX chip 107.

These components retain the ensemble interpretation and quantum classical interface properties from the AAR chip 103 or the BFX chip 107 to process input data.

Figure 1B:
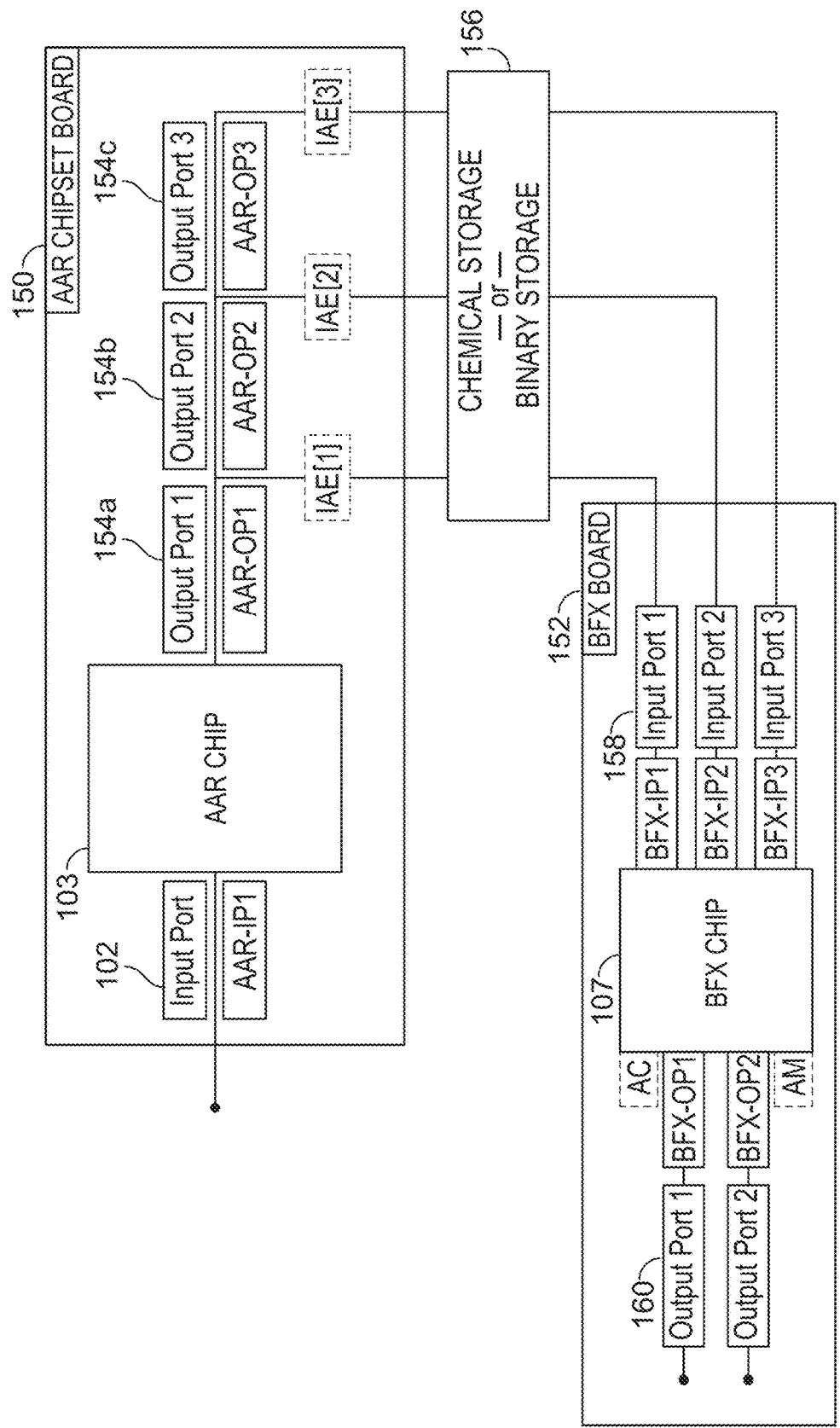
FIG. 1B is a block diagram that shows connections within a main board that includes an AAR chipset and BFX chipset.

FIG. 1B shows a block diagram of connections within the main board 101 of FIG. 1A. The AAR chipset board 150 (see also FIG. 4 described below) includes one input port AAR-IP1 102 and three Output Ports AAR-OP1, AAR-OP2 and AAR-OP3 154*a-c*. The input port AAR-IP1 102 receives binary input data for processing by the AAR chip 103. The output ports AAR-OP1, AAR-OP2 and AAR-OP3 154*a-c* provide data processed by the AAR chip 103 to binary or chemical storage 156. For example, as described above, the output of the AAR chip includes classical values IAE[1], IAE[2], and IAE[3] retrieved from the temporary storage 105 of FIG. 1. These classical values (bits) can be directly stored in binary storage.

The BFX chipset board 152 (see also FIG. 13 described below) includes three input ports BFX-IP1, BFX-1P2, and BFX-IP3, e.g., input ports 158, and two output ports BFX-OP1 and BFX-OP2, e.g., output port 160. The input ports BFX-IP1, BFX-1P2, and BFX-IP3 receive data from the binary or chemical storage 156, e.g., values IAE[1], IAE[2], and IAE[3], for processing by the BFX chip 107. The output ports BFX-OP1 and BFX-OP2 provide data processed by the BFX chip 107, e.g., a compressed arithmetic compound AC and an ancilla matrix AM, as a compressed data output.

Figure 2:
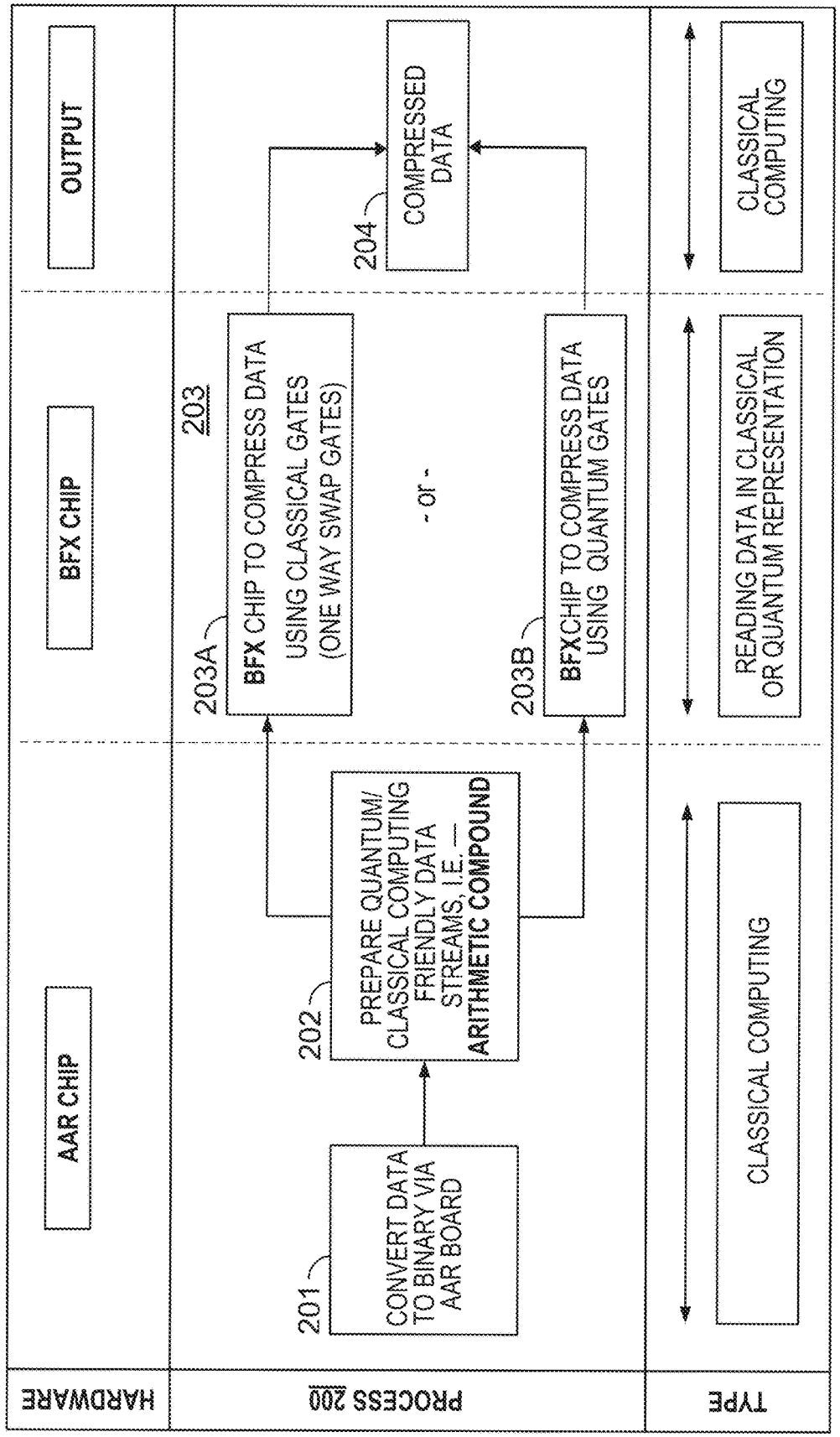
FIG. 2 is a flow diagram of a high level example process for data compression.

FIG. 2 is a flow diagram of a high-level example process 200 for data compression. Example process 200 can be applied to achieve high speed data transfer, storage and/or processing. For convenience, example process 200 will be described as being performed by system that includes an AAR chipset and BFX chipset. For example, the AAR chipset and BFX chipset described in this disclosure, appropriately programmed in accordance with this disclosure, can perform example process 200.

The AAR chip accepts classical data as input and converts the classical data input to binary data (step 201). The AAR chip then processes the binary data to generate a classical data output, e.g., a classical arithmetic compound, or a quantum data output, e.g., a quantum arithmetic compound that can be stored in a chemical, quantum or classical storage (step 202). The operations performed by the AAR chip are classical computing operations and are described in more detail below with reference to FIGS. 4-11C, The BFX chip accepts outputs from the AAR chip and processes the outputs (step 203) to generate classical compressed data (step 204). That the BFX chip provides classical data as output at step 204 ensures that example process 200 can be applied to any two nodes, points and/or interface (s) that exchange data.

The operations performed by the BFX chip can include classical computing operations or quantum computing operations. For example, if the BFX chip receives a classical data output from the AAR chip the BFX chip can compress the classical data using classical one way swap gates (step 203A). As another example, if the BFX chip receives a quantum data output from the AAR chip the BFX chip can compress the quantum data using quantum gates (step 203B). The operations performed by the BFX chip are described in more detail below with reference to FIGS. 12-14.

That the processing performed at step 203 can occur on quantum or classical computing devices does not change the input and output type. That is, example process 200 receives classical data as an input and outputs compressed classical data.

In example process 200 quantum mechanical logic is applied to classical data at step 202 (to generate "quantum-inspired classical data"). While quantum gates can be implemented at step 203B, in some implementations step 203A can serve as a default option of classical gates to process quantum-inspired classical data to obtain the output.

Figure 3A:
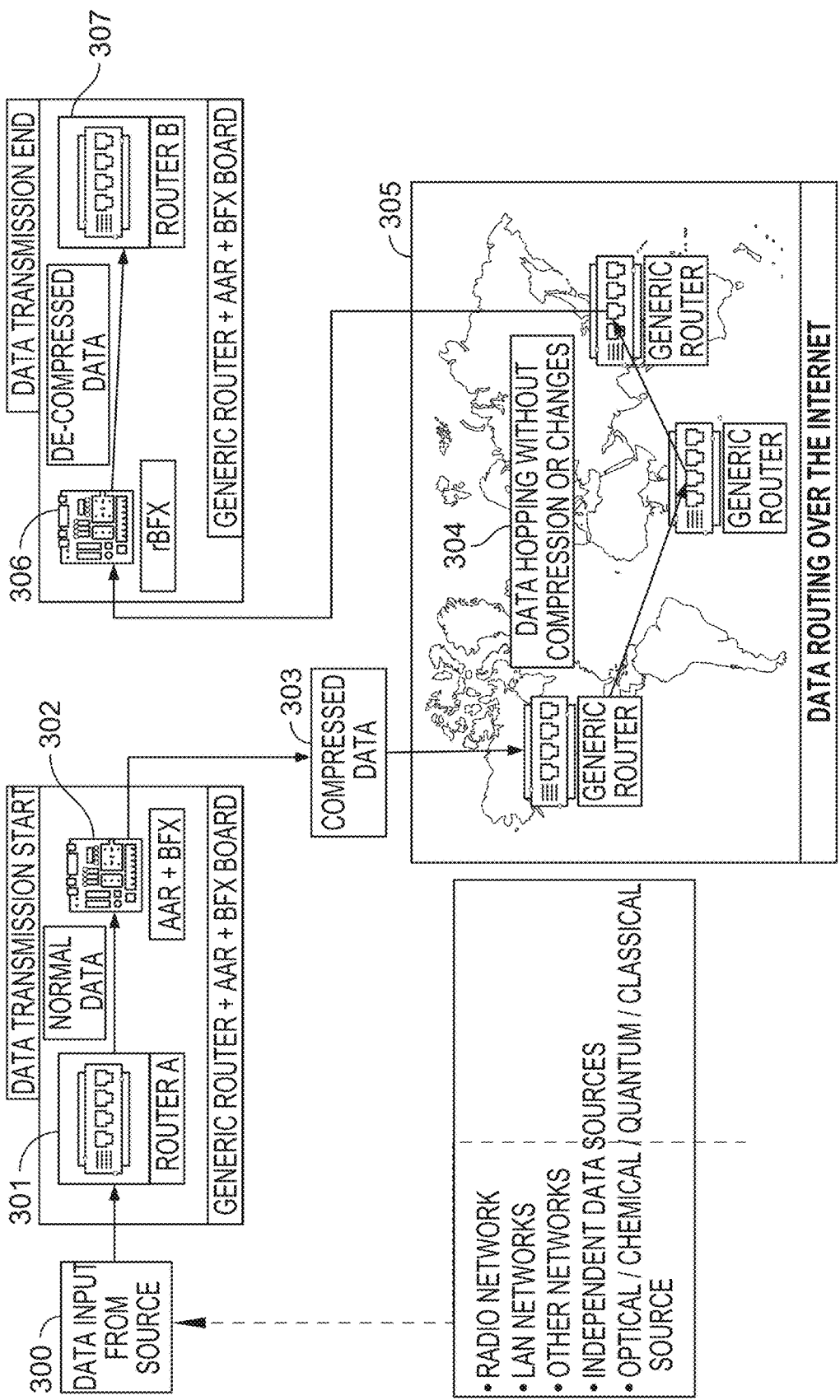
FIG. 3A illustrates an example application of the presently described techniques for high speed internet backhaul transmission.

FIG. 3A illustrates an example application of the presently described compression and decompression techniques for high speed internet backhaul transmission. In this example, router A 301 is a generic router that accepts classical data 300 from a source, e.g., a radio network, LAN network, independent data source, or optical, chemical or quantum-classical sources. The router A passes the classical data to an AAR+BFX board 302, e.g., the main board 101 of FIG. 1, that compresses the classical data. The compressed data 303 is passed to the internet which contains a string of classical generic routers, e.g., routers that do not include an AAR+BFX board. The generic routers bounce 304 the data without compressing or otherwise changing the data. The data is then delivered 305 to a final transmission endpoint. The data that arrives at the final transmission endpoint is provided to a rBFX chip 306 which decompresses the data and transfer it to Router B 307 for output or further classical processing.

Figure 3B:
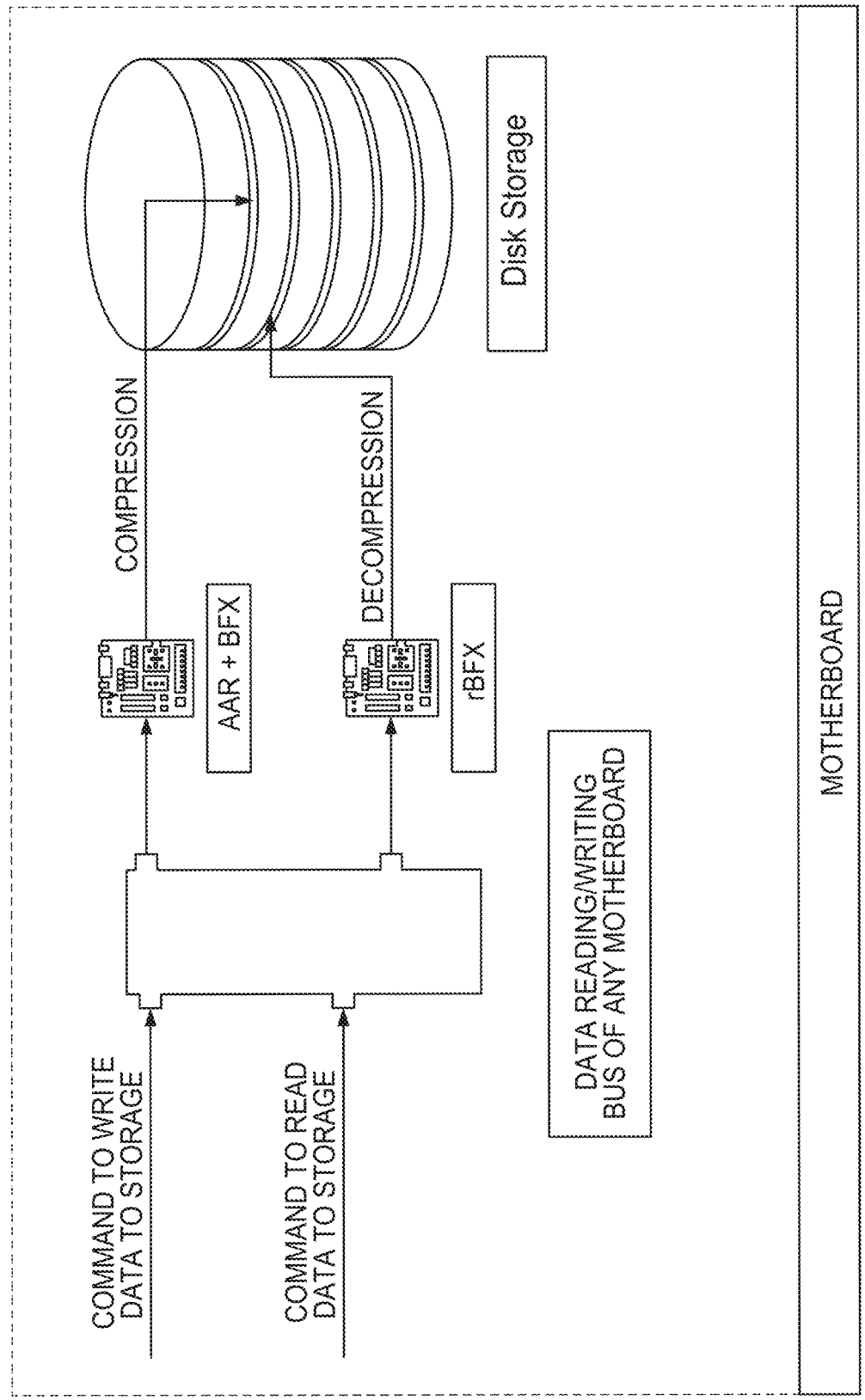
FIG. 3B illustrates an example application of the presently described techniques to achieve target storage space.

FIG. 3B illustrates an example application of the presently described techniques to achieve improved storage space. In this example, a hard drive on a computing device stores data. The AAR+BFX boards can store data in a storage location via references of statistical probabilities. The references can also be compressed to achieve further memory savings which can be decompressed by the rBFX board. It is believed that in certain implementations this enables hardware to have unlimited storage space (in this disclosure the term "unlimited" is understood to refer to an amount of storage space that is bound only by temporal limitation of processing.)

Other example applications of the presently described techniques that are not shown in FIG. 3A or 3B include: embedding a chip between two circuits of any device that enable logical reverse computing, data transfer between nodes, boards, adapters and terminals. This can be achieved as AAR+BFX can generate highly compressed data and any receiver that has the rBFX chip can decompress the receiving stream. This concept can be extrapolated to any system with a storage, transmitter, receiver or a classical or quantum interface that is integrated with AAR, BFX and rBFX boards that communicate over the internet, wired, wireless, optical, radio, microwave, laser or any other data communication protocol and layer.

As another example, a quantum-classical interface can enable the presently described invention to deliver logical reverse computing as the quantum-classical interface enables unlimited storage space, e.g., in disk, chemical, quantum or other forms. The quantum-classical interface has the ability to create bridges between chips, memory, disks, network adapters, any type of ports, systems, devices or nodes in classical machines to preserve and store inputs and outputs. Hence, a process that has been transmitted, conducted, read, written, processed, simulated, or passed in a classical machine is not lost. By providing an output, the input can be near-instantly delivered by lookups and vice versa without the need of processing the same input again. This is the core definition of logical reverse computing and is an application of the presently described invention.

The Aar Chipset: Example Techniques for Generating a CQME with Statistical Operators Using the Ensemble Interpretation of Quantum Mechanics As described above with reference to FIGS. 1 and 2, the AAR chipset is configured to process a classical data input and generate a corresponding Classical Quantum Multi-Element (CQME). The CQME is part of an object that is referred to herein as an "arithmetic compound". That is, the AAR chipset processes input data to generate an arithmetic compound which includes a CQME. An arithmetic compound is a mathematical structure that stores matrices as sub elements and is generated via logical arithmetic rotations. Each rotation takes an input and generates an arithmetic compound (in this disclosure the term "rotation" is understood to refer the complete process that an input is subjected to determine an arithmetic compound). The same input can be rotated again to form a new arithmetic compound from a previously derived arithmetic compound. This circular process of creation of an arithmetic compound in this document is referred to as Advanced Arithmetic Rotations or AAR.

An arithmetic compound contains the three intermediate arithmetic elements IAE[1]), IAE[2] and IAE[3]. These three arithmetic compound sub-elements combine to form an element that is quantified by observable statistical patterns within these matrices referred as statistical operator(s). An arithmetic compound is a combination of matrices that carries CQME, statistical operators and an ancilla matrix.

Figure 8:
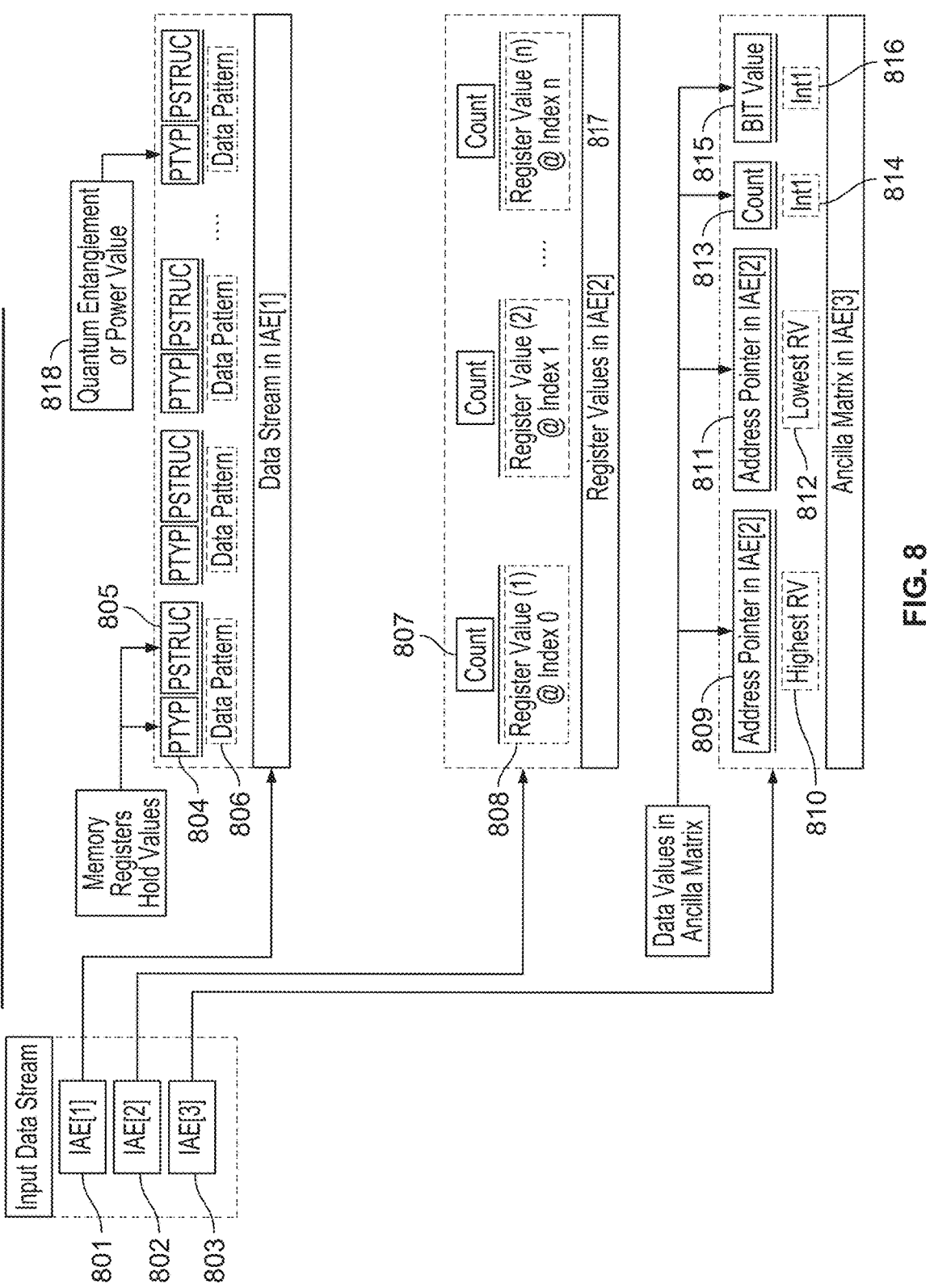
FIG. 8 is a block diagram that shows example intermediate arithmetic elements IAE[1], IAE[2], and IAE[3].

The intermediate arithmetic element IAE[1] contains the original data which is viewed with quantum properties as a CQME with statistical operators of—virtual quantum entanglement value (the first bit, see, e.g., 818 of FIG. 8) and Data Patterns (DP) (see, e.g., 806 of FIG. 8). In this disclosure, use of the term "quantum entanglement" or "quantum entanglement value" is understood to refer to correlations or a correlation value between objects that is analogous to the physical phenomenon of quantum entanglement and is therefore referred to herein as "virtual quantum entanglement" or a "virtual quantum entanglement value." This analogy will become more apparent below, see, e.g., the definition of IAE[1] given below with reference to FIG. 4.

The intermediate arithmetic element IAE[2] contains register values (see, e.g., 817 of FIG. 8) representing statistical operators that include: index (see, e.g., 808 of FIG. 8), count of repetitions (see, e.g., 807 of FIG. 8) of the data pattern in the matrix IAE[1] (see, e.g., 806 of FIG. 8).

The intermediate arithmetic element IAE[3] contains the ancilla matrix which holds the statistical probabilities. Virtual quantum state descriptions are mathematically defined in the entanglement bit (see, e.g., 818 of FIG. 8) of register values. These statistical operators empirically generate statistical probabilities for decompression.

Figure 4:
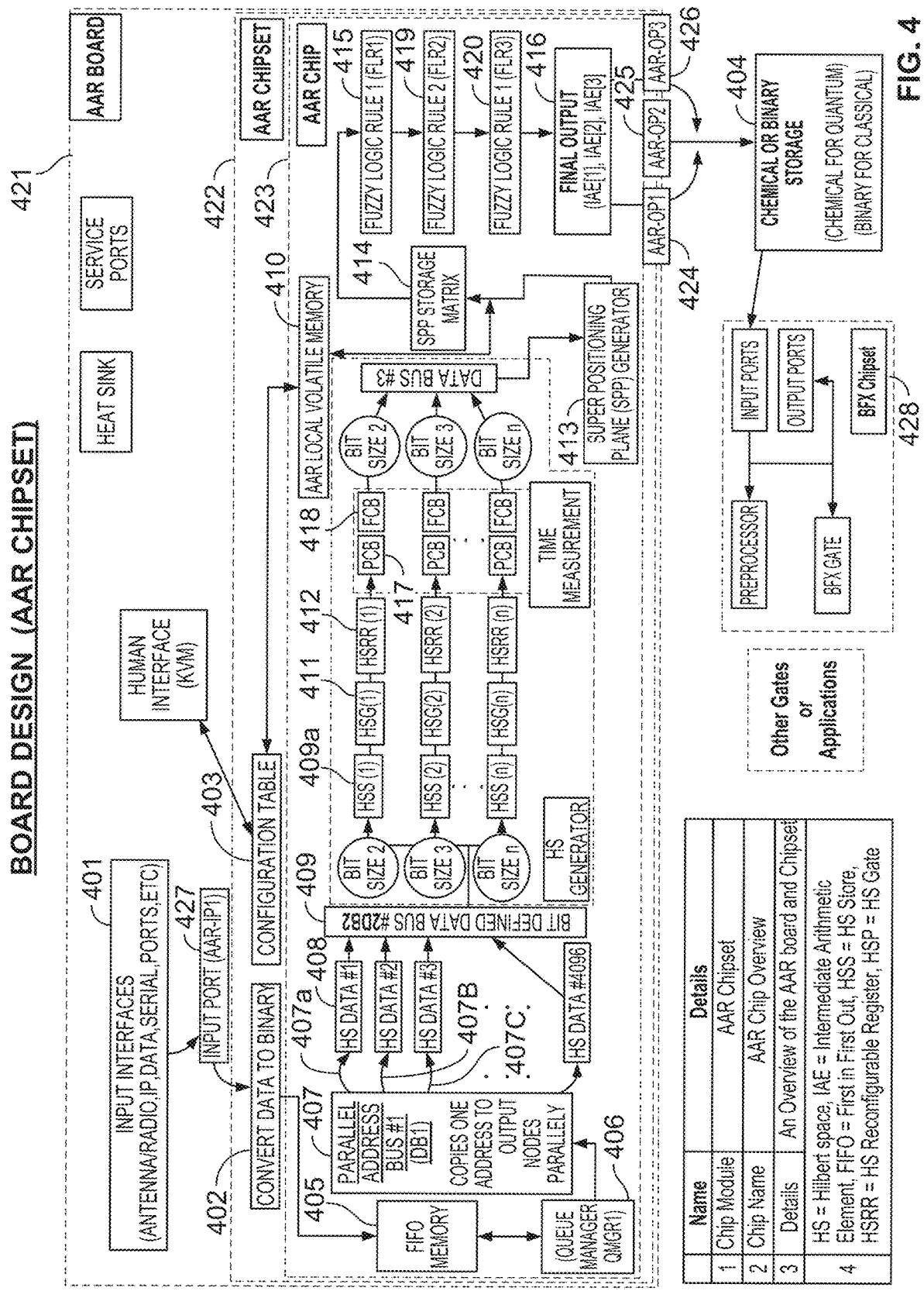
FIG. 4 is a block diagram of an example board design of an AAR chipset.

Other statistical operators such as entropy are used by the AAR in Fuzzy Logic Rule 2 (see, e.g., 419 of FIG. 4), statistical measurements in Fuzzy Logic Rule 3 (see, e.g., 420 of FIG. 4), super positioning plane (see, e.g., 414 of FIG. 4) that represents data elements as a wave and quantum mechanical logic of time measurement in pre circuit breaker (see, e.g., 417 of FIG. 4) and final circuit breaker FCB (see, e.g., 418 of FIG. 4). These operators are generated by the AAR chip and passed to the BFX chip.

The above processes enable classical data to be represented as CQME or classical data with quantum properties that can be processed on classical machines and also be used on quantum computers in the future. Quantum computers will be able to represent this processed data by storing them in superposition states with fewer gates errors (such as, in some cases, zero gate errors) as the ancilla matrix defines the time measurement of each qubit. This can lead to excellent fault tolerance and lowered gates errors to deliver quantum computing storage at par with classical storage solutions and achieve logical reverse computing and its benefits in quantum computing.

FIG. 4 is a block diagram of an example AAR board design. The AAR board 421 includes an AAR chipset 422 and an AAR chip 423. The AAR chipset 422 contains the AAR chip 423 and auxiliary components including memory, tables, buses, and ports. The AAR board 421 is configured to interact with other boards and storage devices to deliver applications. In the present disclosure, the AAR board 421 interacts with a BFX chip 428 to achieve a target amount of lossless compression.

The AAR chip 423 can be an embedded or a non-embedded chip/processor, software module, or embedded logical code. The AAR chip 423 includes at least one input port AAR-IP1 427. The input port AAR-IP1 427 is configured to receive an input classical data stream from an input source 401. The AAR chipset 422 includes a module 402 that is configured to convert the input classical data stream into binary format and provide the AAR chip 423 with the input classical data stream in binary format.

The AAR chipset 422 includes an embedded configuration table 403 that can be pre-defined or managed by an operator to define one or more operational parameters. These operational parameters can include: Size Bound Value (SIZE), PCB-error (PCBe), Data Saving Value (DSV), Number of Rounds of Compression (NRC), Maximum Size of Compression (MAXC), and Standard Deviation Value (SDV). These operational parameters can be defined as follows:

The parameter Size Bound Value (SIZE) can be defined by an operator and is referred to as 'SIZE' across the modules of the AAR chip and BFX chip. SIZE represents a size of input data items, e.g., the size of a data input provided to various modules in the AAR chip and BFX chip. The SIZE values are bound by an upper limit SIZEUL and a lower limit SIZELL. The SIZE values are provided for input in Hilbert space generation and other modules in the AAR and BFX chips. For example, if the operator specifies that Hilbert space sizes from 56 to 1280 are to be generated then SIZEUL is equal to 1280 and SIZELL is equal to 56. In examples described in the present disclosure, SIZEUL and SIZELL are typically bound to 4096 and 2, respectively. However, other values can also be used.

The parameter PCB-error (PCBe) defines the time (in milli-seconds) permitted prior to discarding a stream when a Pre-nucleus circuit breaker (PCB) event (described below in detail) does not occur.

The parameter Data Saving Value (DSV) is used to specify whether AAR chip data routed to the BFX chip should be saved or transparently passed through to the BFX chip or another application board. The parameter DSV can take values such as 'pass-through' (e.g., without saving), 'save-and-transmit,' or 'simply-save'.

The parameter Number of Rounds of Compression (NRC) specifies the number of rounds of compression that the BFX chip is to undertake through re-routing data outputs and inputs between the BFX chip and AAR chip.

The parameter Maximum Size of Compression (MAXC) allows an operator to specify a target size of compression to be achieved. Defining this parameter forces the AAR chip and BFX chip to re-route data "n" number of times until the target compression is achieved.

The parameter Standard Deviation Value (SDV) specifies a permissible deviation value range to be applied in Fuzzy Logic Rule 3 (FLR3).

Returning to FIG. 4, binary data (e.g., received directly at input port AAR-IP1 427 or the module 402 configured to convert non-binary input data to binary) is loaded as a single First-In-First-Out (FIFO) memory stream in FIFO memory 405 such that the AAR chip 423 can compute the following values at the designated output ports:

A final arithmetic compound $AC_{FINAL,g}$ on AAR-OP1, where g represents the global index value for storage (a pointer to a memory location), parallel processing and memory tracking. $AC_{FINAL,g}$ is written as per the value of the operational parameter data saving value (DSV) on an external storage.

A Register Value (RV matrix) on AAR-OP2. This RV matrix or IAE[2] contains statistical operators, as described below in more detail.

An RV matrix may also be used as an ancilla matrix or IAE[3] on AAR-OP3. The ancilla matrix contains statistical probabilities, as described below in more detail.

Data is stored as a FIFO memory stream to ensure that the stream is processed sequentially when being access by the parallel address bus #1 DB1 407. The transmission of data to DB1 407 is managed by a queue manager Queue Manager QMGR1 406 that is configured to ensure that data is—(a) defined for each Hilbert space and stored in the FIFO memory, (b) copied for all parallel tasks by the DB1 in one instant by providing relevant memory address locations, and (c) the processing waits until all tasks have written to the SPP Storage Matrix 414 to ensure an error-free process.

The AAR chip 423 performs three steps to generate as output a final AC ($AC_{FINAL,g}$) During step one, the AAR chip 423 generates candidate (e.g., all mathematically possible) Hilbert spaces for the data input. During step two, the AAR chip 423 computes candidate (e.g., all mathematically possible) arithmetic compounds (ACs). During step three, the AAR chip 423 selects an optimal arithmetic compound from the candidate computed at step two. These three steps will now be described in detail:

Step One: Generate Candidate Hilbert Spaces (HS)

During step one, the AAR chip 423 reads data as per the variable SIZE as defined in the configuration table 403. In some implementations the variable SIZE can range from 2 to 4096. The parallel address bus #1 DB1 407 (see also 602 of FIG. 6) provides memory location addresses of data as per the size stored in the FIFO memory from the queue manager QMGR1 406 (see also 601 of FIG. 6) intended for transmission to input ports of the HS Data memories 408 (in FIG. 4 one HS data memory HS DATA #1 is labelled 408, however in this disclosure label 408 is understood to refer to the collection of HS data memories (see also 603 of FIG. 6)). The HS data memories 408 are processing modules that serve as temporary storage prior to passing data to the bit defined bus 409. Each HS data memory stores data as per its intended size. Hence, the HS data memories are designed to optimally store incoming data streams.

The parallel address bus #1 DB1 407 receives address data from the FIFO memory 405 via the queue manager QMGR1 406 on a single input port and transmits the data to multiple output ports, e.g., ports 407A, 407B, 407C. The number of output ports that the parallel address bus #1 DB1 407 transmits to is equal to the value of the variable SIZEUL as specified in the configuration table. The parallel address bus #1 DB1 407 is designed specifically to spray incoming data to the output ports via short length wires for high speed transmission rates. This enables the HS Data memories 408 (see also 603 of FIG. 6 or 701 of FIG. 7) to be informed of an availability of new data to be processed.

The ports of the HS data memories connect to the parallel address bus #1 DB1 407 and are defined as per a predefined bit size to enable high speed copy (in this example ranging from 2 to 4096). The parallel address bus #1 DB1 407 (see also 602 of FIG. 6) copies the data from the FIFO memory 405 and stores the data in memory locations of the HS data memories 408, as defined for the sizes 2, 3 . . . 4096. This step does not discard any of the input data or alter the structure/ordering of the input data but copies the full input data to all memory locations in the HS data memories 408. This is a high-speed data transfer and is a circular buffer populated by the FIFO memory 405 to ensure that data is in the queue for next processing. The circular buffer is monitored by the queue manager QMGR1 406, which is configured to null memory locations when data from the HS data memories 408 is passed to the next step (see also 702 of FIG. 7) for the Bit Defined Data Bus #2 (DB2) 409.

The Bit Defined Data Bus #2 DB2 includes a number of nodes as specified by the variable SIZEUL, e.g., in this example 4095 nodes, which accepts data in various bit transmission sizes. Each of the custom nodes are connected to a respective pre-defined HS Storage Space HSS 409a. Custom sized data is then transmitted from a respective HS Data memory 408 (see also 702 of FIG. 7), over a dedicated wire to the Bit Defined Data Bus #2 DB2 409, and to a respective HSS 409a. The HS Data memories 408 are not designed to hold large amounts of data and have limited circular memory (see FIG. 7). They continue to read and transmit data to the HSS 409a (via the Bit Defined Data Bus #2 DB2 409) as per incoming and outgoing bit sizes. The HSS data reference pointers are maintained in the local AAR memory.

Figure 7:
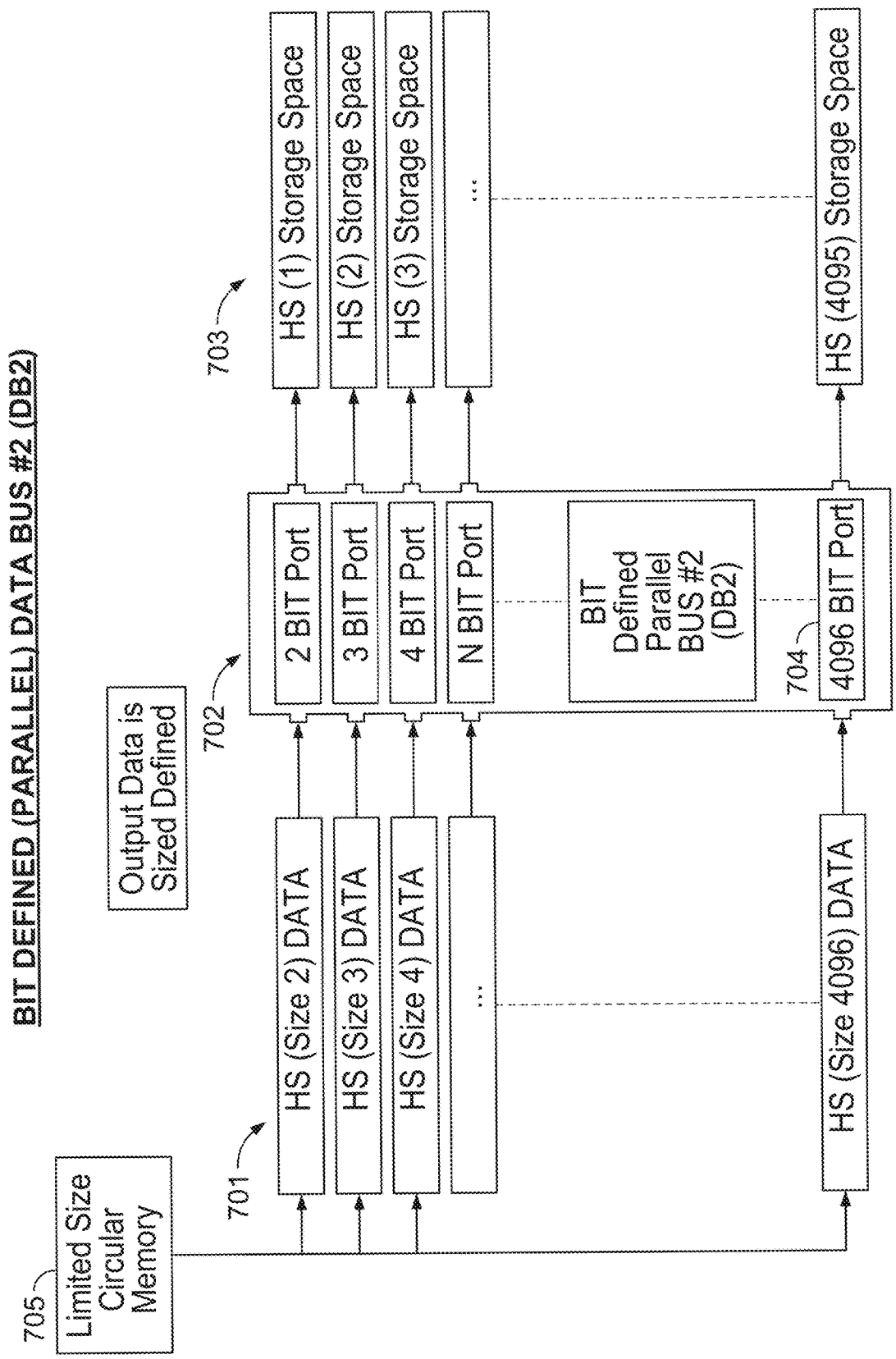
FIG. 7 is a block diagram that shows an example bit defined parallel data bus #2 (DB2).

The data in each of the HS data memories 408 includes the full input data which is copied in respective sections (also referred to herein as partitions) of 2 (SIZELL), 3, 4 . . . 4096 (SIZEUL) sizes by the Bit Defined Data Bus #2 DB2 409 and stored in respective HSS spaces 409a (see also 703 of FIG. 7). As an illustrative example, the data in HS DATA (2) includes the full input data (e.g., 000010110010101) which is copied in sections of 3 by the Bit Defined Data Bus #2 DB2 409 (e.g., copied as 000, 010, 110, 010, 101) and stored in HSS (2). This enables the AAR chip 423 to load data as a fixed sized one-dimensional matrix as data Elements (E) that range from 2 to 4096 element lengths (referred to as—SIZE), each linked to elements of their own size.

In implementation where the length of the data input is not a multiple of the HS size, the data input can be padded, e.g., by bits of 0, until the length is a multiple of the HS size.

A matrix $Matrix_{size}$ is maintained in a Local Volatile Memory (LVM) 410 for purposes of backup and $Matrix_{size}$ is nullified only when $AC_{FINAL,g}$ is derived on AAR-OP1 424. The matrix $Matrix_{size}$ is defined by:

$$Matrix_{SIZE,g} = [E(a)_{SIZE}, E(b)_{SIZE}, E(c)_{SIZE} \ldots E(n)_{SIZE}]$$

where SIZE represents a value from 2 to 4096, g represents a global identifier, and a, b, c, . . . n represent individual elements. The global identifier is a pointer to a memory location that holds a particular amount of data. This location is identified by 'g' and a pointer value that is a 256 length HEX value can be used. This value may increase as per onboard memory. The pointer value can be further optimized by advanced memory mapping.

A new element $E(n)_{size}$ is initialised in the LVM 410 with three empty sub-element data structures of NULL size. The three sub-elements are defined as Intermediate Arithmetic Elements (IAE)—IAE[1], IAE[2] and IAE[3] where IAE[1] holds the data from $E(n)_{size}$ IAE[2] stores register values of repeats of Data Patterns (DP) in IAE[1], and IAE[3] stores the ancilla matrix generated using IAE[2] as input. Definitions of these Intermediate Arithmetic Elements are given below and are further described below with reference to FIG. 8.

IAE[1] and Classical Quantum Multi-Element (CQME) Definition:

IAE[1] contains elements $E(n)_{size}$ with a size ranging from SIZELL (2) to SIZEUL (4096) for CQME generation. An index of the elements from IAE[1] size are processed and counted to create an equal number of empty elements or register values in IAE[2]. IAE[1] can be defined as:

$$IAE[1]_{s,g} = \int_0^i E_i$$

where E represents elements as read from the input stream, g represents a global identifier, s represents size and is a real number between 2 and 4096, and i represents index of data inside element E.

The elements within IAE[1] are referred to as a Data Pattern (DP) (see, e.g., 806 of FIG. 8). The data pattern is split into two portions or statistical operators: 1) a quantum entanglement measure or Pattern Type (PTYP) (see, e.g., 804 of FIG. 8) which is a first bit that holds the virtual quantum entanglement measure of an element and 2) a second Pattern Structure (PSTRUC) (see, e.g., 805 of FIG. 8) that holds the remainder of the value.

To quantify the statistical operator of power or quantum entanglement information (which may be a 0 or a 1), the logic maintains that the two similar PSTRUC are encoded using opposite PTYP that bear similar data pattern. The entanglement value is inspired from quantum mechanics and quantum information theory. An entanglement value is defined in this disclosure as element PTYP in IAE[1]. Two elements are defined in this disclosure as being entangled if the two elements have the same PSTRUC but opposite PTYP. Each element with the IAE is non-local as they have been defined due to an interaction. In classical terms, the interaction is defined as the ability to spawn data pattern as per the HS size. This defines the data in IAE[1] as a CQME system.

IAE[2] Definition:

The element $IAE[2]_{s,g}$ is stored in local memory and is a dual utility one-dimensional value matrix which holds two statistical operators of index and count. The term "dual utility" signifies that the value and index location of an element within a matrix can be used a separate processing input(s) for various lookups or other equations/functions. The index location of this element is the value in a separate matrix which enable advanced lookups. For example, in a first matrix (repetition count) the index location 1 could hold a value of 5. A second matrix can hold a value of 1 mapped to AA. Hence, the value of 5 in the first matrix, index 1 when looked up against the second matrix would indicate that AA is repeated 5 times as the value of 1 signifies 5 in matrix 2.

Each variable is designed to hold data while the index of each variable within the matrix provides reference to Data Patterns (DP) in IAE[1]. Each unique data pattern is cross-referenced as an index $IAE[2]_{s,g}$. The index's label or RV holds respective data pattern counts (see, e.g., 807 of FIG. 8) of the same data pattern in IAE[1].

$IAE[2]_{s,g}$ updates the data at an index or RV as it encounters the data pattern in IAE $[1]_{s,g}$. The count of the data pattern is stored in $RV_i$ where i represents the index as per the binary nomenclature defined by size. IAE[2] can be defined as $$IAE[2]_{s,g} = \int_0^i RV_i$$

where s represents size, g represents the global identifier, and i represents an array of Register Values (RV) that holds the data pattern count. The RV is a memory location that holds data within a matrix. The RV of the index value indicates the type of Data Pattern (DP) in IAE[1] and the value of the index location or its RV is the DP count. RV is used specifically in this disclosure to mark that the memory is marked or generated dynamically to store specific length binary packets. This improves the processing speed of the board since RV is a simple memory pointer that points to stored data.

IAE[3] and Ancilla Matrix (AM) Definition:

IAE[3] is a two-dimensional null matrix generated by the AAR chip. The element IAE[3] is populated with statistical probabilities or other data by the AAR chip. The element IAE[3] can be defined as:

$$IAE[3]_{s,g} = \{R_h, R_l, s\}$$

where s represents size, g represents the global identifier, $R_h$ represents the RV of the highest index from IAE [2], and $R_l$ represents the RV of the lowest index from IAE [2]. The value of $R_l$ can be further compressed in final processing stages of the AAR chip to a single bit.

Continuing the description of step one (generate candidate Hilbert spaces) and returning to FIG. 4, if the variable GEN in the configuration table 403 is true, then value of SIZE is between defined size bounds of SZV or assumed as 1 and 4096. If GEN is false then value of 'size' is as defined by all values.

The parallel processing for Hilbert Space (HS) generation continues as per the variable GEN by the HS Gates (HSG) 411. Each HSG 411 obtains a data input from a respective HSS 409a and creates three matrices representing IAE[1], IAE[2] and IAE[3] in local memory 410. This is illustrated and described below with reference to FIG. 9A. Data from the respective HSS 409a is read and is transparently copied (e.g., without alternation or processing, similar to a pass-through gate in signal processing) to IAE[1]. Based on the respective SIZE of the HSG 411, the HSG 411 initialises IAE[2] Reconfigurable Register (RR) values in a respective memory referred to as a Hilbert space reconfigurable register (HSRR) 412.

The Hilbert space (HS) RR memory 412 includes dynamic memory blocks that enable optimal use of memory space as they only generate required IAE[2] sizes. This enables optimal memory usage that is customised to the requirements. Each HSG 411 places a mathematical null value of '0' for all initialised RVs in the respective IAE[2] and in the respective IAE[3]. The third IAE element of the Hilbert space, IAE[3] or AM, is stored as a null matrix, to be used in step 2 (as described below) for statistical probabilities storage.

The Hilbert spaces range from a 'size' of 2 to 4096 and are stored in LVM 410 as the three IAE matrices which are uniquely identified by the global identifier g. The string of Hilbert spaces can be defined and accessed as per the following identification logic:

$$H_{s,g} = \{IAE[1]_{s,g}, IAE[2]_{s,g}, IAE[3]_{s,g}\}$$

where s represents the SIZE of the data structure and is a real number between 2 and 4096 and g represents the global index of Hilbert Space.

Step Two: Compute Candidate Arithmetic Compounds (AC)

In step two, the HSG gates 411 generate statistical operators in the respective elements of IAE[2]. The combination of interim IAE[1], IAE[2] and IAE[3] are referred to in this disclosure as $AC_{INTERIM}$ or Intermediate Arithmetic Compounds (IAC) that contains the data and statistical operators. Both $AC_{FINAL,g}$ and IAC are similar with the exception that the $AC_{FINAL,g}$ is the final output whereas the IAC are possible candidates that will be filtered and dropped via the Fuzzy logic modules 415, 419 and 420 to yield the final output or $AC_{FINAL,g}$.

Each HSG gate 411 creates a respective HSRR 412 as an empty register in IAE[2] and stores the index value as per the 'size' variable and stores NULL or '0' count values in these indices. The HSG gate 411 reads the Data Patterns (DP) (see 911 and 912 of FIG. 9B) from the data stream in IAE[1] (see, e.g., 910 of FIG. 9B) via a loop (single tasked) or in parallel (via multi-tasking) and compares the data with the Data Patterns (DP) across all register values in IAE[2]. The HSG gate 411 increments (see 913 and 914 of FIG. 9B) the COUNT value in IAE[2] of the data pattern that matches the register value (see 915 of FIG. 9B).

At a designated future data writing event, one of the register value counts will have an initial null value and at a next write event all initial null values will no longer exist (all values will be non-null). This event is referred to as a Final Circuit Breaker (FCB) event 418 (see also 928 of FIG. 9C). This register value (which contains the initial null value) will represent the completion of an IAC and can be defined as $IAC_{s,ug}$ where 'ug' represents a unique index of the AC and s represents size. When an IAC is completed, the HSG gate continues to read the Data Patterns (DP) from the data stream in IAE[1] to create a next IAC, until the entire data stream has been read.

The $AC_{FINAL}$ will be obtained from the series of generated IACs or $AC_{INTERIM}$ after the series of generated IAC or $AC_{INTERIM}$ are processed via the Fuzzy Logic Rules (FLR) modules 415, 419, 420.

To generate a stream of IAC, each HSG 411 counts values in IAE[2] to monitor for a "Pre-nucleus circuit breaker" event (PCB) followed by the FCB event. The PCB event is monitored to ensure optimal usage of memory resources on the AAR chip 423. For example, the operator can define an Error Control (EC) variable or PCBe (stored in the configuration table 403) that will drop Hilbert space streams if the PCB event does not occur for a defined amount of time or reads. In some cases, a PCB event will not occur because the Hilbert space stream does not yield statistical operators that can define the stream as a CQME. Therefore, the lack of a PCB event is an error control to ensure that only the Hilbert space that may be optimal for statistical operators and probability presence are processed.

The error control variables can take operator defined values that vary based on the type of input data stream and processing equipment. For example, in some implementations the error control variables can include a variable that defines an amount of time. In this example, a stream can be dropped if a PCB event does not occur post a lapse of an adjustable percentage as defined by PCBe in configuration table (403), e.g., 40%, of the processing time for an event where all but one Data Patterns (DP) in IAE[2] contain NULL values. In other words, time can be calculated from the beginning of the stream read until the moment when all but one DPs in the IAE[2] contain a value of zero and the time can be stored in $PCB_t$. In case PCB event does not occur within a time period defined by $PBC_t + 40\% * PCB_t$, then the stream is dropped.

As another example, in some implementations the error control variables can include a variable that defines an amount of read data. In this example, a stream can be dropped if the PCB event does not occur within an adjustable percentage, e.g., 40%, of the size of read data until the point at which an event occurs where all but one Data Patterns (DP) in IAE[2] contain NULL values. In other words, the read size can be calculated from the beginning of the stream read until the moment when all but one DPs in the IAE[2] contain a register value of zero each and the size can be stored as PCBs. In case a PCB event does not occur within a read size as defined by PBCs+40%*PCBs, then the stream is dropped.

Each HSG 411 selects a respective first available Hilbert space in memory 410 from round robin lookup as per the global index variable. As a check, logic dictates that all register values are initialised by a mathematical NULL or '0' value. Due to memory corruption if the register value does not represent a NULL or '0' value then all Register Values (RV) are initialised with a NULL or '0' value. Using unsupervised logic programming, the HSG 411 monitors the register value $RV_i$ until the NULL or '0' values disappear from all but two register values in the current write event (where the current write event is a snapshot of the count value of Data Patterns (DP) in IAE[2]). The next write event will increment one of the RVs NULL or '0' values. This event is labelled as a "Pre-nucleus circuit breaker" (PCB) event and will always occur prior to a FCB event.

Figure 9A:
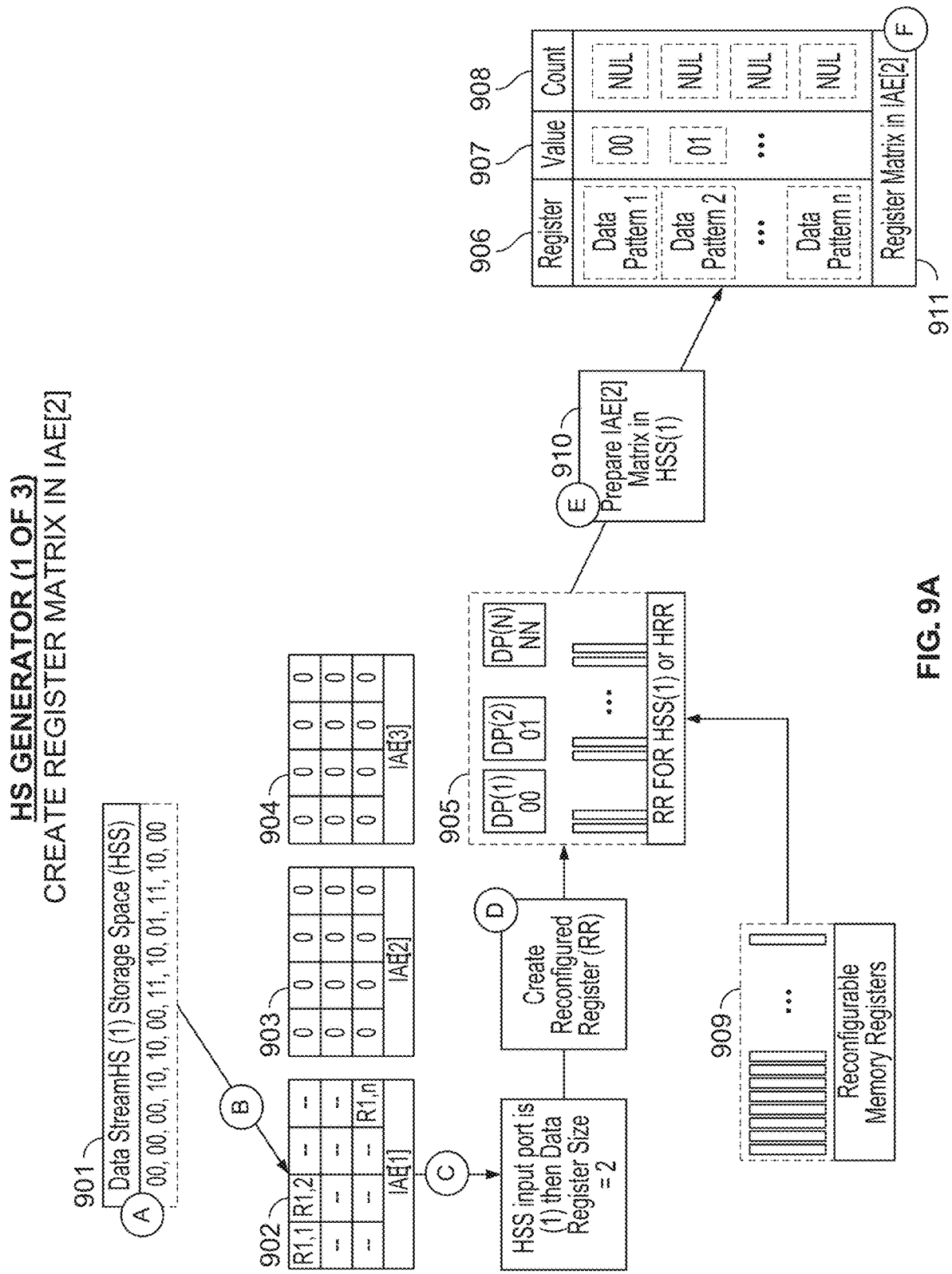
FIG. 9A is a block diagram of an example process for creating a register matrix in IAE[2].
Figure 9B:
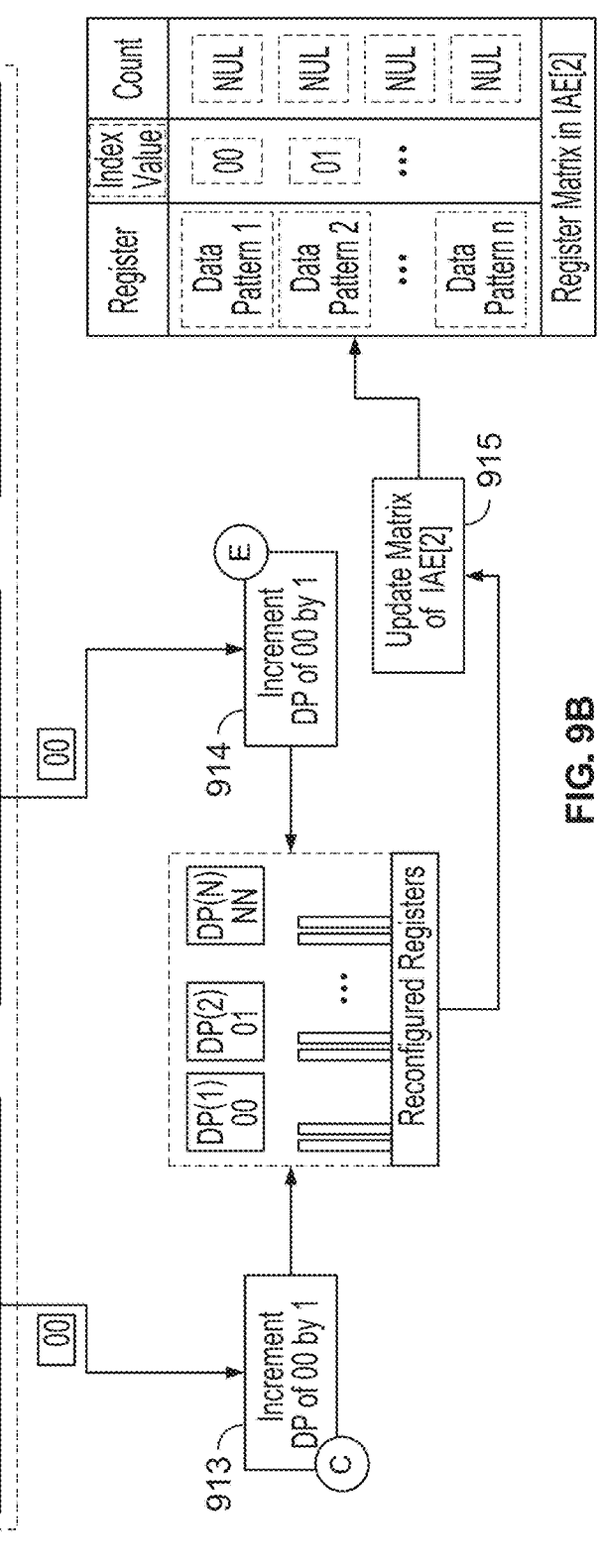
FIG. 9B is a block diagram of an example process for filling a register matrix in IAE[2] with data.
Figure 9C:
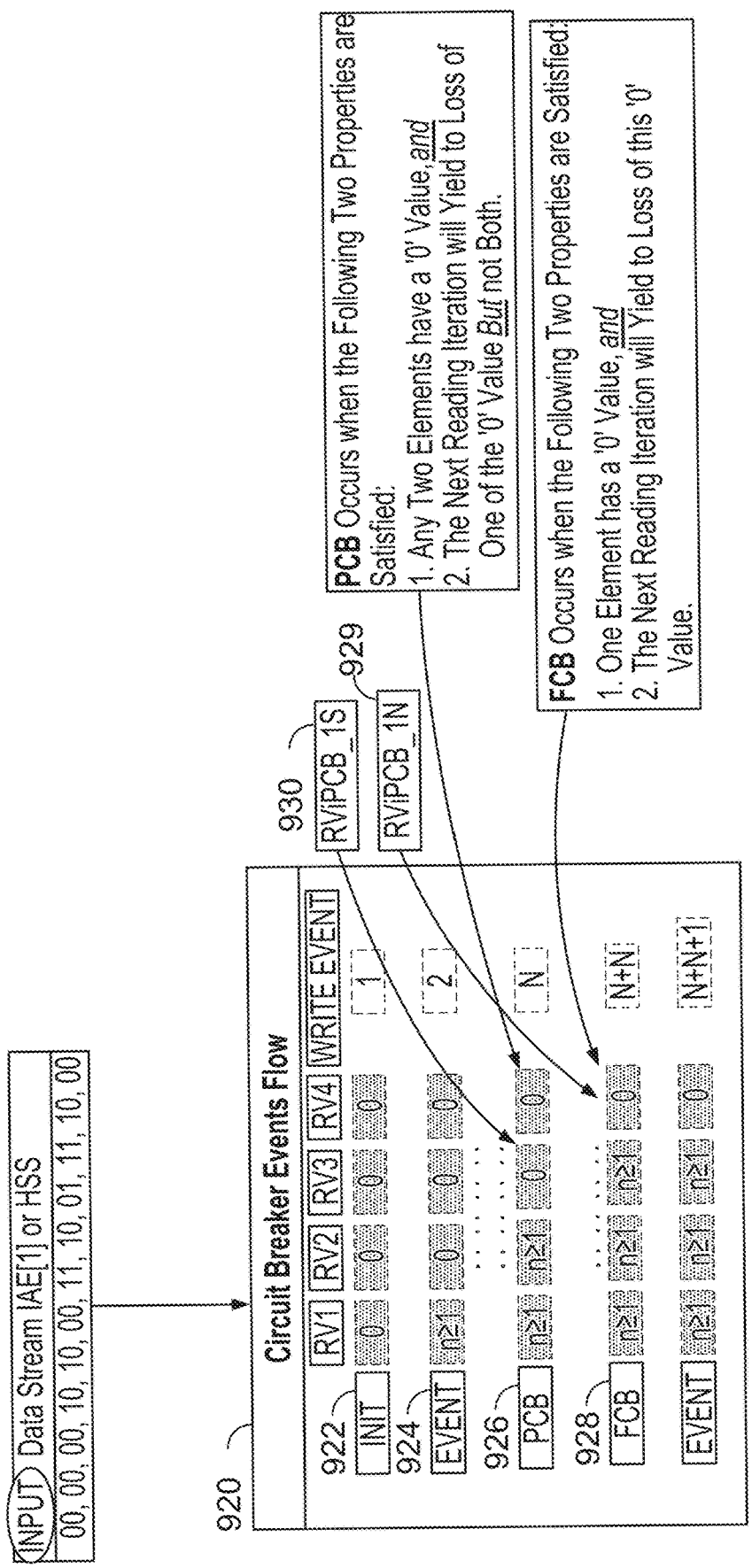
FIG. 9C is a block diagram that shows the termination of Hilbert space write operations for IAE[1] and IAE[2].

During the next write event in the PCB the register value $RV_i$ that maintains the '0' value is labelled as $RV_iPCB\_1N$ (see, e.g., 929 in FIG. 9C) and the register value which lost the '0' (at the PCB event) is referred as $RV_iPCB\_1\ S$ (see, e.g., 930 in FIG. 9C). A one dimensional matrix, $TEMP\_FCB_g$ (where $_g$ is global identifier) is initialised in the global memory that holds the elements of IAE[1] that are to be processed post the PCB event and continues to store the elements until the FCB event occurs. At an undefined time in the future (post the PCB event), another 'write' occurs in the $RV_iPCB\_1N$ where this register releases its initial null value status and when all other registers have already lost the initial null value status. This event is referred to as the FCB event and the last register that had the initial null value is defined as $RV_{s,cB}$ which is equal to $RV_iPCB\_1N$.

The AAR chip 423 includes a PCB detection module, e.g., PCB detection module 417, and a FCB detection module, e.g., FCB detection module 418, for each of the n Hilbert spaces. The PCB detection modules and FCB detection modules are configured to detect PCB and FCB events and perform the above described operations. The detection of a FCB event by a FCB detection module can be compared a time measurement of wave form in quantum mechanics. However, in case of AAR processing it is applied to analysis of classical data. FIG. 11B shows data from an example IAE[1] represented as a series of waves.

In some implementations, the 'read' (value of index i) counter is rolled back by one to ensure that the last read value is the nucleus or $RV_{s,CB}$ All RVs in IAE[2] are defined as statistical operators as they hold the count value in each register. The $RV_{s,cB}$ or $RV_i PCB\_1N$ is the termination point and has the count of one singularity (i.e., a count of one, representing a unique data pattern in the data stream corresponding to IAE[2]).

To generate statistical probabilities in the ancilla matrix IAE[3], processed elements E(a) . . . E(n) that have been read from the IAE[1] prior to detection of the FCB event within the selected IAC space are moved and stored in a newly initialised variable Temporary IAE[1] or TIAE[1]. The term "moved" implies movement of the data and it nullifies the origin variables.

The Register Value (RV) of the highest and lowest index in IAE[2] is identified and stored as values of the statistical operators $R_h$ and $R_l$ within the IAE[3] matrix.

The current snapshot of the IAE[2] is moved to a Temporary IAE[2] (TIAE[2]).

The values of $R_h$ and $R_l$ are moved in Temporary IAE[3] (TIAE[3]).

The IAC can be denoted by the following equation:

$$IAC_{s,tg} = \{TIAE[1]_{s,tg}, TIAE[2]_{s,tg}, TIAE[3]_{s,tg}\}$$

where s represents size and tg represents a temporary global identifier.

This step is repeated to generate several IAC with varied sizes till the end of data is reached in the selected Hilbert space. At this time, all IACs generated as per size are combined to form a Potential Final Arithmetic Compound (PFAC) which is denoted by the following equation:

$$PFAC_{s,tg} = \left\{ \sum_{0}^{Lg} IAC_{s,tg} \right\}$$

where tg represents the temporary global identifier for the generated PFAC s and tg represents the temporary global identifier for IAC.

Figure 11A:
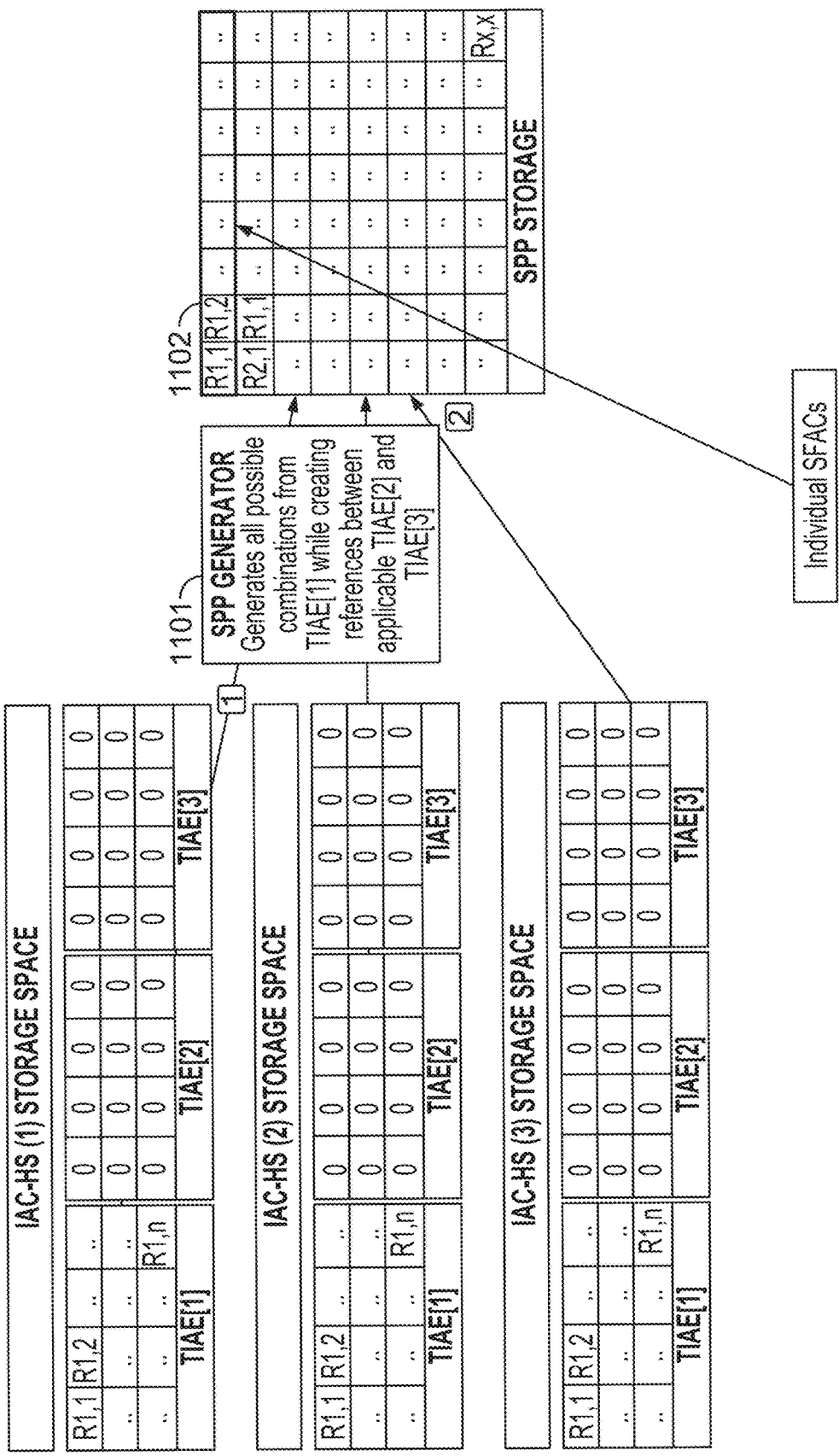
FIG. 11A is a block diagram that shows operations performed by the super positioning plane (SPP) generator.
Figure 11B:
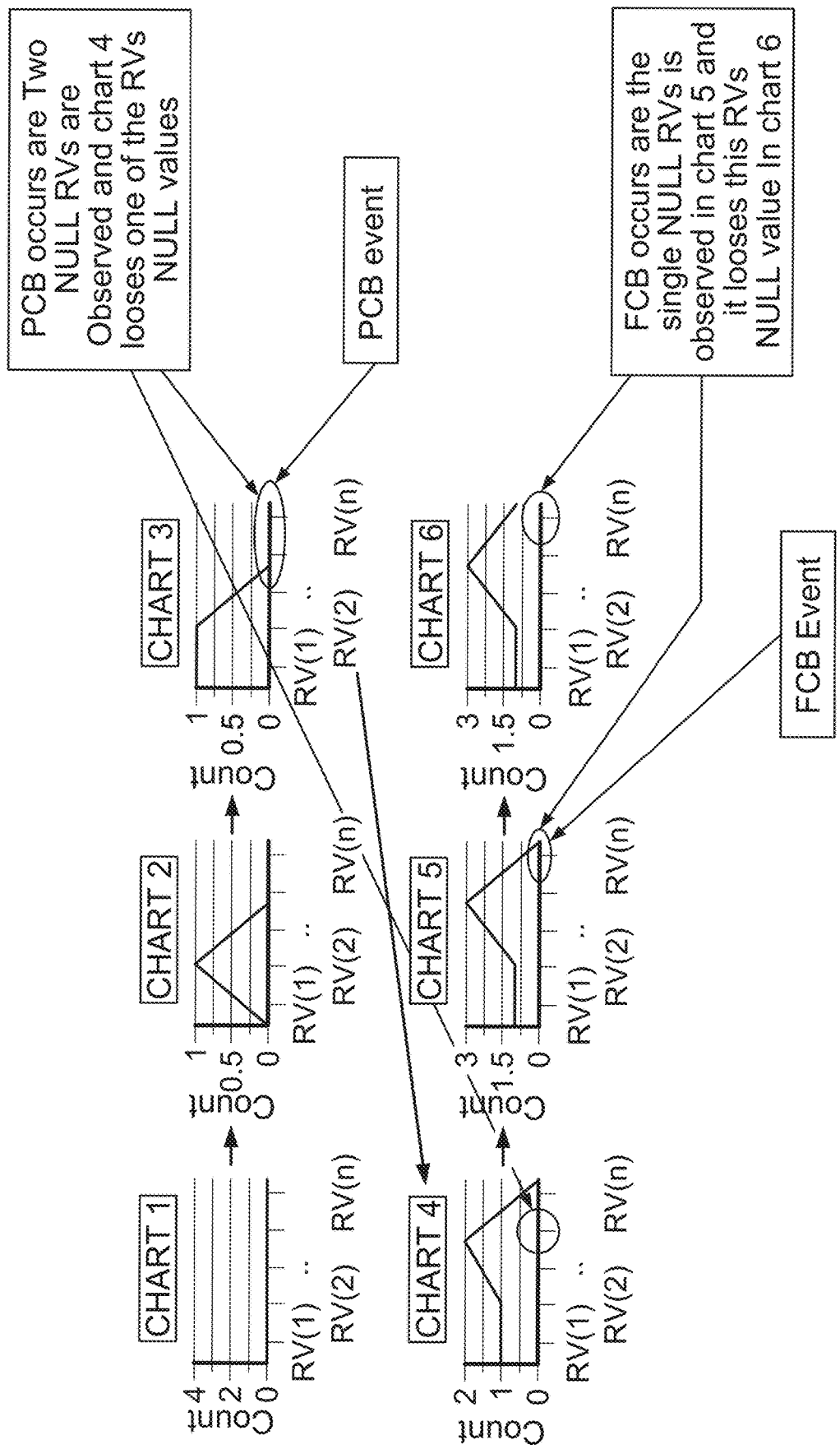
FIG. 11B shows example PCB and FCB detection charts.
Figure 11C:
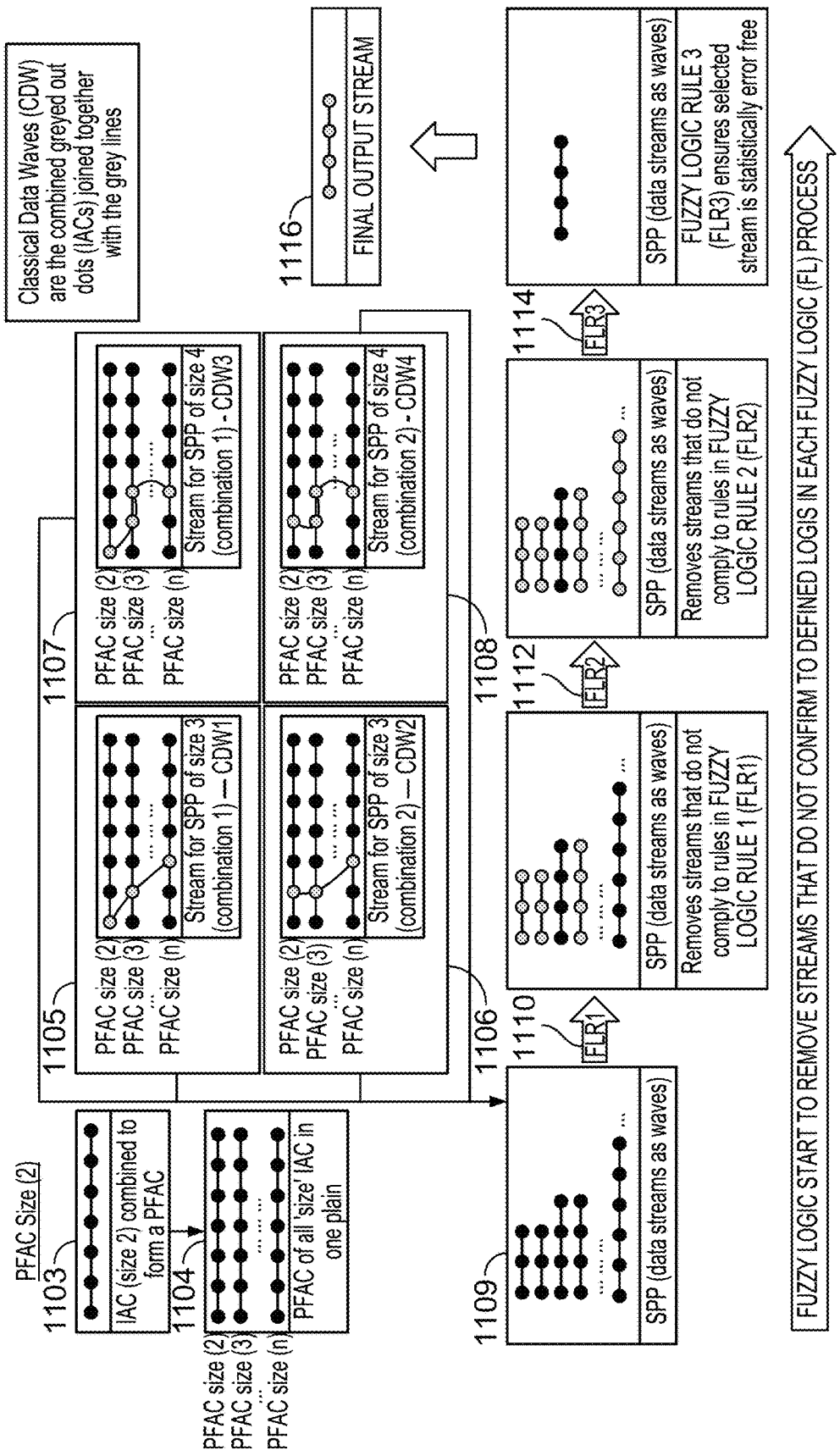
FIG. 11C is a block diagram that shows an example process for generating an SPP storage matrix and applying fuzzy logic to obtain a final output.

Step Three: Select Optimal Arithmetic Compound from Candidate Arithmetic Compounds Generated IACs are combined to form several potential final arithmetic compounds (see also 1102 of FIG. 11A) as per size above. However, only one of them or a combination of SIZE forms an optimal AC or $AC_{FINAL}$ (where optimal refers to an AC that produces the result "TRUE" to the fuzzy logic rules described below). To generate $AC_{FINAL}$, three Fuzzy Logic Rules (FLR) are implemented by FLR modules 415, 419, and 420. The FLRs assist in decreasing the number of potential final arithmetic compounds to identify the optimal $AC_{FINAL}$:

Fuzzy Logic Rule 1 (FLR1)—Combinations of various PFAC (different sizes) 1103 of FIG. 11C to be stitched together that result in same size as compared to the input data of $Matrix_{size,g}$. Combined PFACs cannot be smaller or larger than the $Matrix_{size,g}$. They need to match exactly to the Matrix size length else PFACs are dropped from memory. This is achieved by analysis of the Super Positioning Plane (SPP) where all (mathematically) possible data elements waves are stored.

Fuzzy Logic Rule 2 (FLR2)—PFACs filtered via FLR1 will be passed to FLR3 if their information gain or entropy has minimal variation when compared to the $Matrix_{size,g}$ entropy.

Fuzzy Logic Rule 3 (FLR3)—Frequency distribution of $TIAE[2]_{s,tg}$ should ensure that at least one singularity exists (i.e., that the count of at least one data pattern is greater than or equal to "1") to form a proper AC.

Before the FLRs are applied to the data, a Super Positioning Plane (SPP) generator 413 processes the candidate arithmetic compounds. The SPP generator 413 uses the global index tg of each PFAC to generate a SPP storage matrix 414 that stores a SPP. A SPP is a series of combinations of IACs generated with the following logic:

Combine $PFAC_{s,tg}$
Where $_{tg}$ is between 1 and maxcount of $_{tg}$
where $_s$ is between 2 (or SIZELL) and 4096 (or SIZEUL)
append $PFAC_{tg,s}$ to each other to create CDW combinations
Loop closed for s
Loop closed for maxcount $_{tg}$
Output connected n number of streams of PFAC or $CDW_n$ A SPP is a large combination matrix generated from classical data elements with feed forward combinations. The SPP is viewed as a super-positioning plot of a wave that is generated as a large dataset of streams by combining IAC elements. The combination occurs as a feed-forward and without discretion from the IACs within potential final arithmetic compound streams where each data stream is referred to as a Classical Data Wave (CDW). The CDW represents the elements, number of elements and its size. The feed forward method enables the SPP generator 413 to create varied sizes of streams intended for the SPP.

The AAR chip 423 needs to obtain a CDW from the SPP array that resembles the input data (post application of the fuzzy logic rules) without errors. To determine the CDW, the AAR chip is configured to identify the statistical properties such as size, elements (of IACs) at a defined interval. This defined interval is akin to 'time-measurement' in quantum mechanics and is obtained when all fuzzy logics rules FLR1, FLR2 and FLR3 415, 419, 420 are true for a CDW in the SPP. Each CDW is a series of potentially valid CQMEs that contains statistical operators, probabilities and data that accurately, empirically and without errors defines the input data. A series of combination of all elements within each IAC is generated to yield the $AC_{FINAL,g}$ which will be stored in the SPP.

To generate CDWs, strings of all combinations of size 2 elements in PFAC(2), then size 3 elements in PFAC (3) until the maximum size available PFAC (x) are generated. All of the generated PFACs in 413 are then processed by creating combinations in a feed forward way by 414. These processes are described below with reference to FIG. 11C.

Combinations lead to generation of SPP where each stream references a set of CDW:

$$CDW_2 = \{PFAC_{2,1} - PFAC_{2,2} - PFAC_{2,thg}\}$$

$$CDW_3 = \{PFAC_{3,1} - PFAC_{3,2} - PFAC_{3,thg}\}$$

$$CDW_4 = \{PFAC_{4,1} - PFAC_{4,2} - PFAC_{4,thg}\}$$

$$\ldots$$

$$CDW_n = \{PFAC_{n,1} - PFAC_{n,2} - PFAC_{n,thg}\}$$

where each CDW as generated above is stored in the SSP storage 414 (see 1102 of FIG. 11).

The FLR 1 module 415 applies the first FLR to ensure that the data stream is not larger than the original data. A larger CDW stream indicate that the CDW combination formed using the statistical operators is not valid and will not result in application of EI logic on classical streams.

The size of original data input is defined as: $|\text{Matrix}_{size}|$.

The size of $CDW_n$ is defined as: $|CDW_n|$.

To implement FLR1, the FLR1 module 415 applies the following logic on the CDW dataset:

---
If $|$ Size of Matrix$_{size}$ $|$ is equal to $|$ Size of CDW$_n$ $|$ then
mark RULE_1 = "TRUE" for CDW$_n$
  else
RULE_1 = "FALSE" for CDW$_n$
remove CDW$_n$ from memory
  continue processing for remaining CDW$_n$.

---

The FLR2 module 419 applies FLR2 to derive the entropy of the $|\text{Matrix}_{size}|$ and stores it as a global variable for lookups against the entropy of $CDW_n$. Entropy enables calculations of average level of data noise being submitted to output from the HS input. Entropy calculation assists in understanding the noise levels changes post data processing and removes the streams that contains a large amount of "surprise". The AAR chip 423 generates several states of IAE's therefore, it is important to read entropy levels. Entropy calculation may be later used to add Machine Learning (ML) concepts to AAR. ML can further be used to remove noisy or other data streams that carry too much 'surprise' when IAE[1] is generated. Hence, checks for entropy between the current data stream and that of the input reduces processing and memory pressure on this hardware enabling embedded development as an exemplary application. This comparison of statistical data distribution and the deviations result in discard of streams where the variation is higher than a defined amount. The combination of elements with the current stream should have close resemblance to the input stream.

The information gain or entropy of the input is represented by Entropy(T). Complex systems may also use Vapnik-Chervonenkis dimensions or Kolmogorov etc, but to avoid complexities the first enumeration will be referred to as entropy measurement as below. However, other equations or a public/open source methods could be used to obtain the entropy of the streams being/to be processed:

$$\text{Entropy}(T) = -\sum_{i=1}^{2} P(\text{value}_{T,i}) \text{Log}_2(P(\text{value}_{T,i}))$$

Enumerate entropy of current stream $$\text{Entropy}(CDW_n) = = -\sum_{i=1}^{2} P(\text{value}_{CDW,i}) \text{Log}_2(P(\text{value}_{CDW,i}))$$

To calculate difference between the two entropies they are normalised:

Normalized_Entropy($T$)={Entropy($T$)/Log $N$}

Normalized_Entropy($CDW_n$),{Entropy($CDW_n$)/Log $N$}

$\Delta$Entropy={Normalized_Entropy($T$)−Normalized_Entropy($CDW_n$)}

If $\Delta_{Entropy}$ is less than a predefined value then set RULE_2="TRUE" and proceed to check if size of data size from tensor and selected stream is same:

$|$Size of Tensor or Matrix$_{size}|$=$|CDW_n|$ or

RULE_1="TRUE"

If the size is same, then set RULE_2="TRUE" and proceed to check Rule 3, else drop the $CDW_n$ from memory.

The FLR3 module 420 applies the third FLR to ensures that the statistical operators as listed in TIAE[3] are valid and will represent a data stream when applied using ensemble interpretation techniques.

In TIAE[3]$_{s,tg}$ across all sub-elements in the selected $CDW_n$. (where RULE_1 and RULE_2 are "TRUE") the following conditions are met:

The min_value of TIAE [3]$_{s,tg}$ is a singularity,

The max_value of TIAE [3]$_{s,tg}$ is not a singularity,

If SDV of TIAE[3]$_{s,tg}$ is less than 1.5 (or defined values in configuration table, point 32) then diff of min_value and max_value should be a minimum of 1, If SDV of TIAE[3]$_{s,tg}$ is more than 1.5 (as per SDV in configuration table, point 32) then diff of min_value and max_value should be a minimum of 2 (as per SDV in configuration table), The values of SDV are enumerated from the configuration table and can be changed by the operator, If all of the above are "TRUE", and RULE_1="TRUE" and RULE_2="TRUE" then set RULE_3="TRUE" else RULE_3="FALSE", and If any RULEs (RULE_1, RULE_2 or RULE_3) is "FALSE" then drop the $CDW_n$ stream from memory and proceed for next analysis.

The above logic leads to generation of an optimal AC as is denoted by:

$$AC_{FINAL,g} = \{CD\text{-}W_{WHERE\ RULE\_1\ RULE\_2\ \&\ RULE\_3\ ARE\ \text{"TRUE"}}\}.$$

This optimal AC is provided as a final output 416. The AAR chip 423 includes at least three output ports AAR-OP1, AAR-OP2, and AAR-OP3 424, 425 and 426. $AC_{FINAL}$ has three components for each CDW, IAE[1], IAE [2] and IAE [3], which are written to the output ports AAR-OP1, AAR-OP2 and AAR-OP3. The first port AAR-OP1 424 provides the data stream IAE[1], the second port AAR-OP2 425 provides statistical operators of the data stream IAE[2], and the third port AAR-OP3 426 outputs IAE[3].

The final output 416 can be stored in binary and/or provided to another chipset or device further subsequent processing, e.g., to the BFX chipset 428 to be compressed. The modular design of the AAR chip enables parallel processing of multiple inputs and outputs via parallel round robins as counter value for each $AC_{FINAL}$.

In implementations where the final output 416 is provided to a BFX chipset 428 to be compressed, processing by the AAR chip 423 stops or continues based on the variables defined in the configuration table 403, e.g., the value of NRC or MAXC. For example, in time critical environment the operator may choose to compress by 50%. However, in environments such as glacial storage the operator may choose to compress data by 99%.

Example Technique for Generating an Arithmetic Compound

Figure 5:
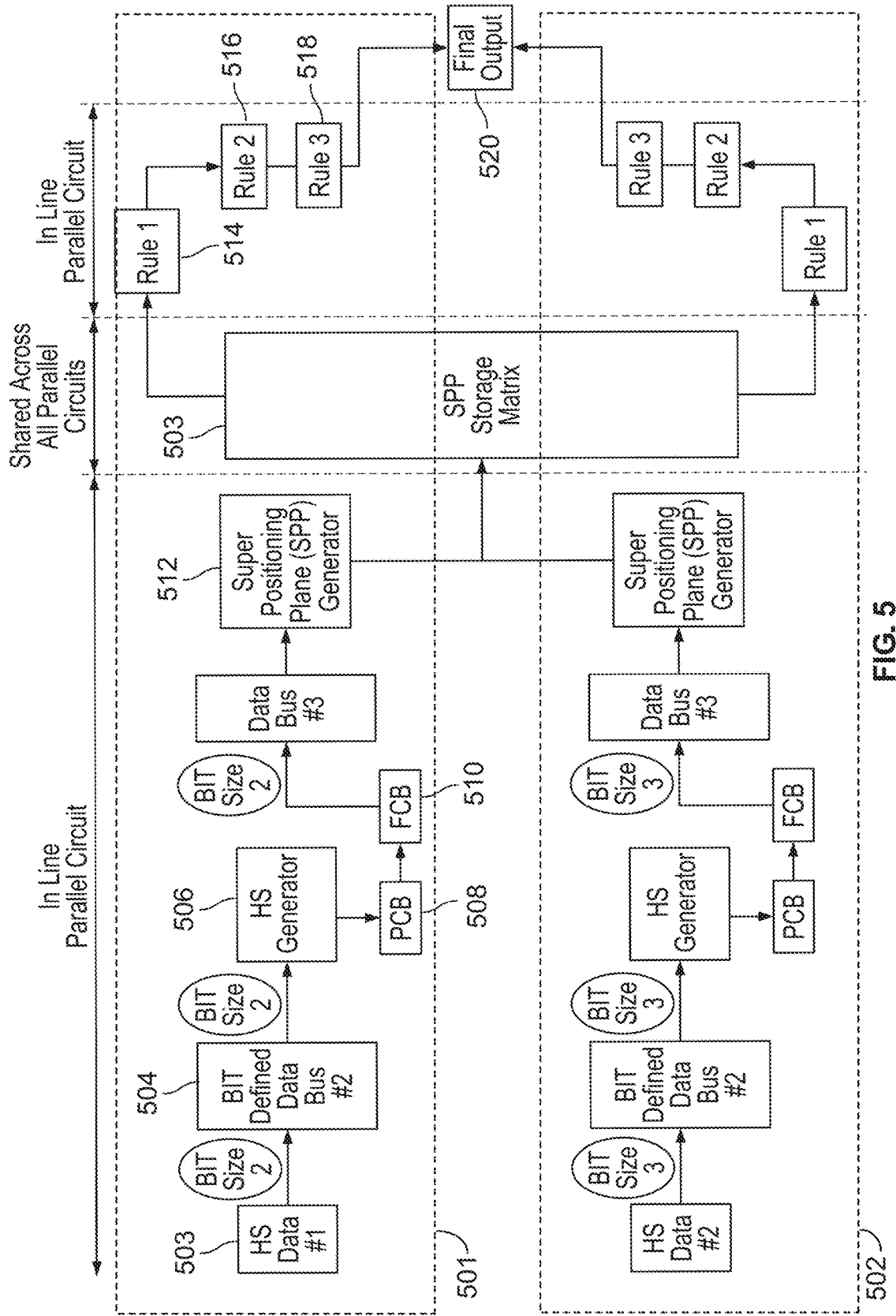
FIG. 5 is a block diagram that shows an example arrangement of AAR chip elements.

FIG. 5 shows an example arrangement of AAR chip elements. As described above, the AAR chip performs three steps to generate an optimal arithmetic compound $AC_{FINAL,g}$. In step one, the Parallel address Bus #1 DB1 407 of FIG. 4 copies the full data input from the FIFO memory 405 to each of multiple HS data memories (e.g., HS data #1), where each HS data memory corresponds to a respective size as defined in the configuration table 403 of FIG. 4. This creates multiple parallel data streams, where each data stream is processed (in parallel) using respective AAR chip elements as described above with reference to FIG. 4.

FIG. 5 shows two of these parallel data streams. The first data stream 501 corresponds to the variable SIZE=2 (which is SIZELL). The second data stream 503 corresponds to the variable SIZE=3. In practical implementations the AAR chip would include more data streams, e.g., 4095 data streams, and for clarity only two data streams are shown in FIG. 5.

The first data stream 501 begins at HS Data #1 503 which accepts the full data input from the Parallel address Bus #1 DB1 407 of FIG. 4. The data input is then passed through the BIT defined data bus #2 504 which partitions the data into chunks of respective sizes (in this case BIT SIZE=2) and provides the partitioned data to the HS generator 506. In FIG. 5 each data stream includes a respective BIT defined data bus #2, e.g., to achieve an in line parallel circuit. However, in some implementations, as shown in FIG. 4, a same BIT defined data bus #2 can be used for each data stream. The BIT defined data bus #2 can contribute to technical advantages achieved by the AAR chip, such as high-speed memory access and the ability to supply additional power to the bus to ensure high speed transmission in non-embedded environments.

The HS generator 506 processes the partitioned data using a HS Storage Space, e.g., HSS (1) 409a of FIG. 4, HS gate, e.g., HSG (1) 411 of FIG. 4, and Hilbert space reconfigurable register, e.g., HSRR (1) 412, as described above with reference to FIG. 4. When the PCB detection module 508 and FCB detection module 510 detect PCB and FCB events the corresponding intermediate arithmetic compounds are provided to the super positioning plane generator 512 via data bus #3.

The super positioning plane generator 512 combines intermediate arithmetic compounds from different data streams to generate SPP storage matrix 503 of classical data waves, as described above with reference to FIG. 4.

The classical data waves in the SPP storage matrix 503 are processed using the fuzzy logic rules described above with reference to FIG. 4, i.e., fuzzy logic rule 1 514, fuzzy logic rule 2 516, and fuzzy logic rule 3 518. The classical data wave (and its corresponding arithmetic elements IAE[1], IAE[2], and IAE[3]) that satisfies the three fuzzy logic rules is provided as a final output 520.

The processing of the second data stream 502 is similar to that described above, with the exception that the data passed between HS data #2, BIT defined data bus #2, HS generator, PCB and FCB detection modules, and data bus #3 have bit sizes=3 instead of =2. For brevity, these details are not repeated.

FIG. 5 shows that in some implementations, some of the operations used to process the parallel data streams can be performed in line in parallel circuits, e.g., operations performed by components 503, 504, 506, 508, 510, 512, 514, 516, and 518. Other operations can be performed by components that are shared across the parallel circuits, e.g., component 503.

Figure 6:
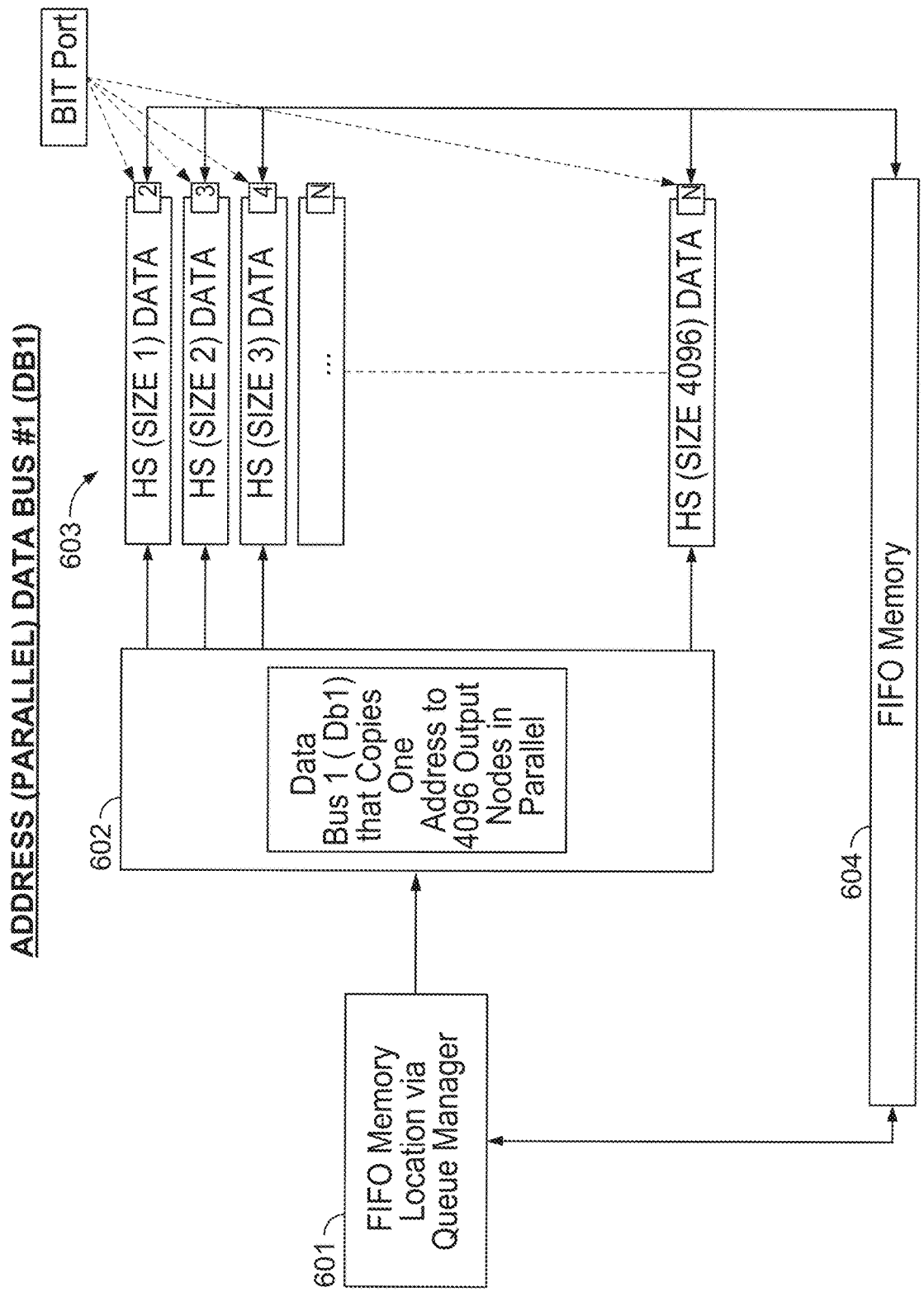
FIG. 6 is a block diagram of an example address parallel data bus #1 (DB1).

FIG. 6 is a block diagram that shows an example address parallel data bus #1 (DB1) 602. The parallel data bus #1 602 is configured to receive address data, e.g., FIFO memory location addresses 601, from a queue manager, e.g., queue manager 406 of FIG. 4. The address data is stored in the FIFO memory 604. To ensure high speed transmission, the FIFO memory 604 stores data and provides a pointer (memory location) to the parallel data bus #1 602 via the Queue Manager.

The parallel data bus #1 602 is configured to copy the received address data to each of multiple HS Data memories 603 via respective output ports and using short length wires for high speed transmission rates. Copying within the parallel data bus #1 602 can be performed via short length wires for high speed transmission rates. The parallel data bus #1 602 akin to a push-based hardware that initiates copying from FIFO memory as soon as the queue manager provides a new memory location. This enables the HS Data memories 603 (see also 408 of FIG. 4) to be informed of availability of new data to be processed.

Copying the received address data to each of the multiple HS Data memories 603 does not split the address data but copies the full input to all memory locations in the HS data memories 603. This can be a high-speed data transfer and is a circular buffer populated by the FIFO memory to ensure data is in queue for next processing. The circular buffer is monitored by the queue manager that nulls memory locations when data from the HS data memories 603 is passed to the next step. The management of storing data in the FIFO memory, transmitting to the parallel data bus #1, and removing from the FIFO memory after the parallel data bus #1 reads the data is undertaken by the queue manager.

FIG. 7 is a block diagram that shows an example bit defined parallel data bus #2 (DB2) 702. The bit defined parallel data bus #2 702 includes multiple nodes, e.g., BIT port 704, which are each configured to receive data from a respective HS Data memory of multiple HS Data memories 701 over a respective wire. The HS Data memories 701 have a limited size circular memory 705 and read data to be transmitted to the bit defined parallel data bus #2 702 from the limited size circular memory 705.

Each BIT port included in the bit defined parallel data bus #2 702 accepts a respective sized data input, e.g., 2 BIT port accepts data of size 2, 3 BIT port accepts data of size 3 etc. The parallel data bus #2 is configured to transparently send data from input to output. In the example shown in FIG. 7, the parallel data bus #2 has 4095 input and 4095 output ports (because in this example SIZEUL=4096.)

Each BIT port included in the bit defined parallel data bus #2 702 outputs a respective sized data output, e.g., 2 BIT port outputs data of size 2, 3 BIT port outputs data of size 3 etc. The output data is stored in a respective HS Storage space of multiple HS Storage spaces 703, e.g., an output from 2 BIT port is stored in HS (1) storage space and an output from 3 BIT port is stored in HS (2) storage space.

FIG. 8 is a block diagram that shows example intermediate arithmetic elements IAE[1], IAE[2], and IAE[3]. The first intermediate arithmetic element IAE[1] 801 contains the original input data stream 817, e.g., the input data received by the AAR chip, and multiple sets of values that are associated with the original input data stream 817. These values form an alternative, quantum-inspired representation of the original input data stream, referred to herein as a CQME.

Each set has an associated size, where the sizes are specified by the SIZE variable in the AAR chip configuration table. For example, the first intermediate arithmetic element IAE[1] 801 can include 4096 sets of data. The size associated with the data set specifies a partitioning of the input data stream 817 into blocks. For example, if the size is equal to 2 then the input data stream, e.g., 000000011011, can be partitioned into blocks of length 2, e.g., 00, 00, 00, 01, 10, 11. As another example, if the size is equal to 3 then the input data stream, e.g., 000000011011, can be partitioned into blocks of length 2, e.g., 000, 000, 011, 011.

Each set specifies multiple values that correspond to respective blocks of the partitioned input data stream for the set. The multiple values include a pattern type PTYP, e.g., PTYP 804, a pattern structure PSTRUC, e.g., PSTRUC 805, and a data pattern, e.g., data pattern 806.

The data pattern values 806 can be defined for each set of data and are based on the size associated with the data set. The data pattern values correspond to the type of blocks included in the partitioned data set (or that could be included in a partitioning of a data set). For example, if the size is equal to 2 then the input data stream is partitioned into blocks of length 2. Because the data stream is a binary data stream, this means that each block can either take the value 00, 11, 01, 10. These four values 00, 11, 01, 10 are the Data Patterns (DP) for the set associated with size equal to 2. As another example, the Data Patterns (DP) for the set associated with size equal to 3 are 000, 001, 010, 100, 011, 101, 110, 111.

The pattern type PTYP can be defined for each block of the partitioned data. The pattern type PTYP 804 of a block can be viewed as a classical equivalent to a measure of quantum entanglement 818. The pattern type PTYP is one bit and can therefore take the value zero or one. The pattern type PTYP is equal to the value of the first bit in each block. For example, the PTYPs of blocks 00, 00, 00, 01, 10, 11 are 0, 0, 0, 0, 1, 1, respectively. As another example, the PTYPs of blocks 000, 000, 011, 011 are 0, 0, 0, 0.

The pattern structure PSTRUC can be defined for each block of the partitioned data. The pattern structure PSTRUC 805 of a block is a sequence of bits of length SIZE—1 and includes bits in a block that follow the pattern type PTYP for the block. That is, the pattern structure PSTRUC of a block is equal to the block, excluding the first bit in the block. For example, the PSTRUCs of blocks 00, 00, 00, 01, 10, 11 are 0, 0, 0, 1, 0, 1, respectively. As another example, the PTYPs of blocks 000, 000, 011, 011 are 00, 00, 11, 11.

The second intermediate arithmetic element IAE[2] 802 also includes multiple sets of values that are associated with the original input data stream. As described above, each set has an associated size, where the size associated with the data set specifies a partitioning of the input data stream 817 into blocks. The multiple values included in each set include counts, e.g., count 807, and register values, e.g., register value 808.

In each set, the register values are indices that reference the Data Patterns (DP) described above. That is, the register values in a set with a respective associated size references Data Patterns (DP) that correspond to the same associate size. For example, if the size is equal to 2 then the input data stream is partitioned into blocks of length 2 and the four values 00, 11, 01, 10 are the Data Patterns (DP) for the set associated with size equal to 2. The register values are then four indices that reference the four Data Patterns (DP). The counts represent a number of times that a data pattern is encountered in the original input data stream. That is, as each block in the partitioned data set is read, the count value is updated based on the encountered data pattern. For example, when IAE[2] is created it will have null values for each count, and as the input data stream is read the counts are updated based on the Data Patterns (DP) encountered. For example, after the partitioned input stream 00, 00, 00, 01, 10, 11 is read, the data pattern 00 will have a count of three, the data pattern 01 will have a count of one, the data pattern 10 will have a count of one, and the data pattern of 11 will have a count of one.

The third intermediate arithmetic element IAE[3] 803 is also referred to as an ancilla matrix in this disclosure. The third intermediate arithmetic element IAE[3] 803 is generated by the AAR chip as an unpopulated two-dimensional null matrix. The elements of the ancilla matrix are then populated with values using IAE[2]. The elements of the ancilla matrix correspond to four variables: a first address pointer in IAE[2] 809 that represents size s, a second address pointer in IAE[2] 811 that represents g the global identifier, a highest register value 810, and a lowest register value 812. These variables are referred to herein as statistical operators because they can be used to empirically generate statistical probabilities for decompression.

FIG. 9A is a block diagram of an example process for creating a register matrix in IAE[2]. At stage (A) of the example process, data 901 is read from the current Hilbert space storage HSS. In the example shown in FIG. 9A, the data 901 is shown as being partitioned into blocks of size SIZE=2 and the current Hilbert space storage is HSS(1).

During stage (B) of the example process, the read data is stored in intermediate arithmetic element IAE[1] 902 as register values R(1,1), etc. At this stage, the entries of IAE[2] 903 and IAE[3] 904 are null. At stage (C) of the example process, the register size is determined. For Hilbert storage space HSS(1), the register size is equal to two.

During stage (D) of the example process, reconfigurable memory registers 909 are created and added to IAE[2] so that the memory blocks are designed to hold 2 bit data. This ensures optimal use of on-board memory. Box 905 shows an example a memory storage snapshot.

During stage (E), IAE[2] is prepared in HSS(1). The first column 906 of IAE[2] 911 holds the possible Data Patterns (DP), which are defined as per the input binary size. The second column 907 holds index values for the Data Patterns (DP) and the third column 908 will hold the repetition counts of the Data Patterns (DP). The first column 906 represents the dual utility of the matrix. At stage (F) IAE[2] has been created with memory registers which are ready to be filled with data, as described in more detail below with reference to FIG. 9B.

FIG. 9B is a block diagram of an example process for filling a register matrix in IAE[2] with data. Continuing from FIG. 9A, IAE[2] is created as a matrix with null entries. The entries are updated while data is read from IAE[1] for the current HS storage space. During stage (A) of the example process, the input data stream 910 is read from IAE[1]. As the input data stream is read, the data stream is matched in real time with Data Patterns (DP) and values in IAE[2] are updated.

For example, in the example shown in FIG. 9B, at stage (B) the first value in the data stream is read (here the term "value" refers to a portion of partitioned bits, where the length of the portion is defined by the current SIZE). In this example, the first value is 00. Therefore, at stage (C), the count of the data pattern "00" in IAE[2] is incremented by 1. Similarly, at stage (D) the second value in the data stream is read. In this example, the second value is also 00. Therefore, at stage (E), the count of the data pattern "00" in IAE[2] is again incremented by 1.

This process repeats until a PCB event and a FCB event are detected, as described below with reference to FIG. 9C.

FIG. 9C is a block diagram that shows the termination of Hilbert space write operations for IAE[1] and IAE[2]. Continuing from FIG. 9B, the input data stream is read from IAE[1] for the current HS storage space. The reading of data does not stop until an FCB event is identified.

Table 920 shows an example flow of circuit breaker events. At an initial step 922, each count value in registers $RV_1$, $RV_2$, $RV_3$, and $RV_4$ are null. After the first value of the data stream is read, one count will be added to a corresponding register. In this example, a count is added to register $RV_1$ at step 924. This process repeats, until at some point only two registers have a zero count (that is, Data Patterns (DP) corresponding to these registers have not been read from the data stream). A PCB event 926 is then triggered when a next count causes one of the two registers to lose the zero count. If a PCB event is triggered, the register value that lost the '0' at the PCB event is stored as $RV_iPCB\_1S$. The PCB event is an event that occurs in IAE[2] during reading of a data stream when only one data pattern holds a value of zero. This event (PCB) occurs when the previous write event to the IAE[2] held two Data Patterns (DP) that contained the value of zero while the current write event to IAE[2] leads to only one of the previous two data pattern holding a value of zero.

The reading of the data stream continues until only one of the two registers has a zero count. A FCB event 928 is triggered when a next count causes the only one register to lose the zero count. If a FCB even is triggered, the register value that lost the '0' at the FCB event is stored as $RV_iPCB\_1N$. A FCB event is an event that occurs in IAE[2] during reading of a data stream when none of Data Patterns (DP) holds a value of zero. This event (FCB) occurs when the previous write event to the IAE[2] had one data pattern that contained the value of zero while the current write event to IAE[2] leads to none of Data Patterns (DP) holding a value of zero.

In some implementations a PCB and FCB event will not occur within a predetermined time interval or number of write events, in which case the corresponding data stream is discarded. However, when a PCB and FCB event occurs, data from IAE[1] is loaded into a temporary variable (TIAE [1], [2], [3]) to be passed to SPP storage. The FCB event provides a solution to the time interval measurement problem for any super positioned element. In this case the super positioned stream consists of binary values.

Figure 10:
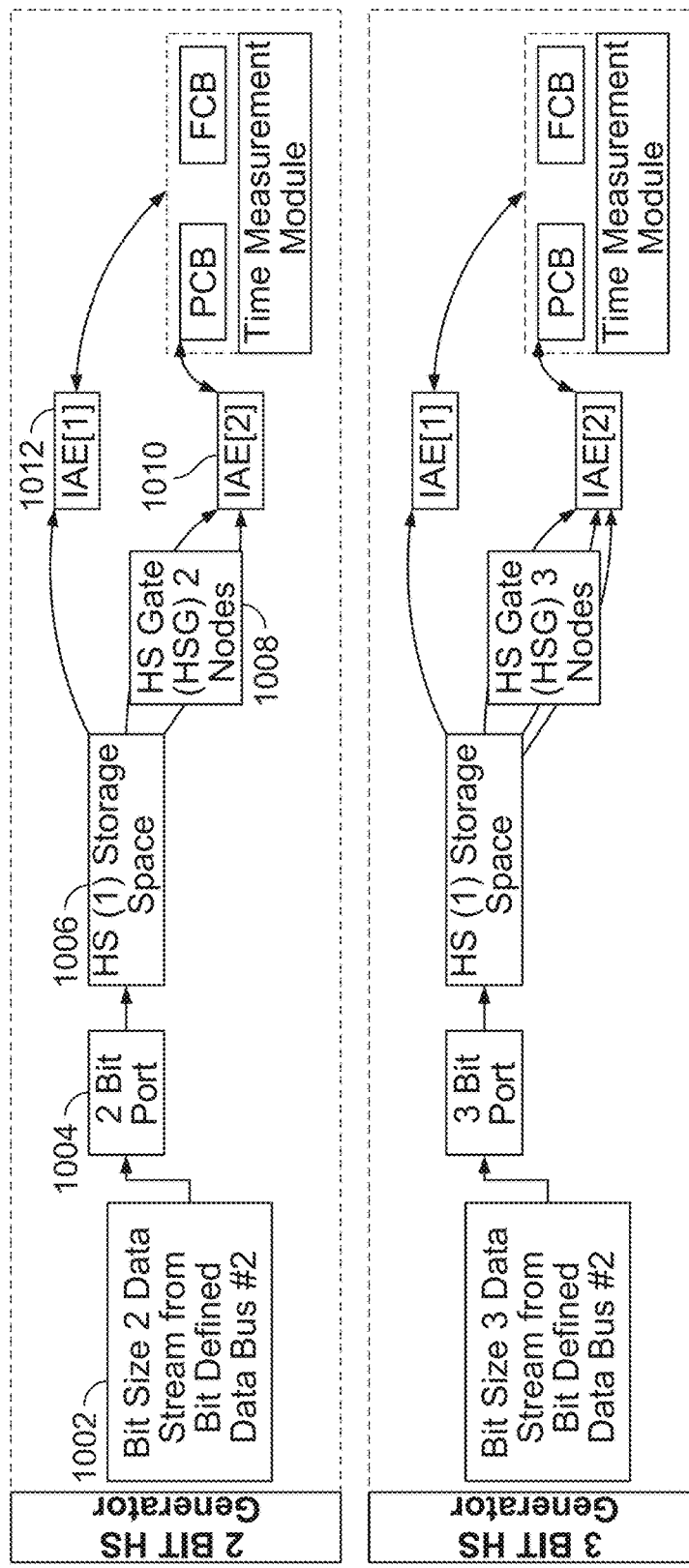
FIG. 10 is a block diagram of an example HS generator architecture.

FIG. 10 is a block diagram of an example HS generator architecture. For convenience, FIG. 10 shows two data streams that arrive from respective HS data memories, e.g., memories 408 of FIG. 4. However, the HS generator can process multiple data streams in parallel, as described above with reference to FIG. 4.

The first data stream corresponds to SIZE=2 and is processed by a 2 BIT HS generator circuit included in the example HS generator architecture. A data stream 1002 with BIT size 2 is received by the 2 BIT HS generator circuit via a bit defined Data Bus #2. The data stream 1002 is transmitted via a 2 bit port 1004 to a HS storage space HS (1) Storage Space 1006. The data is then transmitted to a HSG gate, e.g., HSG 2 Node 1008. The HS gates included in the HS generator are specifically designed to copy data in predetermined sizes, e.g., two bits at a time for the 2 BIT HS generator circuit or more generally n bits at a time for the n BIT HS generator circuit. In other words, the number of nodes in the ports of the HS gates change as per the HS stream size, e.g., from 2 to 4096. The number of nodes per HS gate are pre-defined and built into the hardware design. This enables high speed processing and optimal memory allocation as the input, processing and output sizes are known without wasting previous milliseconds in defining variable sizes and memory allocation.

The Hilbert Space (HS) gate sends data to the IAE[2] register 1010 and is transparently appended to IAE[1] 1012. Data patterns of elements in IAE[1] 1012 are read (as described above with reference to FIGS. 9A-9C) and their number of repetitions is stored in IAE[2] 1010.

The HS Generator has the ability to fill data in IAE[2] in parallel by implementation of dedicated wires from the HS storage space to the corresponding IAE[2]. The logic of the number of parallel wires is implemented as per Table 1 of FIG. 10.

FIG. 11A is a block diagram that shows operations performed by the super positioning plane (SPP) generator. The SPP generator reads data from each HS storage space (for each value of the SIZE variable). The SPP generator generates all possible combination of data (akin to generation of super positioning data of a wave) stores the combinations in SPP storage. The SPP generator can generate all possible combinations from TIAE[1] while creating references between applicable TIAE[2] and TIAE[3].

FIG. 11B shows example PCB and FCB detection charts, where data from IAE[1] is plotted on a map to represent a series of waves. Each chart in FIG. 11B includes an x-axis that represents register values and a y-axis that represents data pattern counts. Chart 1 corresponds to initialisation of IAE[2], where partitioned data from the input data stream has not been read. In chart 1, the wave is silent/collapsed. Chart 2 corresponds to a time after which partitioned data from the input data stream has been read, and corresponding data pattern counts have been added to IAE[2]. In chart 2, the wave starts to rise due to the addition of the new counts in the data pattern register values. Chart 3 corresponds to an undefined time in the future at which only two data patterns register values are null. In chart 3, the two null data patterns register values are circled. Chart 4 corresponds to a time at which one of the two data patterns register values that were null in chart 3 has a count appended to it and is therefore no longer null. The PCB event therefore occurred at a time corresponding to chart 3. Chart 5 corresponds to a time at which only one remaining data pattern register value is null. In chart 5, the null data pattern register value is circled. Chart 6 corresponds to a time at which the one remaining data pattern register value has a count appended to it and is therefore no longer null, meaning no data pattern register values have a null count. The FCB event therefore occurred at a time corresponding to chart 5.

The events shown in chart 3 (for the PCB event) and charts 5 and 6 (for the FCB event) are timed events that force the AAR chip to terminate reading the input data stream as an ideal time to yield a result in a quantum system. The detection of the FCB event triggers the creation of an IAC (which is inspired from quantum information theory). By construction, when the wave function is positive to the FCB event (that is, when there is a single null value in the counts included in the IAE[2] matrix) then there is a certain probability that the current temporal frame yields a IAC with the wave reading action by the AAR chip.

FIG. 11C is a block diagram that shows an example process for generating an SPP storage matrix and applying fuzzy logic to obtain a final output.

At step 1103 of the process, IACs of size 2 are combined to form a PFAC. In FIG. 11C, each dot represents an IAC and the combination of dots joined together as a string represent a PFAC.

At step 1104 of the process, a series of combination of all elements within each IAC is generated to yield an $AC_{FNAL}$, g which will be stored in the SPP. To generate CDWs, strings of all combinations of size 2 elements in PFAC (2), then size 3 elements in PFAC (3) until the maximum size available PFAC (x) are generated. At step 1104, all PFACs of all IAC sizes are generated as undertaken by the super positioning plane generator 413 of FIG. 4.

At steps 1105, 1106, 1107, and 1108, all of the generated PFACs are processed by creating combinations in a feed forward manner. The generation is not limited to the techniques listed in these examples but is an extensive combination driven process that generates candidate combinations (CDW) of all IACs within all PFACs. As an example, at step 1105, the first stream of SPP or CDW1 is generated for size 3 with three IAC or combination 1 which is element 1 in PFAC (size 1), element 2 in PFAC (size 2) and element 3 in PFAC (size 3). As another example, at step 1106, the second stream for SPP or CDW2 is generated for size 3 with three IAC with element 2 in PFAC (size 1), element 2 in PFAC (size 2) and element 3 in PFAC (size 3). This is implemented for all SIZES by exhaustive combinations and creating several CDW that are saved in the SPP at step 1109.

At steps 1110, 1112, 1114 fuzzy logic rules are applied to the saved combinations. Application of the first fuzzy logic rule FLR1 removes combinations that do not comply to the length requirements described above with reference to FIG. 4. Application of the second fuzzy logic rule FLR2 removes combinations that do not comply with the entropy requirements described above with reference to FIG. 4. Application of the third fuzzy logic rule FLR3 removes combinations that do not comply with the frequency distribution requirements described above with reference to FIG. 4. After steps 1110, 1112, 1114, a final output stream with correct statistical properties is obtained at step 1116.

Figure 12A:
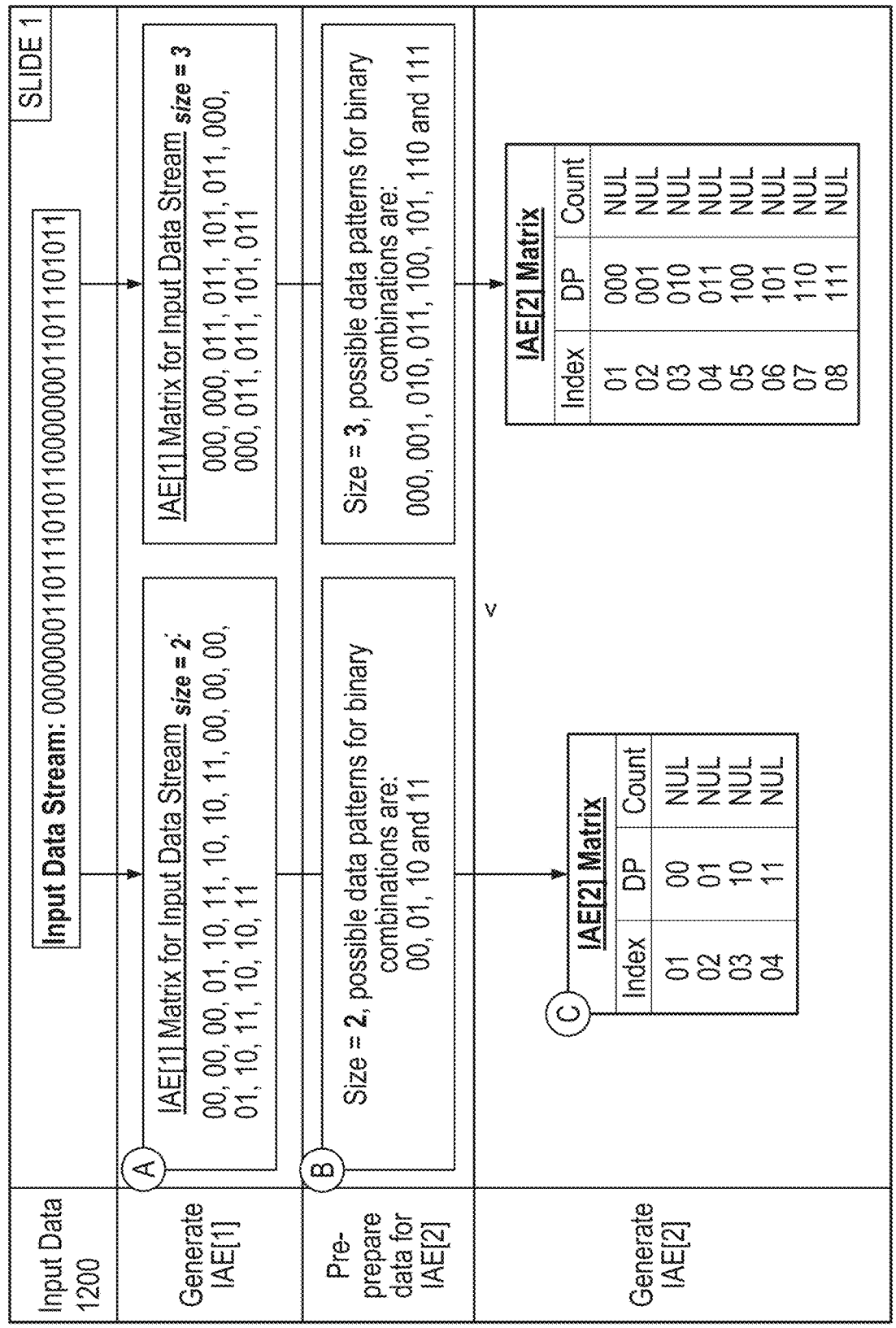
FIG. 12A is a block diagram that illustrates the generation of IAE[1] and IAE[2] from an example input binary stream.

FIG. 12A is a block diagram that illustrates the generation of IAE[1] and IAE[2] from an example input binary stream. In this example, the input data is the binary stream 1200. Stage (A) shows how the input data is partitioned to generate IAE[1]. The binary stream is partitioned according to the values of the SIZE variables. In FIG. 12A, for illustrative purposes, the binary stream 1200 is partitioned for SIZE=2 and SIZE=3. For example, for SIZE=2 the binary stream 0000000110 . . . is partitioned as 00, 00, 00, 01, 10, . . . and for SIZE=3 the binary stream is partitioned as 000, 000, 011, . . . . The partitioned data is inserted into an IAE[1] matrix of SIZE=2 and IAE[1] for SIZE=3, respectively. The IAE[1] matrix is a one dimensional linear matrix.

Stage (B) shows the possible Data Patterns (DP) for SIZE=2 and SIZE=3. Classical mathematics defines the number of possible Data Patterns (DP) for each size. For SIZE=2, the possible Data Patterns (DP) are limited to four Data Patterns (DP) in total: 00, 01, 10, and 11. For SIZE=3, the possible Data Patterns (DP) are limited to eight Data Patterns (DP) in total: 000, 001, 010, 100, 110, 101, 001, and 111.

Stage (C) shows example IAE[2] matrices generated for the data presented in stages (A) and (B). For SIZE=2, the IAE[2] matrix has four index locations that each represents a respective data pattern. For SIZE=3, the IAE[2] matrix has eight index locations that each represents a respective data pattern. Upon creation of the IAE[2] matrices, the count is NULL for all index locations. Populating entries of the IAE[2] matrices is described below with reference to FIG. 12C.

Figure 12B:
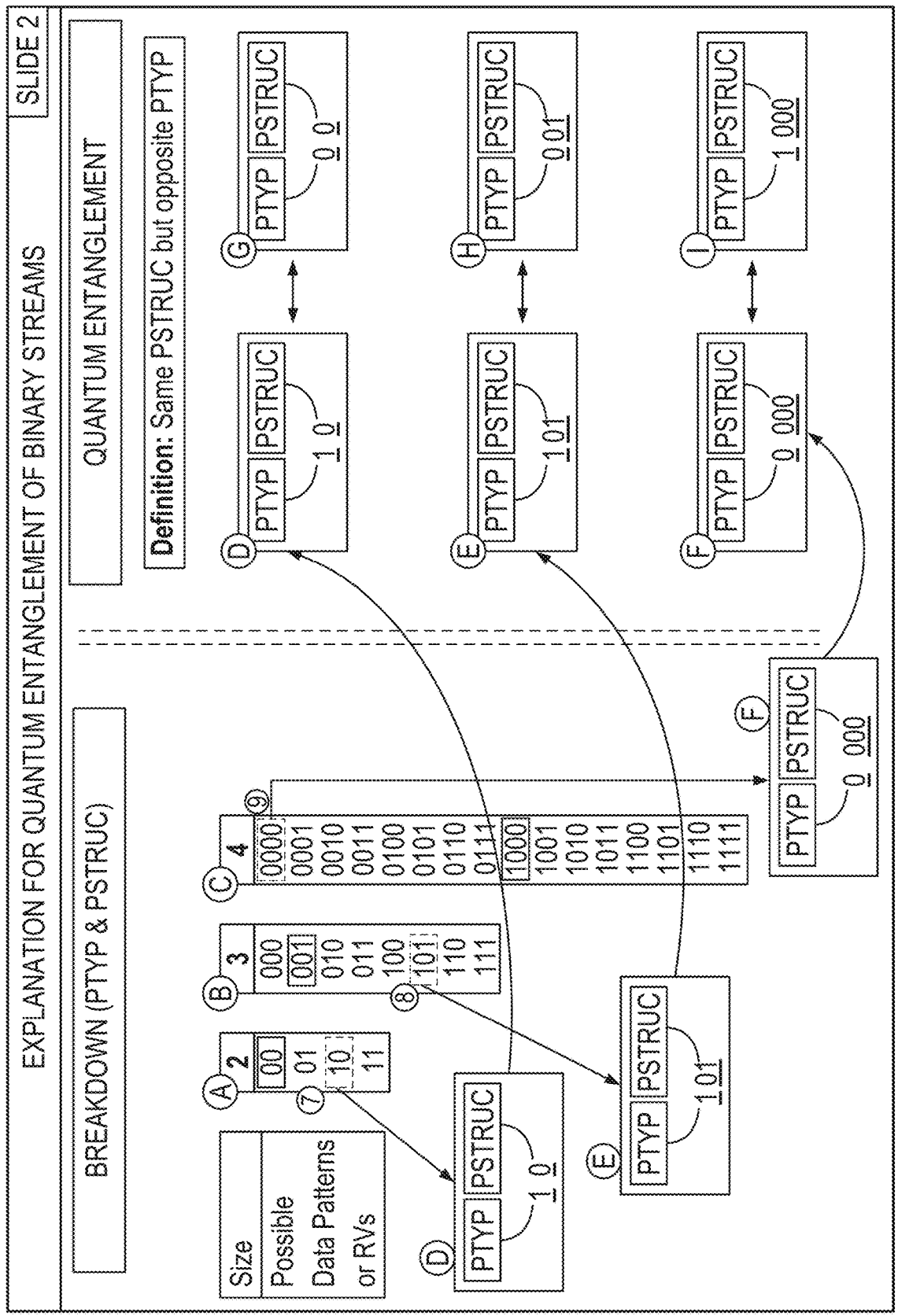
FIG. 12B is a block diagram that shows example pattern types, pattern structures, and entangled Data Patterns (DP)

FIG. 12B is a block diagram that shows example pattern types, pattern structures, and entangled Data Patterns (DP) for the example input binary stream of FIG. 12A. As described above with reference to FIG. 4, Data Patterns (DP) for any value of the SIZE variable have two components—PTYP and PSTRUC. PTYP is a (classical) measure of quantum entanglement or pattern type and is given by the first bit in a data pattern. PSTRUC holds the remainder of bits in the data pattern.

Table (A) in FIG. 12B shows the possible Data Patterns (DP) for SIZE=2. As an example, the PTYP and PSTRUC of data pattern 10 is shown in Table (B). In this example, the first bit is "1" and this is the PTYP. The remaining bit in the data pattern is "1" and this is the PSTRUC.

Table (B) in FIG. 12B shows the possible Data Patterns (DP) for SIZE=3. As an example, the PTYP and PSTRUC of data pattern 101 is shown in Table (E). In this example, the first bit is "1" and this is the PTYP. The remaining bits in the data pattern is "01" and this is the PSTRUC.

Table (C) in FIG. 12B shows the possible Data Patterns (DP) for SIZE=4. As an example, the PTYP and PSTRUC of data pattern 0000 is shown in Table (F). In this example, the first bit is "0" and this is the PTYP. The remaining bit in the data pattern is "000" and this is the PSTRUC.

FIG. 12B also shows how two Data Patterns (DP) can be correlated or (classically) entangled with each other. A data pattern is defined in this disclosure as being correlated or entangled with another data pattern if the other data pattern has an opposite PTYP and a same PSTRUC.

For example, table (G) includes the data pattern 00. This data pattern is entangled with the data pattern 10 shown in table (D), since the PTYP of data pattern 00 is 0 (the opposite of the PTYP of data pattern 10) and the PSTRUV of data pattern 00 is 0 (the same as the PSTRUC of data pattern 10).

As another example, table (H) includes the data pattern 001. This data pattern is entangled with the data pattern 101 shown in table (E), since the PTYP of data pattern 001 is 0 (the opposite of the PTYP of data pattern 101) and the PSTRUV of data pattern 001 is 01 (the same as the PSTRUC of data pattern 101).

As another example, table (I) includes the data pattern 1000. This data pattern is entangled with the data patter 0000 shown in table (F), since the PTYP of data pattern 1000 is 1 (the opposite of the PTYP of data pattern 0000) and the PSTRUV of data pattern 1000 is 000 (the same as the PSTRUC of data pattern 0000).

The definition of classical entanglement used in this disclosure is similar to the quantum entanglement of an electron, where electrons have opposite spins but similar properties. The PTYP can be viewed as a spin value and the PSTRUC can be viewed as the electron structure which is same for two Data Patterns (DP). In all binary Data Patterns (DP) there are an equal number of PSTRUC values which have separate PTYP values. Hence, each data pattern is entangled with a respective data pattern for any binary size from a minimum of SIZE=2.

Figure 12C:
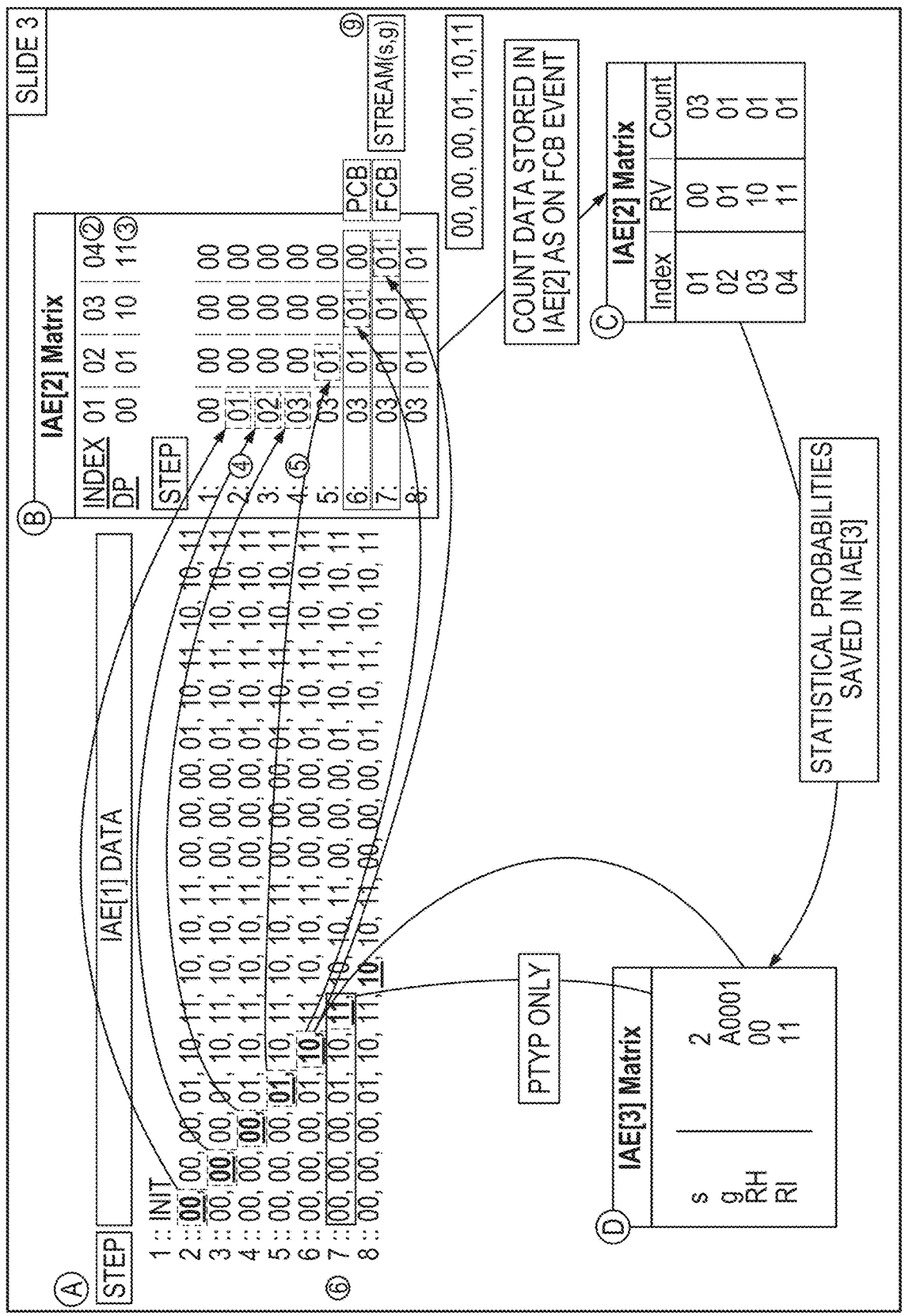
FIG. 12C is a block diagram that illustrates reading an example input binary stream and appending the count value to IAE[2].

FIG. 12C is a block diagram that illustrates reading the example input binary stream of FIGS. 12A and 12B and appending the count value to IAE[2]. In FIG. 12C, table (A) represents IAE[1]. For illustrative purposes, the table is divided into two sections. The first section of table (A)

contains a step number and the second section of table (A) contains comma separated vales of the input data. Each comma separated value is referred to below as a packet. FIG. 12C shows reading the example input binary stream for SIZE=2, however the techniques can be applied to any binary size.

The input data stream in IAE[1] (FIG. 12C, table A) is read and appended to the IAE[2] matrix FIG. 12C, table (B) which is split into three sections: the data pattern index, the Data Patterns (DP), and the remaining step data. The remaining step data is listed as two columns. The first column represents step numbers (similar to the steps in table (A)). The second column includes rows that contain a snap shot of the count data in IAE[2]. The IAE[2] matrix is shown in table (C) and has 4 index values that each represent a respective data pattern for binary of SIZE=2.

At step 1 (shown in both table (A) and table (B)) the IAE[2] matrix is created as a matrix of null values, as described above with reference to FIG. 12A. At step 2, the first 2-bit data packet is read. In this example, the first data packet is 00. Therefore, a count for data pattern 00 at index 1 is appended to IAE[2]. At step 3, the second data packet is read. In this example, the second data packet is also 00. Therefore, another count for data pattern 00 at index 1 is appended to IAE[2]. The count for data pattern 00 at index 1 is therefore 2. All other indices still have a null count. At step 4, the third data packet is read. In this example, the third data packet is also 00. Therefore, another count for data pattern 00 at index 1 is appended to IAE[2]. The count for data pattern 00 at index 1 is therefore 3. All other indices still have a null count.

At step 5, the fourth data packet is read. In this example, the fourth data packet is 01. Therefore, a count for data pattern 01 at index 2 is appended to IAE[2]. The count for data pattern 00 at index 1 is therefore 3, the count for data pattern 01 at index 2 is 1, and the other two indices 3 and 4 still have a null count.

At step 6, the fifth data packet read. In this example, the fifth data packet is 10. Therefore, a count for data pattern 10 at index 3 is appended to IAE[2]. The count for data pattern 00 at index 1 is therefore 3, the count for data pattern 01 at index 2 is 1, the count for data pattern 10 at index 3 is 1, and the count for data pattern 11 at index 4 is still null. As described above with reference to FIG. 4, at this point the logic implemented by the AAR chip dictates that a PCB event has occurred (since IAE[2] has lost all but one of its null values.) Furthermore, in the next step (step 7) the value of the single null will be lost. This confirms the PCB event.

At step 7, the sixth data packet read. In this example, the sixth data packet is 11. Therefore, a count for data pattern 11 at index 4 is appended to IAE[2]. The count for data pattern 00 at index 1 is therefore 3, the count for data pattern 01 at index 2 is 1, the count for data pattern 10 at index 3 is 1, and the count for data pattern 11 at index 4 is 1. As described above with reference to FIG. 9C, at this point the logic implemented by the AAR chip dictates that a FCB event has occurred (since IAE[2] has lost all of its null values).

When the FCB event is detected, the stream of read data is allocated an index (s,g) where s represents size (in this case SIZE=2) and g is a global identifier. The count values for the data stream is stored in IAE[2], as shown in table (C). The data or properties of the data stored in IAE[2] is then copied to IAE[3], as shown in table (D). The copied data is referred to as statistical probabilities of the stream. These statistical probabilities include the value of the SIZE variable (in this case SIZE=2), the global identifier g (a pointer to a memory location where the stream is stored), a variable $R_h$ that represents the highest register value (in this case the data pattern 00 has the highest count, so the highest register value is 00), and a variable $R_l$ that represents the index of the lowest value (in this case the data pattern 11 has the lowest count and was the last pattern to be read before the FCB event). In some implementations the last pattern to be read before the FCB even can be marked in the IAE[2] matrix or sent directly to the IAE[3] matrix).

After IAE[2] and IAE[3] are updated and stored, the reading of the input binary stream resumes and new IAE[2] and IAE[3] matrices are created and updated accordingly. This process is repeated until the complete input binary stream has been read.

Figure 12D:
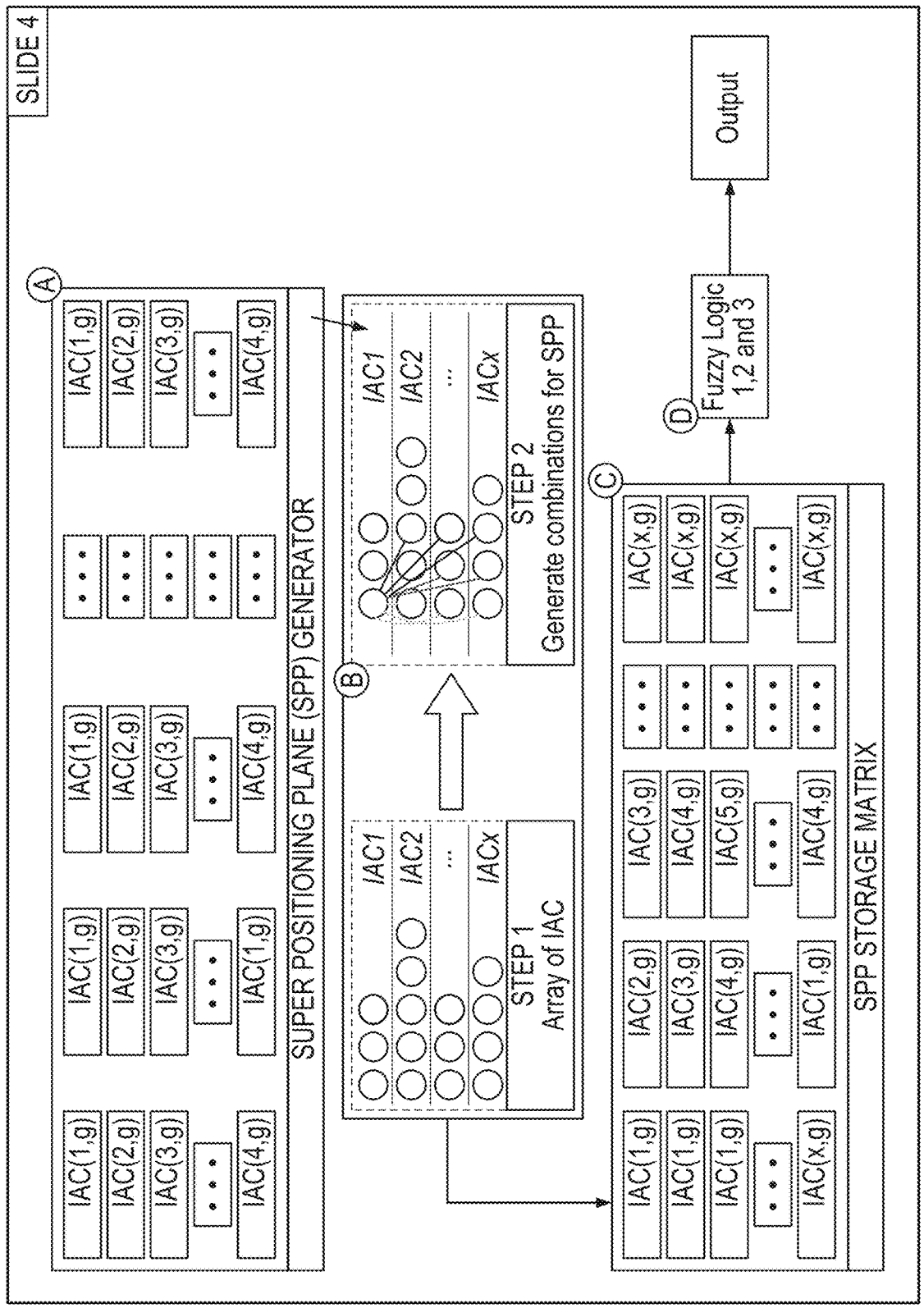
FIG. 12D is a block diagram that shows an example process for generating a super positioning plane of intermediate arithmetic compounds and obtaining a final arithmetic compound as output.

FIG. 12D is a block diagram that shows an example process for generating a super positioning plane of intermediate arithmetic compounds and obtaining a final arithmetic compound as output.

At stage (A), data associated with the streams generated according to the process described above with reference to FIG. 12C is stored in the SPP generator. The streams are stored as Intermediate Arithmetic Compounds (IAC), where each IAC contains the stream (IAE[1]), size, global identifier, IAE[2], and IAE[3].

At stage (B), the IACs are indiscriminately combined to generate different combinations of IACs. At stage (C), the combined IACs are stored as a SPP storage matrix of different lengths. Each combination of streams in the SPP storage matrix are provided for Fuzzy Logic analysis at stage (D), which produces a final arithmetic compound output.

The BFX Chip: Example Techniques for Compressing a CQME to Achieve Logical Reverse Computing As described above with reference to FIGS. 1 and 2, the Binary Fourier X-gate (BFX) Chip is configured to accept input data, e.g., data received from the AAR chip described above, and perform data compression through application of principles from the ensemble interpretation of quantum mechanics.

For example, an output from the AAR chip can be accepted by the BFX chip in three ports—the input data stream (originally received as input by the AAR chip) can be provided on one input port BFX-IP1, statistical operators in IAE[2] can be provided on a second input port BFX-IP2, and statistical probabilities can be provided on a third input port BFX-IP3. The BFX chip uses the statistical probabilities to generate a compressed CQME data stream. Data from the first input port BFX-IP1 and the third input port BFX-IP3 can be sent to specifically designed one-way swap gates (SWAPG) that compress the data using statistical probabilities. The BFX chip outputs a CQME on a first output port BFX-OP1. The BFX chip also outputs an ancilla matrix on a second output port BFX-OP2. The outputs can be saved in local memory and/or transmitted to an external device. The two output streams can be combined without a delimiter, therefore the external device can treat the output as a single stream.

In some implementations the external device can be AAR chip, e.g., to implement another round of compression. That is, a compressed data stream output can be iteratively provided for re-compression as it does not use classical compression information theory. In classical compression, an algorithm undertakes one round of compression and a second round of compression results in an opposite effect, that is the second round of compression increases the size instead of data compression. This happens since classical compression information theory searches for repetitions or common patterns and then replaces them via a reference in an index header. As classical compression changes the entropy of the input file it limits the algorithm from performing lookup(s) for repetitions as repetitions and patterns cease to exist.

Application of principles of the ensemble interpretation of quantum mechanics ensures that the entropy of the CQME data stream does not change and can be compressed again. The BFX chip, akin to the AAR chip, also forms a quantum-classical interface as it can accept data in binary format, process data using the ensemble interpretation and other principles of quantum mechanics, and provide the output in binary format. The BFX chip can store inputs and outputs in memory as a lookup table, where the number of inputs and outputs is theoretically unlimited and in practice only implemented by the capabilities of the chip hardware. In some implementations the lookup table can also be compressed, to increase optimal usage of storage space and theoretically to ensure that the module does not runs out of storage space. Hence, logical reverse computing is achieved because data is not lost and is retrievable from storage memory.

The processes and components described below with reference to the BFX chip are designed to interact with the processes and components described above with reference to the AAR chip, although can also accept appropriate data inputs from other sources.

Figure 13:
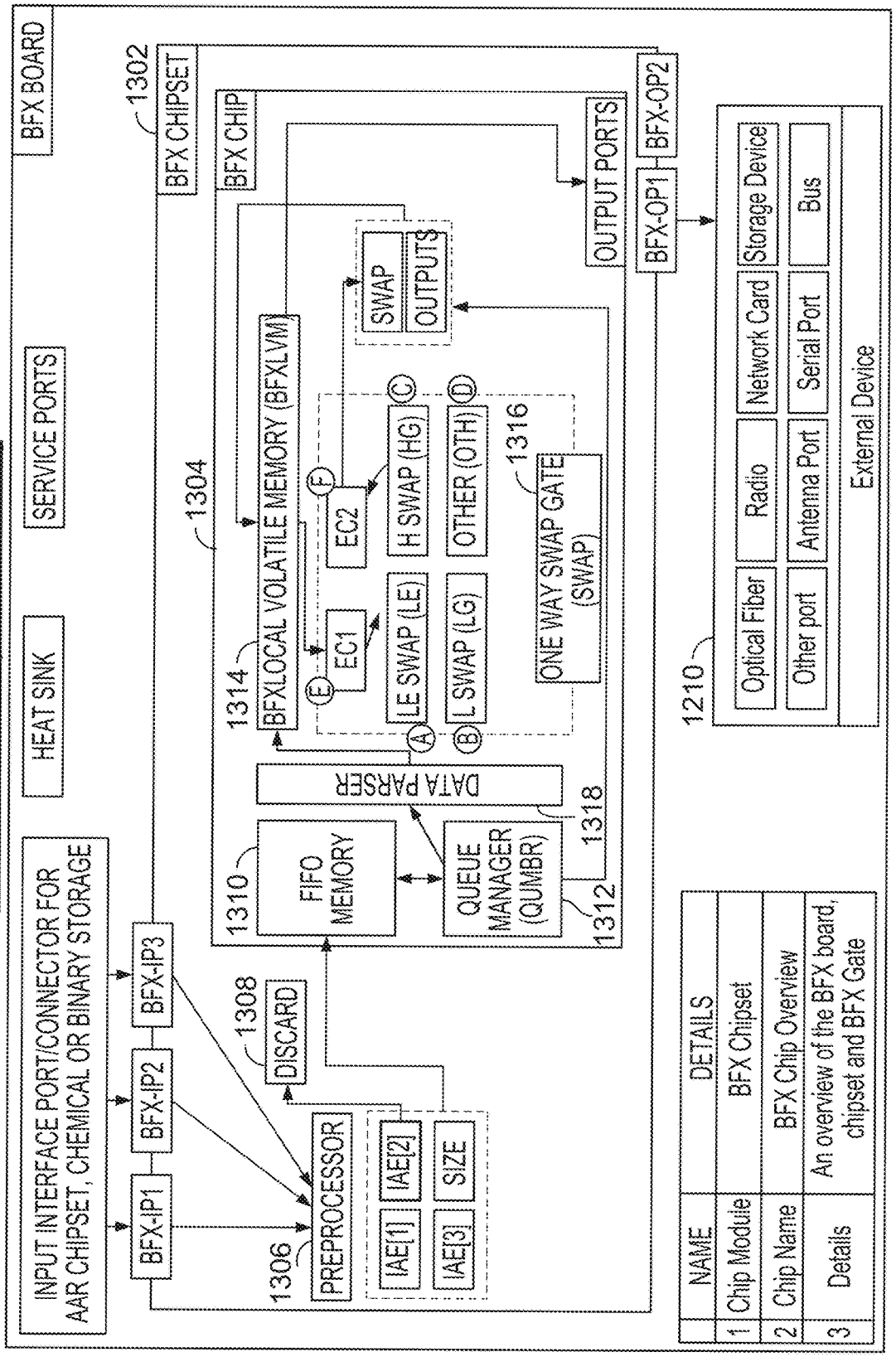
FIG. 13 is a block diagram of an example BFX board design.

FIG. 13 is a block diagram of an example BFX board design. The BFX board includes a BFX chipset 1302 and a BFX chip 1304. The BFX chipset 1302 contains the BFX chip 1304 and auxiliary components including memory, tables, buses, and ports. The BFX board is configured to interact with other boards and storage devices to deliver various applications. In the present disclosure, the BFX board interacts with a AAR chip to achieve a target amount of lossless compression.

The BFX chip 1304 can be implemented as a hardware gate or an embedded or a non-embedded chip/processor. The BFX chip can also be implemented as a software module or embedded logical code that is designed to accept data input and generate output in binary without storing (binary or quantum) data.

The BFX chipset 1302 includes three input ports BFX-IP1, BFX-IP2, BFX-IP3. Each input port can receive a respective data input. For example, input port BFX-IP1 can receive IAE[1] which contains an input data stream, e.g., the input data stream originally received as input by the AAR chip. Input port BFX-IP2 can receive the matrix IAE[2] which contains statistical operators for the input data stream. Input port BFX-IP3 can receive IAE[3] which contains statistical probabilities for the input data stream. The BFX chipset 1302 includes a pre-processor 1306 that is configured to process the data inputs received by the input ports BFX-IP1, BFX-IP2, BFX-IP3. For example, the pre-processor 1306 can be configured to accept the inputs and store the inputs in a matrix referred to herein as BFXINP. This matrix can be represented as the following structure:

$$BFXINP_{s,tg} = \{IAE[1]_{s,tg}, IAE[2]_{s,tg}, IAE[3]_{s,tg}\}$$

where tg represents the temporary global identifier of the input and s represents size.

The data compression process performed by the BFX chipset does not need access to the statistical operators received in IAE[2]. Therefore, in some implementations the pre-processor 1306 can read the data BFX-IP1, BFX-IP2, and BFX-IP3 and discard 1308 the data read from BFX-IP2.

The pre-processor 1306 is configured to transmit the data elements IAE [1]$_{s,tg}$ and IAE [3]$_{s,tg}$ to a FIFO memory 1310 included in the BFX chip 1304. The FIFO memory 1310 stores IAE[1] and IAE[3]. A queue manager 1312 included in the BFX chip 1304 manages the transmission of IAE[1] and IAE[3] to other components in the BFX chip 1304. For example, the FIFO memory 1310 can pass IAE[3] directly to the output port BFX-OP2 via the queue manager 1312 when the processing of IAE[1] is completed by the one way swap gate (SWAPG) 1316. In addition, the FIFO memory 1310 can pass IAE[3] directly to the output port BFX-OP2 so that IAE[3] can be provided for subsequent computations, e.g., to the rBFX chip for decompression. The queue manager 1312 of FIG. 13 provides a similar functionality to the queue manager QMGR1 in the AAR chip, as described above with reference to FIG. 4.

The FIFO memory 1310 copies data elements IAE[1] and IAE[3] to a BFX Local Volatile Memory (BFXLVM) 1314 via the queue manager 1312 and data parser 1318. The data parser 1318 parses the data as per its size and submits it to the swap gates.

The BFXLVM 1314 is configured to operate in conjunction with the One-Way Swap Gate (SWAPG) 1316. The BFX chip 1304 is configured to perform multiple operations in the BFXLVM 1314 to generate input data for the SWAPG 1316.

For example, the BFX chip 1304 is configured to identify a RV of a highest index value of IAE[1] from ((BFXINP$_{s,tg}$· IAE [3]$_s$· $\{R_h\}$)) and store the identified RV of the highest index value as Binary Value High (BVALH).

In addition, the BFX chip 1304 is further configured to identify a RV of a lowest index value of IAE[(1) from ((BFXINP$_{s,tg}$· IAE [3]$_s$· $\{R_l\}$)) and store the identified RV of the lowest index value as Binary Value Low (BVALL).

In addition, the BFX chip 1304 is further configured to parse the data pattern of BVALL to obtain its PTYP and PSTRUC value. The BFX chip 1304 then removes the last bit of the PSTRUC and concatenates PTYP with the remaining PSTRUC value and stores the value as a variable L_PSTRUCT.

In addition, the BFX chip 1304 is further configured to parse the data pattern of BVALL to obtain its PTYP and PSTRUC value. The BFXLVM 1314 then removes the last bit of the PSTRUC, replaces with it with the opposite value of the removed last bit and concatenates PTYP with the new PSTRUC to generate variable L_BVALL.

The BFX chip is then configured to implement multiple swapping processes to compress the stream BFXINP$_{s,tg}$·[IAE[(1)] by SWAPG 1316. To perform the compression SWAPG 1316 uses multiple sub modules of the BFX chip. The sub modules include a first error correction module (E), a second error correction module (F), a LE swap module (A), a L swap module (B), a H Swap module (C), and an internal serial port referred to as a other module (D).

Figure 14:
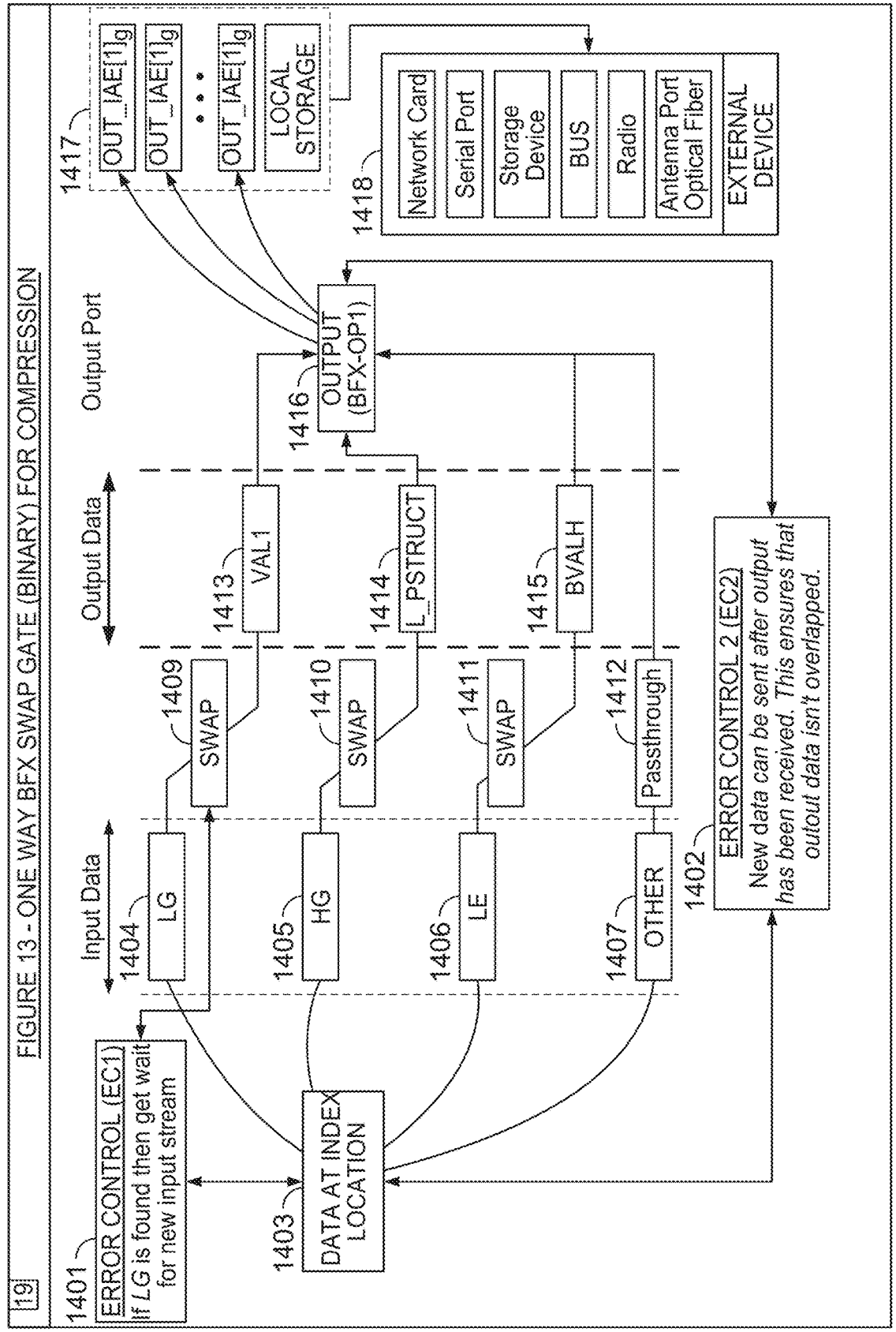
FIG. 14 is a block diagram that shows the sub modules included in the one way swap gate (SWAPG).

FIG. 14 is a block diagram that shows the sub modules included in the one way swap gate SWAPG 1316 of FIG. 13. Error Correction 1 (EC1) Module 1401 is configured to enable end of processing for the SWAPG when it encounters a defined value of BVALL or LG and pauses operations until new data is available.

Error Correction 1 (EC1) Module 1401 ensures synchronised event processing so that a single tasked process is initiated at a time to avoid data and/or memory corruption. Error correction 2 (EC2) module is configured to monitor for when data has been written to BFX-OP1, and allows the SWAPG to read new data. This also ensures that SWAPG (a one way one task gate) reads one data element (i.e., one data pattern packet) at a time The L Swap (LG) Module 1404 is configured to determine whether input data is equal to BVALL and then stops processing, writes the output of BVALL 1413 from IAE[3] to BFX-OP1 1416 and waits for additional data to arrive.

The H Swap (HG) Module 1405 is configured to determine whether input data is equal to BVALH and then writes the output of L_PSTRUCT 1414 to BFX-OP1 1416.

The LE Swap (LE) Module 1406 is configured to determine whether input data is equal to L_BVALL and then writes the output of BVALH 1415 to BFX-OP1 1416.

The other port module 1407 is an internal serial port that is embedded within the SWAPG and serves as an 'else' case. When the input data does not match an of the existing gates (LG, HG or LE) then the other port module passes 1412 the input data to BFX-OP1 1416.

The outputs written to BFX-OP1 1416 can be copied 1417 to OUT_IAE[1]$_g$, where 'g' represents a global identifier enables multiple streams to be stored in local volatile memory. Data copies to the output ports OUT_IAE[1] can be provided to an external device 1418.

Returning to FIG. 13, outputs from the one way swap gate 1316 are transferred to the BFXLVM. Since processing data through the swap gates is a sequential process, the swap gate outputs are transferred to the BFXLVM 1314 where it is stored and pushed to the final output ports when the buffer is completed. This does not mean that the data is transmitted to the output port post completion of the full input but instead as per buffers in the BFX board. The buffer size is dynamic and can vary as per the specific implementation.

When data is pushed to the final ports the statistical probabilities stored in IAE[3] are for $R_h$, size and only the last bit of $R_l$ which are terms as $R_h$ Value (RHV), Last bit $R_l$ PSTRUC (LBP) and Inti is referred to as Size (SZ) stores the size (s).

Output can be re-routed to the AAR chipset for another round of compression as per the computations rules defined by the operator configuration table. Corresponding IAE [1]$_g$ and IAE [3]$_g$ are written to BFX-OP1 and BFX-OP2. Re-routing of the data depends upon a user input as to the level of compression such as values from 1% to 99% compression.

In some implementations the BFX board can include a heat sink that implements liquid, air, or metal based cooling. In some implementations the BFX board can include service ports to enable devices to be connected to check the health of the hardware and perform debugging in events of breakdown.

Figure 15:
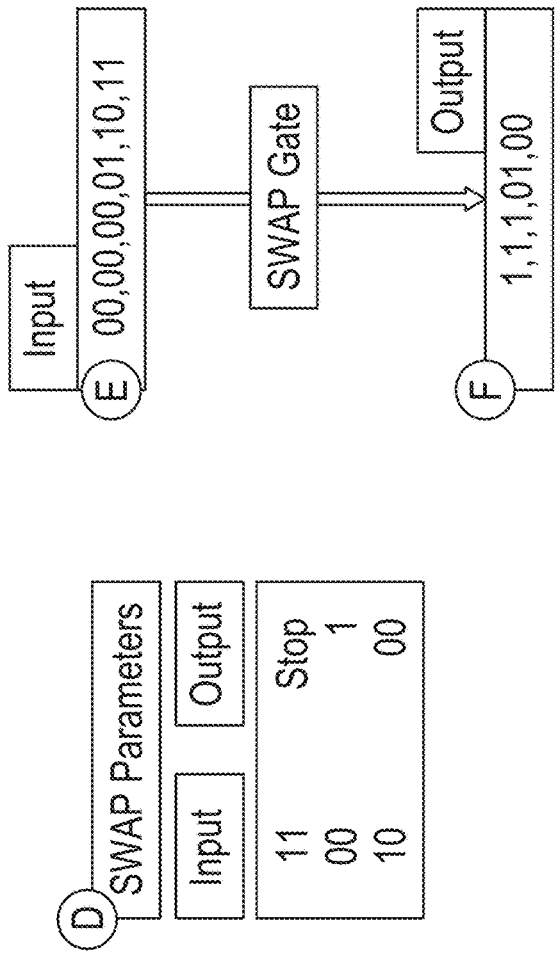
FIG. 15 is a block diagram for implementing a one way swap gate for the example input binary data stream IAE[1] and IAE[3] of FIGS. 12A-D.

FIG. 15 is a block diagram for implementing a one way swap gate for the example input binary data stream IAE[1] and IAE[3] of FIGS. 12A-D. In FIG. 15, box (A) shows the example input binary data stream in IAE[1]. Box (B) shows the IAE[3] associated with the input binary data stream, described above with reference to FIG. 12D.

As described above with reference to FIG. 13, the BFX chip uses the data in IAE[3] to generate an input configuration for the LG swap module, HG swap module, and LE swap modules included in the one way swap gate. This configuration is shown in FIG. 15 in list (C). In this example, BVALL is equal to 11 (see IAE[2] in FIG. 12C) and is marked in the RBFXLVM as the FCB at index location 04. This value is copied and made available in IAE[3] as $R_l$. As per the logic implemented by the BFX chip, the LG swap module stops processing data when the input value is 11. Similarly, BVALH is equal to 00 because the highest value of repetition count of Data Patterns (DP) in IAE[1] is $R_h$=00 which has a count value of 3. Therefore, the HS swap module replaces the data pattern 00 with the value 1 (the L_PSTRUCT, which is calculated in this example as per the following logic: the value of L_PSTRUC is the value of BVALL without the last bit of its PSTRUC. In this case since PSTRUC is of length one, only the PTYP value of BVALL ("1") is the value L_PSTRUCT.) L_BVALL is equal to a concatenation of: the opposite of the last bit of the PSTRUC of BVALL ("0") and the PSTRUC of BVALL ("1"), which results in a L_BVALL of 10.

Therefore, the LE swap module replaces the data pattern 10 with BVALH which is 00.

To summarize, the action of the swap gate can be described as: reading data pattern 11 means stop, reading 00 means replace 00 with 1, and reading 10 means that 10 is replaced by 00. Box (F) shows the compressed version of the input data stream shown in box (E). As shown, application of the one way SWAP gate compresses 12 bits to 7 bits.

Figure 16:
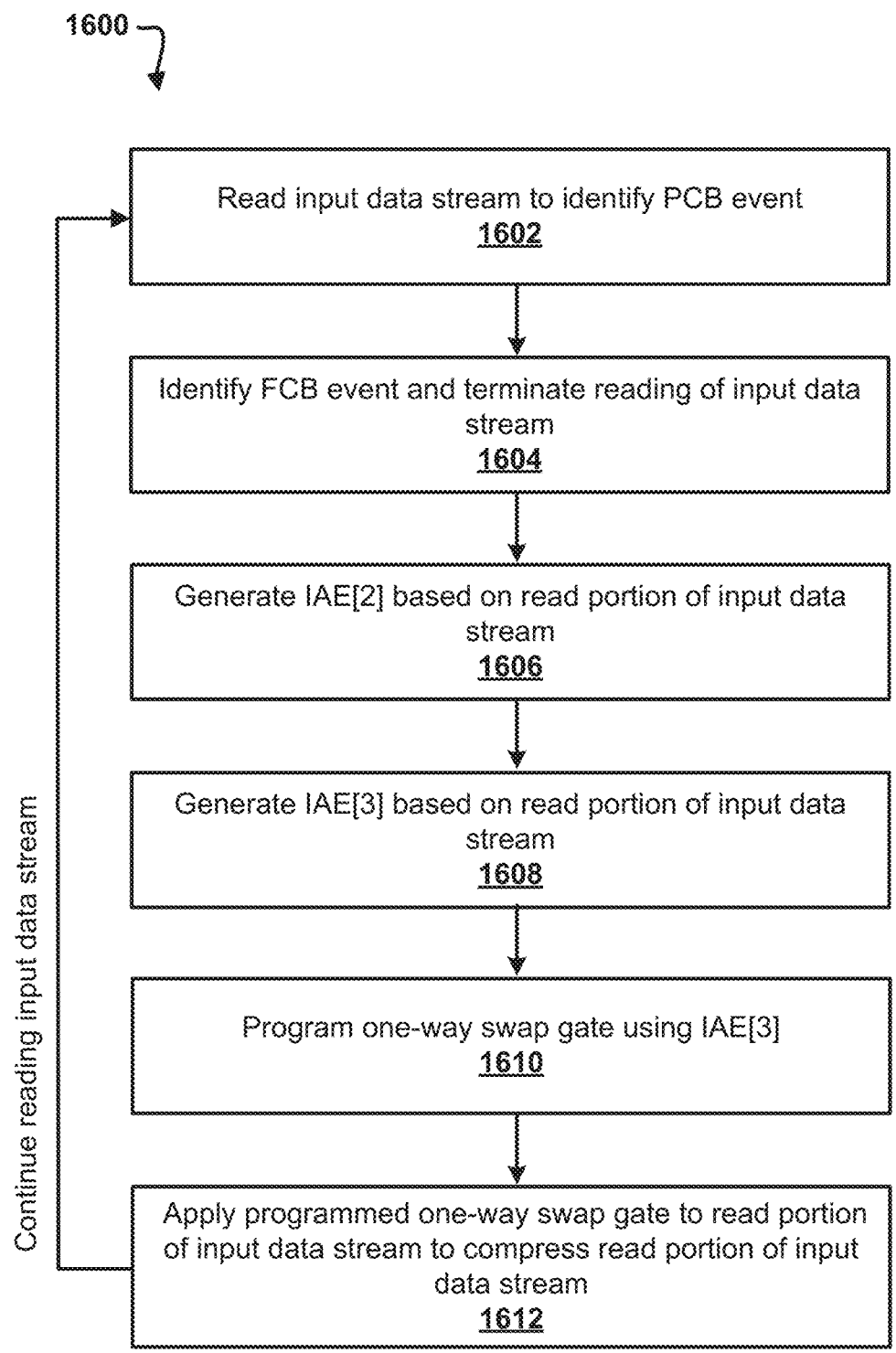
FIG. 16 is a flow diagram of a process for compressing an input data stream that has been partitioned into data packets according to the variable SIZE.

FIG. 16 is a flow diagram of a process 1600 for compressing an input data stream that has been partitioned into data packets according to the variable SIZE. For convenience, the process 1600 will be described as being performed by a system that includes an AAR chip and a BFX chip located in one or more locations. For example, a system that includes the AAR chipset of FIG. 4 and BFX chipset of FIG. 13, appropriately programmed, can perform example process 1600.

The system reads the input data stream to identify a PCB event (step 1602). A first example input data stream that has been partitioned into data packets of SIZE=4 is given below:

0000 0000 0000 0001 0000 0100 1111 0101 0000 0001
0000 0000 0000 0000 0000 0100 0001 0100 0000 0000
0000 0000 0000 0000 0101 0000 0100 1011 0000 0001
0000 0010 0001 0100 0000 0011 0001 0100 0000 0000
0000 1000 0000 0000 0000 1000 0000 0000 1111 1010
1000 0001 0111 1101 0101 0011 0111 1011 0011 0010
0101 0010 1001 1100 1110 1010 0000 0000 0000 0000
0000 0000 0101 1001 0000 0001 0000 0000 0000 0000
0001 0110 0000 0000 0010 0000 0000 0000 0000 0000
0000 0000 0000 0000 0000 0000 0000 0000 0000 0000
0000 0000 0000 0000 1110 1101 1000 0001 1011 1000
0000 0101 0000 0000 0000 0000 0101 1111 0101 1111
0100 1101 0100 0001 0100 0011 0100 1111 0101 0011
0101 1000 0010 1111 0010 1110 0101 1111 0110 0100
0110 1101 0110 0111 0011 0010 0110 1010 0110 1111
0110 1000 0110 1110 0010 1110 0111 0000 0111 1001
0101 0101 0101 0100 0000 1101 0000 0000 0000 0111
0111 1000 1100

In this first example, the input data stream includes 173 data packets and therefore has a bit length of (173*4)=692. Further, in this first example the PCB event is identified when the data pattern 1110 is read, since the data pattern 1110 first occurs at the 65$^{th}$ data packet:

0000 0000 0000 0001 0000 0100 1111 0101 0000 0001
0000 0000 0000 0000 0000 0100 0001 0100 0000 0000
0000 0000 0000 0000 0101 0000 0100 1011 0000 0001
0000 0010 0001 0100 0000 0011 0001 0100 0000 0000
0000 1000 0000 0000 0000 1000 0000 0000 1111 1010
1000 0001 0111 1101 0101 0011 0111 1011 0011 0010
0101 0010 1001 1100 1110 . . .

The system continues reading the input data stream to identify a FCB event (step 1604). In this first example, the system reads 17 further data packets before the FCB event is detected. In this first example, the FCB event is identified when the data pattern 0110 is read, since the data pattern first occurs at the 82 nd data packet:

... 1010 0000 0000 0000 0000 0000 0000 0101 1001 0000 0001 0000 0000 0000 0000 0001 0110 . . .

After the FCB event is detected, the system terminates reading of the input data. The read portion of the input data stream is therefore the first 82 data packets of the input data stream and includes 82*4=328 bits:

0000 0000 0000 0001 0000 0100 1111 0101 0000 0001
0000 0000 0000 0000 0000 0100 0001 0100 0000 0000
0000 0000 0000 0000 0101 0000 0100 1011 0000 0001
0000 0010 0001 0100 0000 0011 0001 0100 0000 0000
0000 1000 0000 0000 0000 1000 0000 0000 1111 1010
1000 0001 0111 1101 0101 0011 0111 1011 0011 0010
0101 0010 1001 1100 1110 1010 0000 0000 0000 0000
0000 0000 0101 1001 0000 0001 0000 0000 0000 0000
0001 0110

The system generates the IAE[2] matrix for the read portion of the input data stream (step 1606). In this first example, the IAE[2] matrix can be given by:

| | IAE[2] | |
|---|---|---|
| INDEX | DATA PATTERN (DP) | COUNT |
| 1 | 0000 | 39 |
| 2 | 0001 | 9 |
| 3 | 0010 | 3 |
| 4 | 0011 | 3 |
| 5 | 0100 | 6 |
| 6 | 0101 | 5 |
| 7 | 0110 | 1 |
| 8 | 0111 | 2 |
| 9 | 1000 | 3 |
| 10 | 1001 | 2 |
| 11 | 1010 | 2 |
| 12 | 1011 | 2 |
| 13 | 1100 | 1 |
| 14 | 1101 | 1 |
| 15 | 1110 | 1 |
| 16 | 1111 | 2 |

The system generates the IAE[3] matrix for the read portion of the input data stream (step 1608). In this first example, the IAE[3] matrix can be given by:

| IAE[3] | |
|---|---|
| $R_h$ value | 0000 |
| Last bit of the $R_1$ value | 0 |
| Size | 4 |

The system then uses IAE[3] to program the one-way swap gate (step 1610). In this first example, The variable Binary Value High (BVALH)=0000 (where PTYP=0, PSTRUC=000)

The variable Binary Value Low (BVALL)=0110 (where PTYP=0, PSTRUC=110). Here BVALL is 0110 since the data pattern 0110 is the last data pattern that updated its null count to 1 (data patterns 1100, 1101, and 1110 also have counts of "1" but these counts were changed from null to 1 before the count for data pattern 0110 was changed. This logic is applied in similar contexts in this disclosure.

The variable L_PSTRUCT=(Copy all bits of BVALL except the last one) or in other words (removes the last of the PSTRUC and concatenates PTYP+REMAINING PSTRUC)=011.

The variable L_BVALL=(First three bits of BVALL+ Opposite of last bit of BVALL) or in other words (remove the last of the PSTRUC and replaces with it opposite value and concatenates PTYP+NEW PSTRUC)=0111.

Therefore, the rule set for the one-way swap gate can be given by:

H Swap or (HG) Module: Replace BVALH with L_PSTRUCT (0000 is replaced with 011)

LE Swap or (LE) Module: Replace L_BVALL with BVALH (0111 with 0000)

L Swap or (LG) Module: Stream is complete when BVALL is encountered (stop at 0110)

OTH: pass data if it does not match any of the above.

The system applies the programmed one-way swap gate to the read portion of the input data stream to compress the read portion of the input stream (step 1612). In the first example this results in the following compressed data stream:

011 011 011 0001 011 0100 1111 0101 011 0001 011 011
011 011 011 0100 0001 0100 011 011 011 011 011 011
0101 011 0100 1011 011 0001 011 0010 0001 0100 011
0011 0001 0100 011 011 011 1000 011 011 011 1000
011 011 1111 1010 1000 0001 0000 1101 0101 0011
0000 1011 0011 0010 0101 0010 1001 1100 1110 1010
0000 0000 0000 0000 0000 0000 0101 1001 0000 0001
0000 0000 0000 0000 0001 0110

This compressed data stream has an output size of 300 bits. The compression ratio is therefore (Original stream size−compressed stream size)/Original stream size which, in this example is equal to(328−300)/328=8.53%.

The system can repeat steps 1602-1612 until the entire input data stream has been read.

A second example input data stream that has been partitioned into data packets of SIZE=4 is given below:

0000 0000 0010 0000 0000 0000 0000 0000 0000 0000
0000 0000 0000 0000 0000 0000 0000 0000 0000 0000
0000 0000 1110 1101 1000 0001 1011 1000 0000 0101
0000 0000 0000 0000 0101 1111 0101 1111 0100 1101
0100 0001 0100 0011 0100 1111 0101 0011 0101 1000
0010 1111 0010 1110 0101 1111 0110 0100 0110 1101
0110 0111 0011 0010 0110 1010 0110 1111 0110 1000
0110 1110 0010 1110 0111 0000 0111 1001 0101 0101
0101 0100 0000 1101 0000 0000 0000 0111 0111 1000
1100

In this second example, the PCB event is identified when the data pattern 1001 is read:

0000 0000 0010 0000 0000 0000 0000 0000 0000 0000
0000 0000 0000 0000 0000 0000 0000 0000 0000 0000
0000 0000 1110 1101 1000 0001 1011 1000 0000 0101
0000 0000 0000 0000 0101 1111 0101 1111 0100 1101
0100 0001 0100 0011 0100 1111 0101 0011 0101 1000
0010 1111 0010 1110 0101 1111 0110 0100 0110 1101
0110 0111 0011 0010 0110 1010 0110 1111 0110 1000
0110 1110 0010 1110 0111 0000 0111 1001 . . .

The FCB event is identified when the data pattern 1100 is read:

. . . 0101 0101 0101 0100 0000 1101 0000 0000 0000
0111 0111 1000 1100 . . .

The read portion of the input data stream is therefore the first 91 data packets of the input data stream and includes 91*4=364 bits:

0000 0000 0010 0000 0000 0000 0000 0000 0000 0000
0000 0000 0000 0000 0000 0000 0000 0000 0000 0000
0000 0000 1110 1101 1000 0001 1011 1000 0000 0101
0000 0000 0000 0000 0101 1111 0101 1111 0100 1101
0100 0001 0100 0011 0100 1111 0101 0011 0101 1000

0010 1111 0010 1110 0101 1111 0110 0100 0110 1101
0110 0111 0011 0010 0110 1010 0110 1111 0110 1000
0110 1110 0010 1110 0111 0000 0111 1001 0101 0101
0101 0100 0000 1101 0000 0000 0000 0111 0111 1000
1100

In this second example, the IAE[2] matrix can be given by:

| INDEX | DATA PATTERN (DP) | COUNT |
|---|---|---|
| | IAE[2] | |
| 1 | 0000 | 31 |
| 2 | 0001 | 2 |
| 3 | 0010 | 5 |
| 4 | 0011 | 3 |
| 5 | 0100 | 6 |
| 6 | 0101 | 9 |
| 7 | 0110 | 7 |
| 8 | 0111 | 5 |
| 9 | 1000 | 5 |
| 10 | 1001 | 1 |
| 11 | 1010 | 1 |
| 12 | 1011 | 1 |
| 13 | 1100 | 1 |
| 14 | 1101 | 4 |
| 15 | 1110 | 4 |
| 16 | 1111 | 6 |

In this second example, the IAE[3] matrix can be given by:

| IAE[3] | |
|---|---|
| $R_h$ value | 0000 |
| Last bit of $R_l$ value | 0 |
| Size | 4 |

In this second example, the variables required for programming the one-way swap gate are given by:
Binary Value High (BVALH)=0000 (PTYP=0, PSTRUC=000)
Binary Value Low (BVALL)=1100 (PTYP=1, PSTRUC=100)
L_PSTRUCT=(Copy all bits of BVALL except the last one) or (removes the last of the PSTRUC and concatenates PTYP+REMAINING PSTRUC)=110
L_BVALL=(First three bits of BVALL+Opposite of last bit of BVALL) or (remove the last of the PSTRUC and replaces with it opposite value and concatenates PTYP+NEW PSTRUC)=1101 and the rule set for the one-way swap gate can be given by:
H Swap or (HG) Module: Replace BVALH with L_PSTRUCT or in other words (0000 is replaced with 110)
LE Swap or (LE) Module: Replace L_BVALL with BVALH or in other words (1101 with 0000)
L Swap or (LG) Module: Stream is complete when BVALL is encountered (stop at 0110)
OTH: pass data if it does not match any of the above Application of the programmed one-way swap gate to the read portion of the input stream generates the following compressed data stream:
110 110 0010 110 110 110 110 110 110 110 110 110
110 110 110 110 110 110 110 110 110 1110 0000 1000
0001 1011 1000 110 0101 110 110 110 110 0101 1111
0101 1111 0100 0000 0100 0001 0100 0011 0100 1111
0101 0011 0101 1000 0010 1111 0010 1110 0101 1111
0110 0100 0110 0000 0110 0111 0011 0010 0110 1010
0110 1111 0110 1000 0110 1110 0010 1110 0111 110
0111 1001 0101 0101 0101 0100 0000 1101 0000 0000
0000 0111 0111 1000 1100

This compressed data stream has an output size of 338 bits. The compression ratio is therefore (Original stream size−compressed stream size)/Original stream size which, in this example is equal to(364−338)/364=7.14%.

Figure 17:
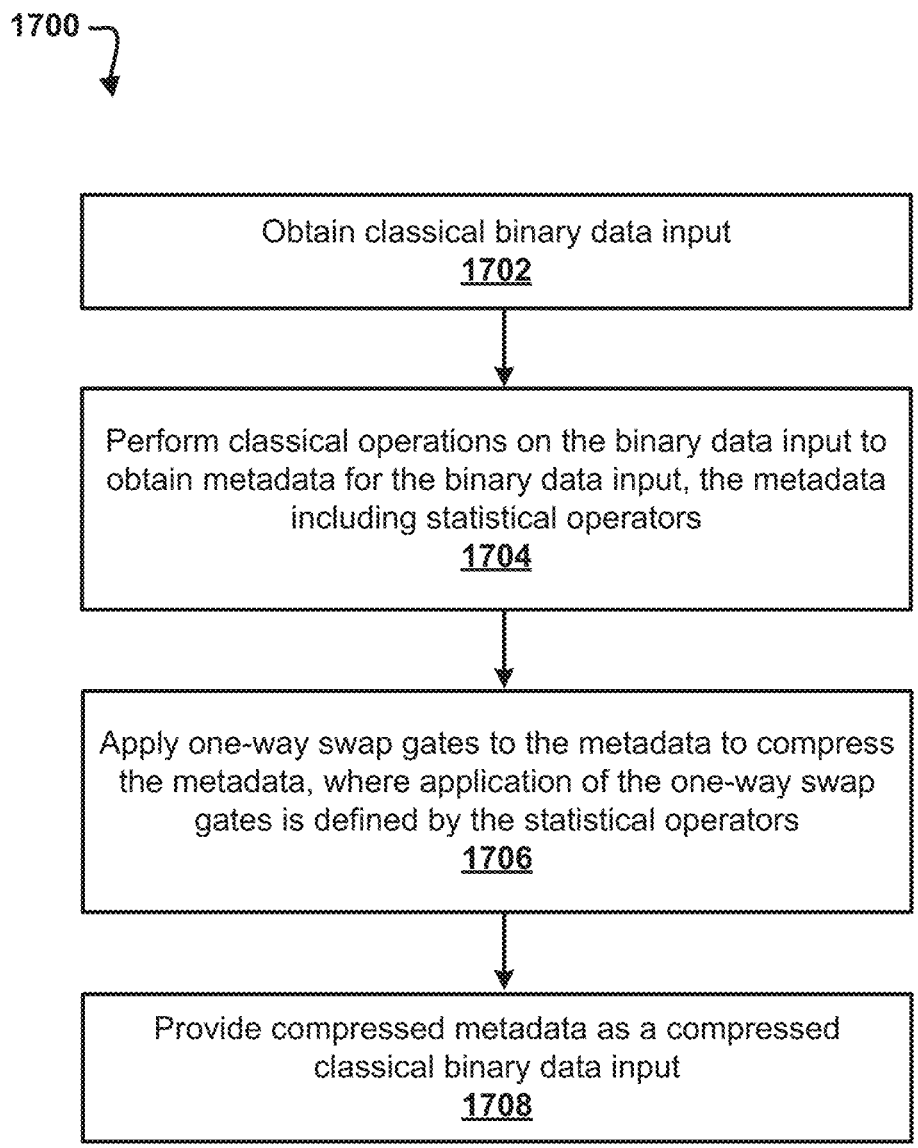
FIG. 17 is a flow diagram of a process for compressing a classical binary data input.

FIG. 17 is a flow diagram of a process 1700 for compressing a classical binary data input. For convenience, the process 1700 will be described as being performed by a system that includes an AAR chip and a BFX chip located in one or more locations. For example, a system that includes the AAR chipset of FIG. 4 and BFX chipset of FIG. 13, appropriately programmed, can perform example process 1700. Example process 1700 can be combined with any of the techniques described in this disclosure, e.g., the techniques described above with reference to FIGS. 1A-16.

The system obtains a classical binary data input (1702). The system performs classical operations on the classical binary data input to obtain metadata for the classical binary data input (step 1704). The classical operations are based on the ensemble interpretation of quantum mechanics, as described above, e.g., with reference to FIGS. 1A-12D.

The metadata includes the Intermediate Arithmetic Elements (IAE) IAE[1], IAE[2] and IAE[3] described above with reference to FIGS. 1A-16. For example, the metadata includes, for each of one or more predetermined sizes that correspond to respective virtual Hilbert spaces, the classical binary data input obtained at step 1702 partitioned into multiple data packets with lengths equal to the predetermined size (e.g., the metadata includes multiple IAE[1] matrices). Each data packet has a respective data pattern that defines the type of the data packet, where the data pattern is predefined based on the size of the corresponding virtual Hilbert space. For example, for a virtual Hilbert space of size 2, each data packet has a data pattern from the set {00, 10, 01, 11}. Data patterns are described in more detail above with reference to FIG. 8. Further, each data packet has a respective correlation value that represents a measure of virtual quantum entanglement. Correlation values and virtual quantum entanglement is described in more detail above with reference to FIGS. 8 and 12B. The classical binary data input partitioned into data packets, where each data packet includes a correlation value that represents a virtual quantum entanglement measure and a data pattern defining a type of the data packet, forms a classical quantum multi-element (CQME) system.

The metadata further includes values representing the Data Patterns (DP) occurring in the classical binary data input and values representing counts of occurrences of Data Patterns (DP) in the classical binary data input (e.g., the metadata includes multiple IAE[2] matrices). The values representing the Data Patterns (DP) occurring in the classical binary data input are directly determined by the sizes of the respective virtual Hilbert spaces and do not depend on the particular classical binary data input. The values representing counts of occurrences of Data Patterns (DP) in the classical binary data input are determined by the classical binary data input and are obtained by reading the classical binary data input and detecting PCB and FCB events, as described above, e.g., with reference to FIGS. 4, 9B, and 11C.

By construction, the counts of occurrences of Data Patterns (DP) in the classical binary data input include counts representing unique Data Patterns (DP) in a proper or improper subset of the classical binary data input, since the generation of each IAE[2] matrix is terminated when a proper or improper subset of the classical binary data input includes one unique data pattern. See, e.g., the example given with reference to FIG. 15. The occurrences of Data Patterns (DP) in the classical binary data input are referred to as statistical operators of the classical binary data input. The counts of occurrences of Data Patterns (DP) in the classical binary data input are referred to as values of the statistical operators since they characterize the classical binary data input.

The metadata further includes values representing statistical probabilities for the classical binary data input (e.g., the metadata includes multiple IAE[3] matrices). The values representing statistical probabilities for the classical binary data input are based on the values of the statistical operators and include Data Patterns (DP) that correspond to highest occurrence counts and lowest occurrence counts. See, e.g., the examples given with reference to FIG. 16. These statistical probabilities define statistical properties of the CQMEs.

The metadata includes an optimal arithmetic compound that characterizes the classical binary data input and stores the values of the statistical operators. The optimal arithmetic compound is selected from multiple candidate arithmetic compounds that form a superposition plane of virtual quantum states. Each of the multiple candidate arithmetic compounds corresponds to virtual quantum states in a respective virtual Hilbert space. The optimal arithmetic compound is selected from the multiple candidate arithmetic compounds through a virtual time measurement of the virtual quantum states. The optimal arithmetic compound i) has a same length as the classical binary data input, ii) has a same entropy as the classical binary data input, and iii) includes at least one singularity. Selecting an optimal arithmetic compound is selected from multiple candidate arithmetic compounds that form a superposition plane of virtual quantum states is described above with reference to FIGS. 4 and 11A.

The system applies swap gates to the metadata to compress the metadata (step 1706). The swap gates swap data as a one-way function and application of the swap gates is defined by values of the statistical operators included in the metadata. For example, application of the one-way swap gates to the metadata swaps occurrences of Data Patterns (DP) with a highest count of occurrence (as specified in the metadata) with bit strings that are shorter than the Data Patterns (DP) with the highest count. The bit strings include a concatenation of i) a virtual quantum entanglement measure of Data Patterns (DP) with the lowest count of occurrence (as specified in the metadata) and ii) the remaining bits of the Data Patterns (DP) with the lowest count, excluding the last bit of Data Patterns (DP) with the lowest count (as specified by the metadata). See, e.g., the examples given with reference to FIG. 16.

The system provides the compressed metadata as a compressed classical binary data input (step 1708). By construction, the compressed classical binary data input has a same entropy as the classical binary data input, as described above with reference to FIG. 4.

In some implementations the system can output the compressed classical binary data input. In other implementations the system can iteratively process the compressed classical binary data input until a target data compression ratio is achieved. For example, at each iteration the system can perform the classical operations on a classical binary data input for the iteration to generate metadata for the iteration, apply swap gates to the metadata for the iteration to compress the metadata for the iteration, and provide the compressed metadata for the iteration as input for a subsequent iteration.

The RBFX Chipset: Example Techniques for Data Decompression

Data compressed by the AAR chipset and BFX chipset can be decompressed by a Reverse Binary Fourier X-gate (rBFX) chip. The rBFX chip is configured to read compressed data inputs (in the form of CQME systems) and decompress the data using logical engines that interpret the CQME systems and convert the CQME systems into classical data. The rBFX chip reuses several components and logical routines of the AAR chip and the BFX chip. These components retain the above described ensemble interpretation and quantum classical interface properties from the AAR chip or the BFX chip to process input data.

For example, the rBFX chip is configured to receive input data as a concatenation of a series of Intermediate Arithmetic Compounds (IACs), where each IAC is a portion of the input data stream and contains a header (ancilla matrix/IAE [3])+data (IAE[1]). The rBFX chip is configured to convert the input data into a binary non-delimited data stream. A first predetermined number of bits (7 bits) are submitted to a first rBFX chip input port RBFX-IP1 and the remainder of the stream is submitted to a second rBFX chip input port RBFX-IP2. The rBFX chip loads the data from the input ports into memory and generates candidate metadata from the data, e.g., values of statistical operators that are based measures of virtual quantum entanglement, counts of occurrences of Data Patterns (DP) including unique Data Patterns (DP), and sizes of virtual quantum Hilbert spaces as described above with reference to the AAR and BFX chips. The data from the input ports and candidate metadata are processed using kernel filters to identify correct metadata from the candidate metadata. The correct metadata is then used to apply a reverse one way swap gate to decompress the data.

The kernel filters and reverse one way swap gate are defined using a value referred to herein as L_STRUC. L_STRUC is a value that is analogous to the ensemble interpretation of quantum mechanics, where quantum entanglement is not only possible via one observation but can also be read by multiple observation states. This quantum mechanical property is analogous to the removal of the last bit during compression in the BFX chip and the extensive deployment of uniqueness across compression by PCB and FCB event detection(s). The property is also extended to the rBFX chip as it assumes a value of L_STRUC. This by design ensures that 'valid' L_STRUC repetitions are the only possible elements to be read when read is chunks of size-1. For example, if the size element is equal to 4 and then the L_STRUC size is 3, and the preprocessor gate described below reads chunks of size 3 when the first three elements are equal (as an example) to 000, then the highest possible repeats of the final data stream in the preprocessor gate will be equal to a valid L_STRUC. There are zero deviations of this logic since several advanced statistical methods have been deployed from AAR to BFX to ensure that the data reading in the preprocessor gate can derive a valid L_STRUC.

In some implementations, a decompressed data stream output can be iteratively provided for re-decompression because application of presently described principles of the ensemble interpretation of quantum mechanics ensures that the entropy of the CQME data stream does not change and can be decompressed again.

The rBFX chip also forms a quantum-classical interface as it can accept data in binary format, process data using the ensemble interpretation and other principles of quantum mechanics, and provide the output in binary format. The rBFX chip can store inputs and outputs in memory as a lookup table, where the number of inputs and outputs is theoretically unlimited and in practice only implemented by the capabilities of the chip hardware. Hence, logical reverse computing is achieved because data is not lost and is retrievable from storage memory.

The processes and components described below with reference to the rBFX chip are designed to interact with the processes and components described herein with reference to the AAR chip and BFX chip, although the rBFX chip can also accept appropriate data inputs from other sources.

Figure 18:
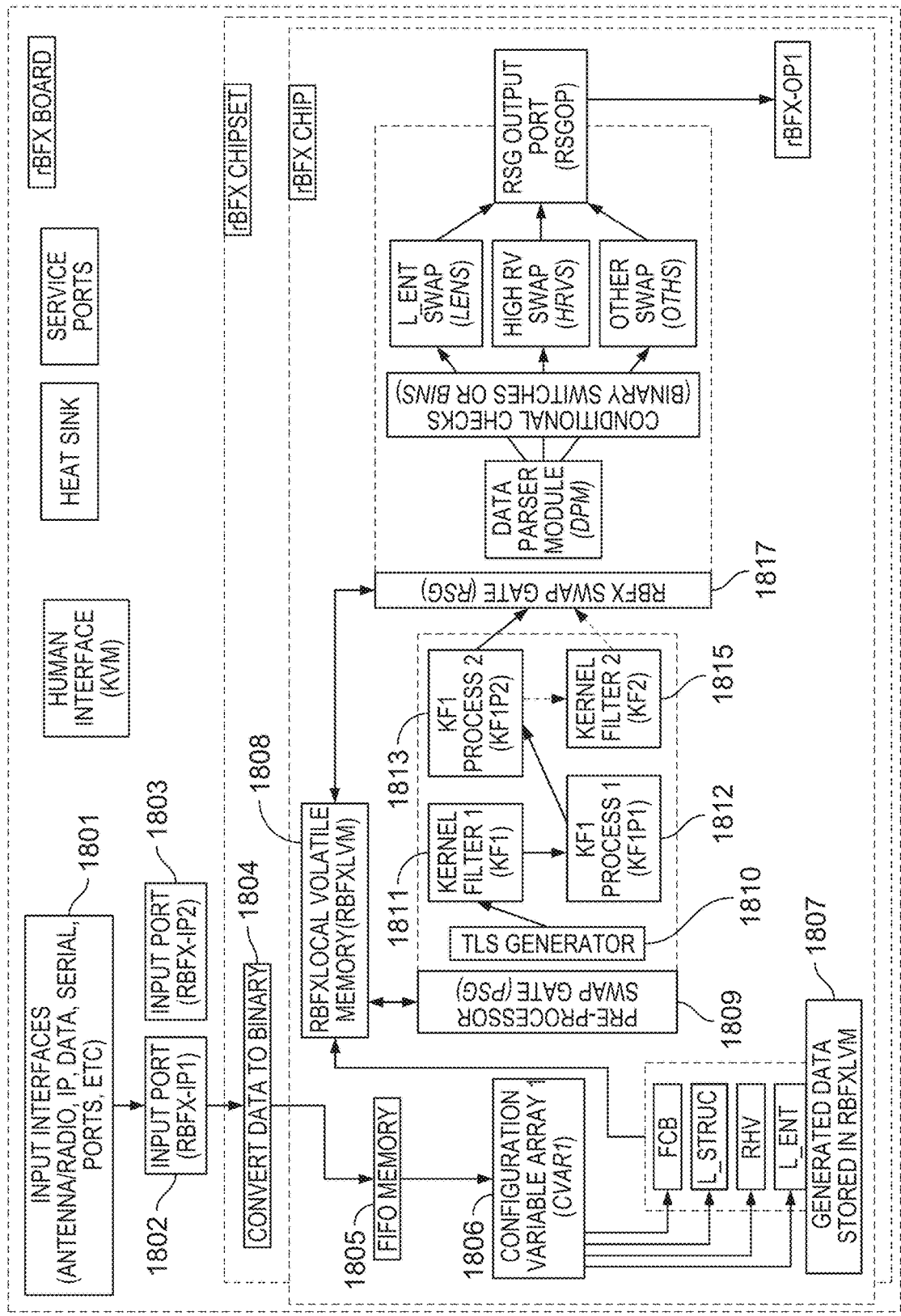
FIG. 18 is a block diagram of an example rBFX board design.

FIG. 18 is a block diagram of an example rBFX board design. The rBFX board includes a rBFX chipset and a rBFX chip. The rBFX chipset contains the rBFX chip and auxiliary components including memory, tables, buses, and ports. The rBFX board is configured to interact with other boards and storage devices to deliver various applications. In the present disclosure, the rBFX board interacts with a BFX chip to decompress compressed data.

The rBFX chip can be implemented as a hardware gate or an embedded or a non-embedded chip/processor. The rBFX chip can also be implemented as a software module or embedded logical code that is designed to accept data input and generate output in binary without storing (binary or quantum) data.

The rBFX chipset includes two input ports rBFX-IP1 1802 and rBFX-IP2 1803, as described above. The input ports 1802, 1803 can receive data inputs from an input interface 1801 and provide received data inputs to a rBFX chipset module 1804 that converts the data inputs into binary form. The converted data is referred to herein as an Input Stream (INS) and is stored in on-board FIFO memory 1805 included in the rBFX chip.

The stored data includes multiple matrices, where each matrix is referred to herein as an Input Data Array (IDA). Each IDA includes a respective IAE[1] and IAE[3] matrix and is denoted as:

$$IDA_n = \{IAE[1]_n, IAE[3]_n\}$$

where n represents a unique identifier. The Input Stream (INS) is formed from a combination of Input Data Arrays (IDA) and can be represented as $$IDA_1 + IDA_2 + \ldots + IDA_n,$$

that is $INS = \int_n IDA_n$. The Input Stream (INS) represents a CQME stream that contains non-delimited Input Data Arrays (IDA) or elements. These elements within the stream contains a fixed length header (AM or IAE[3]) as displayed below:

| Field No. | 0x0001 | 0x0002 | 0x0003 |
|---|---|---|---|
| Field Name | Last bit $R_l$ PSTRUC (LBP) | $R_h$ Value (RHV) | Size (SZ) |
| Field Length (bits) | 1 | 4 | 2 (Min) | where last bit $R_l$ PSTRUC LBP is defined as a single bit equal to the last bit of PSTRUC.

To begin the decompression process, the rBFX chip is configured to parse the header by reading from the start of the Input Stream (INS). The following information is then extracted:

The last bit $R_l$ PSTRUC (LBP): this defines the last bit of the $R_l$ of the element as generated by the BFX chip and stored in IAE[3] or BVALH (as defined above with reference to the AAR chip).

$R_h$ Value (RHV): this defines the value of the highest repetitions as generated by the BFX chip and stored in IAE[3]

Size (SZ): the size SZ of the L_STRUC is determined by all possible binary combinations generated by of size (as defined below) and is the equivalent of the L_PSTRUC value in the AAR chip (in this disclosure the term "L_STRUC" is mainly used in the context of the rBFX chip and the term "L_PSTRUC" is mainly used in the context of the AAR or BFX chip).

Size=SZ(at header 0x0003)−1.

The Header Length (HL) is: Length (len) of header is 2 bits or sum of the length of DOP+LBP+SZ, HL=len(LBP)+len(RHV)+len(size)=7 bits.

The rBFX chip includes a Configuration Variable Array 1 (CVAR1) 1806. The CVAR1 1806 contains data representing FCB, L_STRUC, RHV and L_ENT. L_ENT is defined as the entanglement value L_STRUC concatenated with the entanglement value of LBP (from header). The value of LBP is obtained from the header while the value L_STRUC is a dynamically generated value as per the value of the size variable. Definitions of the data stored in CVAR1 1806 are given below:

The L_STRUC value is determined by all possible binary combinations generated by of size, where size=SZ (at header 0x0003)−1.

The FCB value is generated by concatenating an assumed value of L_STRUC and defined value of LBP (from the header).

The RHV value is provided by IAE[3] or header at location 0x0002.

The L_ENT value is generated by concatenating L_STRUC, and the entanglement value of LBP.

The rBFX chip is configured to provide the data stored in the CVAR1 1806 to a local memory RBFXLVM 1808. The rBFX chip then initiates a two-step process to decompress data.

In the first step, the rBFX chip commences extraction of IDA. Input Stream (INS) and an input matrix of Preprocessor Gate (PSG) Input or (PSGIN$_i$) with 'i' as a unique identifier, is submitted to the preprocessor gate PSG 1509 to generate multiple Input Data Arrays (IDA). These Input Data Arrays (IDA) are submitted to the rBFX swap gate (RSG) 1817 to decompress data.

To commence decompression, the rBFX initializes the variable PSGIN$_i$ which is a matrix of possible L_STRUC, as per the equation:

$$PSGIN_i = \int_{i=1}^{i} L\_STRUC_i$$

The value L_STRUC, is generated in CVAR1 1806 and stored in RBFXLVM 1808 to extract Input Data Arrays (IDA) from the Input Stream (INS) via the following logical process:

The memory pointer that contains Input Stream (INS) from RBFX Local Memory (RBFXLVM) is submitted to the PSG along with input of sequential values from $PSGIN_i$. During first read, the Header Location (LOC) is set at '1'. When an IDA has been confirmed for subsequent reading events value of Header Location (LOC) is updated. Data is read sequentially as per Size (SZ) and L_STRUC, is replaced with L_ENT. The processed data is appended in IAE[1] and Data Pattern (DP) repetitions are inserted in IAE[2], similar to AAR processing. rBFX generates IAE[2] to obtain the PCB and FCB of the IAE[1]. rBFX pauses reading the Input Stream (INS) when FCB is encountered and moves the read data to TEMP_IAE[1], along with $PCB_i$ and $FCB_i$ are stored as a unique matrix in $TEMP\_IDA_i$ This is repeated for all L_STRUC values and saved as matrix, Temporary L_STRUC (TLS) 1810.

$$TLS_i = \int_{i=1}^{i} TEMP\_IDA_i$$

To select a valid IDA, the rBFX chip is configured to pass the TLSi matrix/matrices to a Kernel Filter #1(KF1) 1811. In some cases, multiple Input Data Arrays (IDA) are obtained as outputs from KF1. The multiple Input Data Arrays (IDA) are submitted to Kernel Filter #2(KF2) 1815 else they are submitted to RSG 1817. The dotted lines between 1813 and 1815 and 1817 in FIG. 18 shows that this is an optional step in case multiple Input Data Arrays (IDA) have been enumerated by KF1.

To process data through the Kernel Filter 1 (KF1) 1811 the rBFX chip is configured to implement the following processes in IAE[2]:

Process 1 (KF1P1) 1812 is to determine whether the value of L_ENT highest in IAE[2].

Process 2 (KF1P2) 1813 is to determine whether all index values in IAE[2]>1.

The IDA that is positive for the two processes above (KF1P1 and KF1P2) is stored in RBFXLVM 1808.

Processing data through Kernel Filter 2 (KF2) 1815 analyses the multiple Input Data Arrays (IDA) and selects the IDA that occupies the larger sized bit or data length as the final output.

The variable LOC is updated as per bit size of final IDA so that the PSG 1809 can continue to read the Input Stream (INS) from the LOC offset to obtain the next valid IDA.

In the second step of the two-step process to decompress data, the rBFX chip processes data through the rBFX swap gate 1817.

Figure 19:
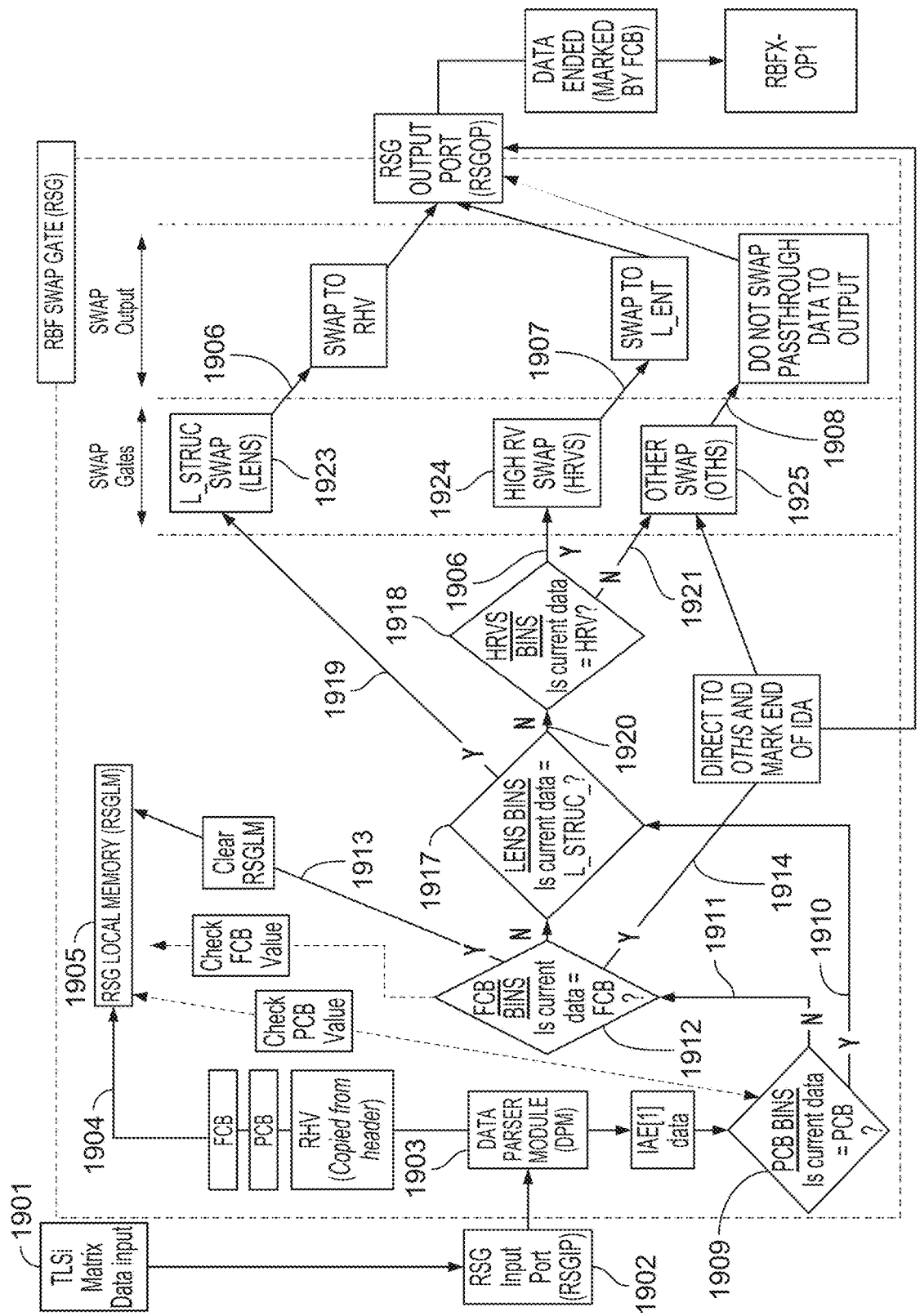
FIG. 19 is a block diagram that shows how data is processed by a rBFX swap gate.

FIG. 19 is a block diagram that shows how data is processed by a rBFX swap gate. The $TLS_i$ matrix 1901 is provided as input to rBFX Swap Gate (RSG) Input Port (RSGIP) 1902, where the Data Parser Module (DPM) 1903 reads the data, splits it and saves the $PCB_i$, $FCB_i$ and RHV (enumerated from header) 1904 to RSG Local Memory (RSGLM) 1905. Once the values are saved the DPM passes IAE[1] to enumerate the decompressed data via the sequence below. RSGLM is destroyed once FCB is received by the DPM.

The following switches are embedded within the RSG:
Conditional checks 1919 are Binary Switches (BINS) that detect occurrence of PCB and FCB 1909, 1912 and data types for faster swapping 1917, 1918.

Data Parser Module (DPM) 1920 is a module that is configured to read data from the RSGIP, extract it as per SZ (header 0x0003) and submit it to appropriate swap switch.

L_ENT Swap (LENS) 1921 is configured to swap the value of L_STRUC with RHV 1906.

High RV Swap (HRVS) 1922 is configured to swaps value of $R_h$ Value (RHV) (header 0x0002) with L_ENT 1907.

Other Swap (OTHS) 1925 is configured to move the data 1908 from the input to RSGOP via 1924 without processing.

The DPM 1920 is configured to extract data as per the value of the variable SZ to perform the following processes:

PCB BINS: Compare if data is equal to PCB 1909. If yes, 1910, then proceed to direct data to LENS BINS. If not, 1911, then pass data to FCB check.

FCB BINS: Compare if data is equal to FCB 1912. If yes, then passes data to OTHS 1914, clear the data in RSGLM 1913 and instruct RSG to wait for new $TLS_i$/ mark end of data 1914 so that RSGOP can write data to RBFX-OP1 1915. Else, pass data to next in line modules/gates (LENS check, 1917).

LENS BINS: If Input data is equal to L_ENT then submit the data to LENS 1923 else pass to HRVS check 1918.

HRVS BINS: If Input data is equal to RHV then submit the data to HRVS 1924.

If the data does not match the above two conditions then pass data to OTHS 1925 and wait for new incoming data.

When IAE[1] encounters FCB in an input data stream, it marks the availability of final output (decompressed) data at the RSGOP (1824 of FIG. 18) intended for RBF-OP1 (1825 of FIG. 18).

Figure 20:
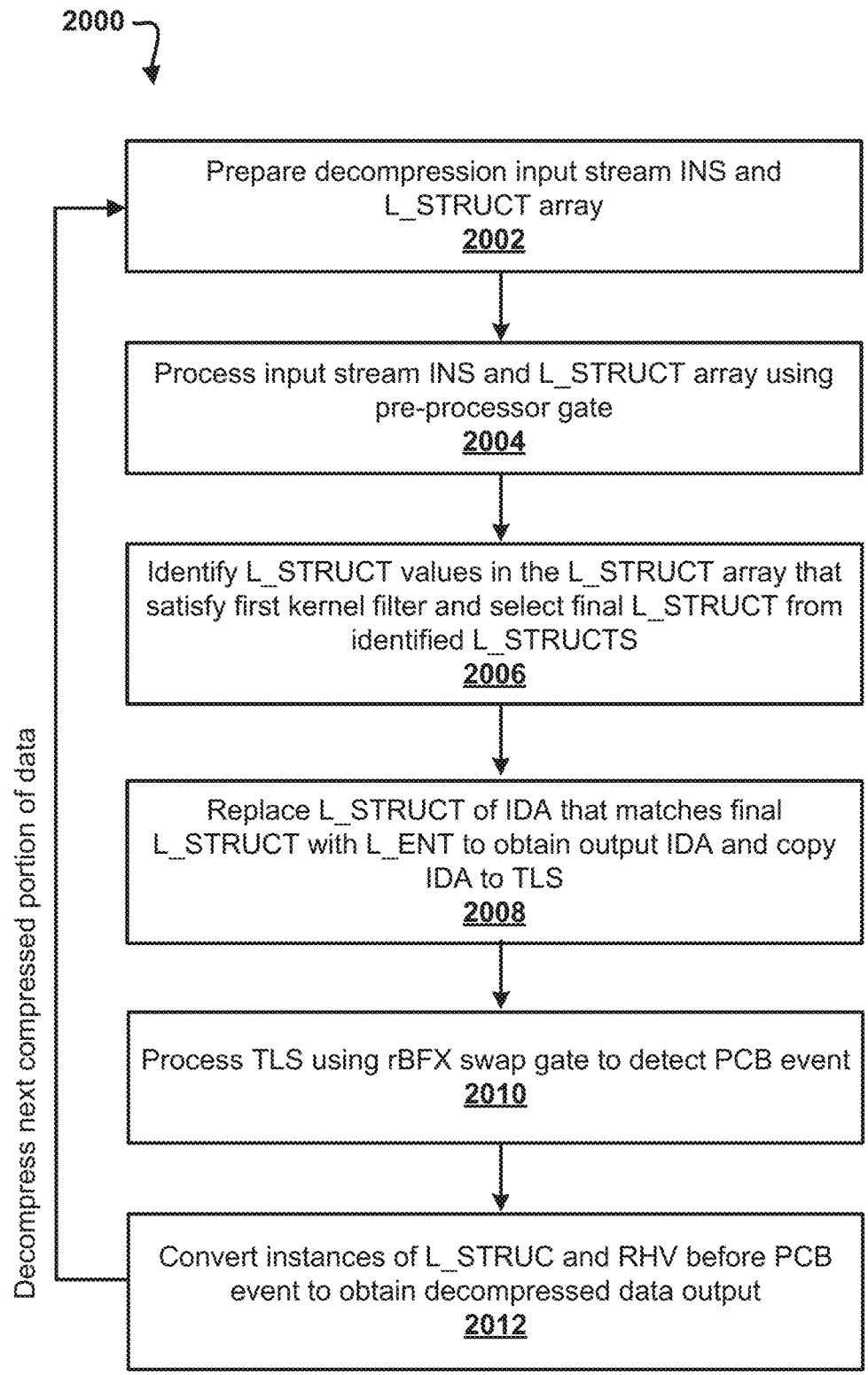
FIG. 20 is a flow diagram of a process for decompressing the example data stream compressed according to example process of FIG. 16.

FIG. 20 is a flow diagram of a process 2000 for decompressing an example data stream, e.g., a data stream compressed according to example process 1600 of FIG. 16. For convenience, the process 2000 will be described as being performed by a system that includes a rBFX chip. For example, a system that includes the rBFX chipset of FIG. 18, appropriately programmed, can perform example process 2000.

The system prepares a decompression input stream Input Stream (INS) for size 4 and an L_STRUC array (step 2002). The system processes the Input Stream (INS) and the L_STRUC array using the Pre-processor Gate (PSG) (step 2004). The system identifies L_STRUC values that satisfy the first kernel filter and selects as identified L_STRUC with the larger size as the final L_STRUC (step 2006). The system replaces the L_STRUC of the Input Data Array (IDA) that matches the final L_STRUC with L_ENT to obtain an output IDA (step 2008). The system processes TLS 1 using the rBFX swap gate to detect the PCB event in IDA (step 2010). The system converts all instances of L_STRUC to RHV before the PCB event occurs in the IDA, converts all instances of RHV to L_ENT before the PCB event occurs, and passes all other values (before and after the PCB event) to the rBFX chip output port to obtain the decompressed data (step 2012). The system can repeat steps 2002-2012 until all compressed portions of the original input data stream has been decompressed.

Figure 21:
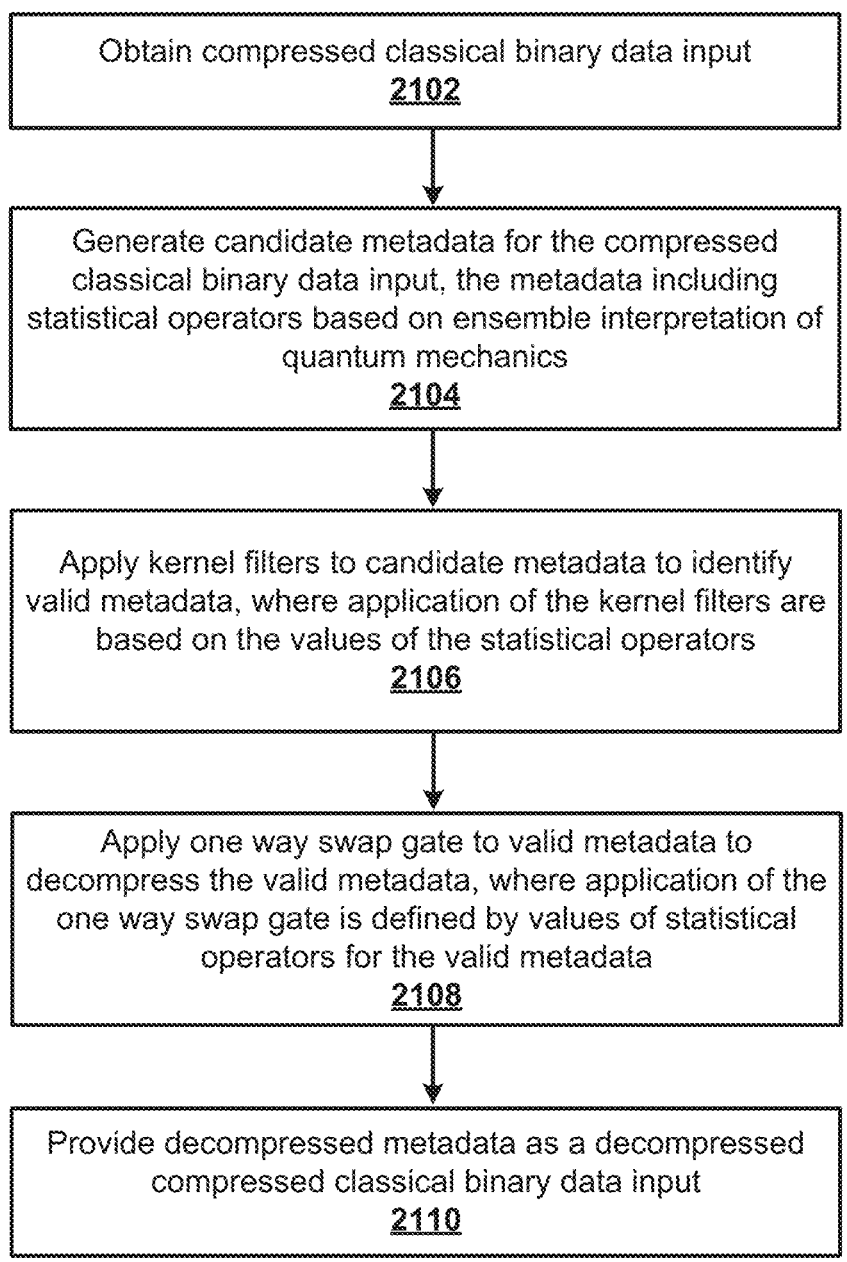
FIG. 21 is a flow diagram of a process for decompressing a classical compressed binary data input.

FIG. 21 is a flow diagram of a process for decompressing a compressed classical binary data input. For convenience, the process 2100 will be described as being performed by a system that includes a rBFX chip. For example, a system that includes the rBFX chipset of FIG. 18, appropriately programmed, can perform example process 2100. Example process 2100 can be combined with any of the techniques described in this disclosure, e.g., the techniques described above with reference to FIGS. 1A-20.

The system obtains a compressed classical binary data input (step 2102). For example, the system can receive a classical binary data input that was compressed by an BFX chip.

The system generates candidate metadata for the compressed classical binary data input (step 2104). The metadata includes values of statistical operators for respective portions of the compressed binary data input, where the statistical operators are based on the ensemble interpretation of quantum mechanics. Example metadata is described throughout this disclosure, e.g., with reference to example process 1700 of FIG. 17.

The system applies, based on the values of the statistical operators, kernel filters to the candidate metadata to identify valid metadata for the classical compressed binary data input (step 2106). Applying the kernel filters to the candidate metadata includes identifying metadata that corresponds to portions of the compressed binary data input that i) do not include a unique data pattern, ii) satisfy a condition of virtual quantum entanglement, and iii) have a largest bit length. For example, the system can process the candidate metadata using KF1P1, KF1P2 and KF2 as described above with reference to FIG. 18.

The system applies swap gates to the valid metadata to decompress the valid metadata (step 2108). The swap gates swap data as a one-way function and application of the swap gates is defined by values of the statistical operators for the valid metadata. To apply the swap gates, the system can first identify the occurrence of a PCB event, e.g., occurrence of a second most unique data pattern, in a current portion of the compressed binary data input and then identify the occurrence of an FCB event, e.g., occurrence of a most unique data pattern, in a current portion of the compressed binary data input. The system can then swap occurrences L_STRUC (a data pattern representing a virtual quantum entanglement value) that occur before the PCB event with a bit string that is longer than L_STRUC, where the bit string that is longer than L_STRUC is equal to RHV (a data pattern with a highest number of repetitions). The system can also swap occurrences of RHV that occur before the PCB event with a bit string that is longer than RHV, where the bit string that is longer than RHV is referred to herein as L_ENT and is equal to a concatenation of L_STRUC and the opposite value of L_ENT. The one way swap gates implemented by the rBFX chip are described in more detail above with reference to FIGS. 18 and 19.

The system provides the decompressed valid metadata as the decompressed compressed classical binary data input (step 2110). As described above, the decompression process performed by the rBFX chip reuses techniques, definitions and logical routines of the AAR chip and the BFX chip. Therefore, as described herein with reference to the AAR chip and BFX chip, by construction, the decompressed classical data generated by the rBFX chip has a same entropy as the classical compressed data received at step 2102. Because of this, the AAR chip, BFX chip, and rBFX chip can achieve logical reverse computing.

In some implementations the system can directly output the decompressed compressed classical binary data input. In other implementations the system can iteratively process the decompressed compressed classical binary data input until a target data decompression ratio is achieved.

FIG. 22 shows compression ratios achieved using the techniques described in this disclosure for an example bit stream with varying values of the variable SIZE. Example #1 and example #2 show compression results for a same first input string. The first input string has a large median statistical distribution of Data Patterns (DP). Example #3 and example #4 show compression results for a same second input string. The second input string has a low median statistical distribution of Data Patterns (DP).

In example #1, the input stream is loaded as a two bit partitioned stream in IAE[1]. IAE[2] generates a count of the Data Patterns (DP) and stores the data pattern counts. In the third row of the table for example #1, the distribution of the variable $R_h$ has a value of 8/19, where 8 is the number of re-peats of the highest occurrence and 19 is the total count of binary packets. The distribution of $R_h$ is at 42.10% of IAE[1] and results a removal of 8 bits from a total 392 bits. Therefore, application of the presently described compression techniques results in a compression of 21.05%. It is noted that the distribution of $R_h$ is 42.10% (the data pattern of 01), which is calculated by dividing 8 by 19. Since one bit can be removed from the eight R h packets, this would result in 8 bits of compression. Therefore, in this example stream it is possible to remove 8 bits from a total of 38 bits which results in 21.05% in this one round.

In example #2, the input stream is loaded as a four bit partitioned stream in IAE[1]. IAE[2] generates a count of the Data Patterns (DP) and stores the data pattern counts. In the third row of the table for example #1, the distribution of the variable $R_h$ has a value of 16-100, where 16 is the number of re-peats of the highest occurrence and 100 is the total count of binary packets. The distribution of $R_h$ is at 16% of IAE[1] and results a removal of 16 bits from a total 400 bits. Therefore, application of the presently described compression techniques results in a compression of 4.00%.

In example #3, the input stream is loaded as a two bit partitioned stream in IAE[1]. IAE[2] generates a count of the Data Patterns (DP) and stores the data pattern counts. In the third row of the table for example #1, the distribution of the variable $R_h$ has a value of 3/7, where 3 is the number of re-peats of the highest occurrence and 7 is the total count of binary packets. The distribution of $R_h$ is at 42.85% of IAE[1] and results a removal of 3 bits from a total 14 bits. Therefore, application of the presently described compression techniques results in a compression of 21.42%.

In example #4, the input stream is loaded as a four bit partitioned stream in IAE[1]. IAE[2] generates a count of the Data Patterns (DP) and stores the data pattern counts. In the third row of the table for example #1, the distribution of the variable $R_h$ has a value of 4/37, where 4 is the number of re-peats of the highest occurrence and 37 is the total count of binary packets. The distribution of $R_h$ is at 10.81% of IAE[1] and results a removal of 4 bits from a total 148 bits. Therefore, application of the presently described compression techniques results in a compression of 2.70%.

Examples #3 and #4 show that the distribution of Data Patterns (DP) does not deviate from the median value of 2 by +2—in example 3 the $R_h$ distribution is at 42.85% and yields a compression of 2.14% and in example 4 the $R_h$ distribution is at 10.81% and yields a compression of 2.70%.

FIG. 23 shows statistics per round for multiple compression processes. Analysis table #1 is conservative and assumes a $R_h$ distribution from 2 to 10% to show a minimum of 1% compression. Analysis table #2 shows average values with $R_h$ distribution between 10 to 20% and from 5 to 2%. The analysis tables show conservative results, real world applications of the presently described techniques result in an average of 2% compression per round.

Embodiments of the subject matter and the functional operations described in this disclosure can be implemented in digital electronic circuitry, in tangibly-embodied computer software or firmware, in computer hardware, including the structures disclosed in this disclosure and their structural equivalents, or in combinations of one or more of them. Embodiments of the subject matter described in this disclosure can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). That is, some or all of the actions of each of the AAR chip, BFX chip, and rBFX chip described herein can be performed by a general purpose processor or a special purpose processor.

The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this disclosure can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Figure 24:
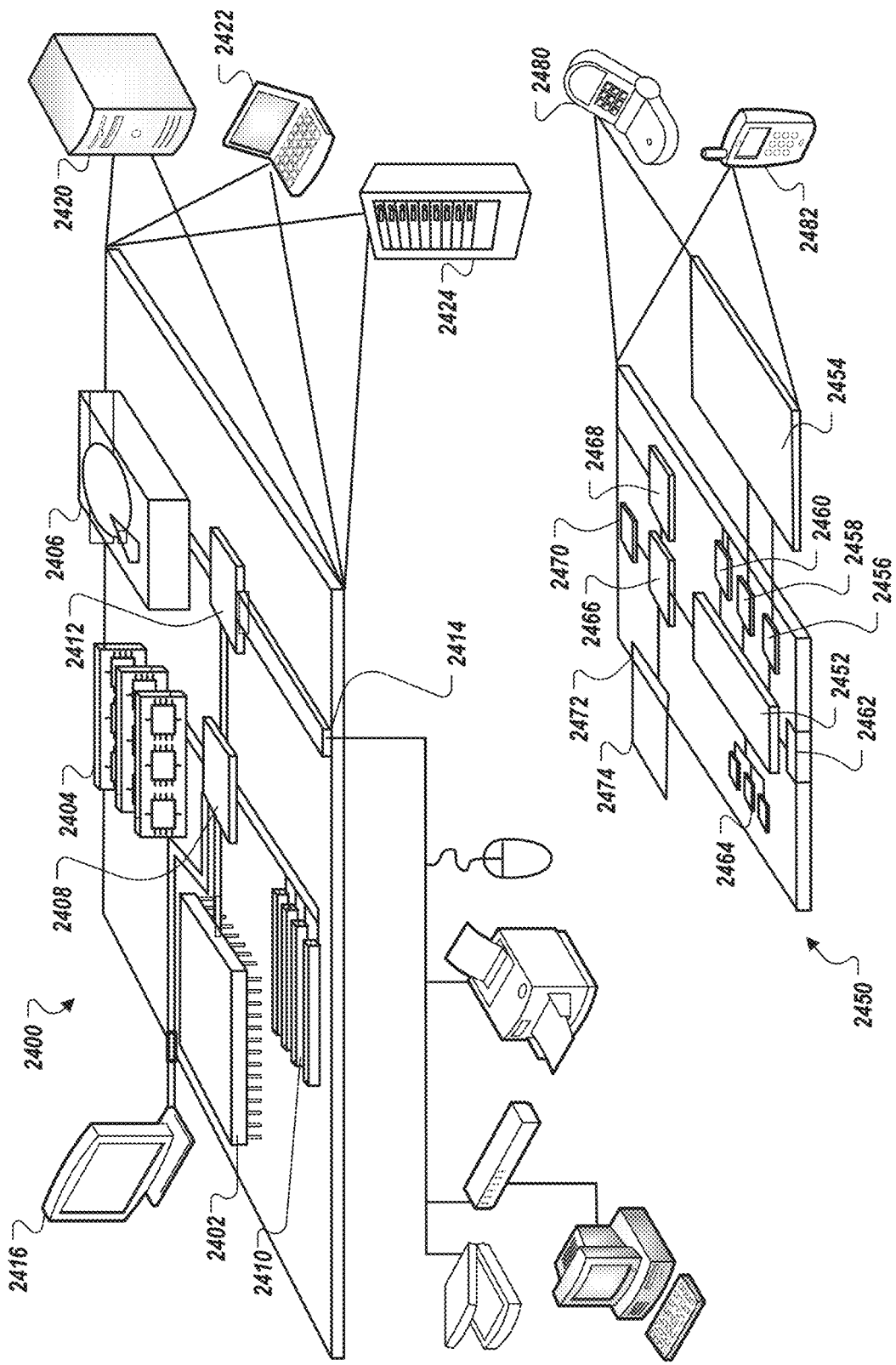
FIG. 24 is a block diagram of computing devices that may be used to implement the systems and methods described in this document.

FIG. 24 is a block diagram of computing devices 2400, 2450 that may be used to implement the systems and methods described in this document, as either a client or as a server or plurality of servers. Computing device 2400 is intended to represent various forms of digital computers or processors, such as laptops, desktops, workstations, personal digital assistants, servers, blade servers, mainframes, and other appropriate computers. Computing device 2450 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 2400 includes a processor 2402, memory 2404, a storage device 2406, a high-speed interface 2408 connecting to memory 2404 and high-speed expansion ports 2410, and a low speed interface 2412 connecting to low speed bus 2414 and storage device 2406. Each of the components 2402, 2404, 2406, 2408, 2410, and 2412, are interconnected using various busses, and may be mounted on a common motherboard or in other manners as appropriate. The processor 2402 can process instructions for execution within the computing device 2400, including instructions stored in the memory 2404 or on the storage device 2406 to display graphical information for a GUI on an external input/output device, such as display 2416 coupled to high speed interface 2408. In other implementations, multiple processors and/or multiple buses may be used, as appropriate, along with multiple memories and types of memory. Also, multiple computing devices 2400 may be connected, with each device providing portions of the necessary operations (e.g., as a server bank, a group of blade servers, or a multi-processor system).

The memory 2404 stores information within the computing device 2400. In one implementation, the memory 2404 is a computer-readable medium. In one implementation, the memory 2404 is a volatile memory unit or units. In another implementation, the memory 2404 is a non-volatile memory unit or units.

The storage device 2406 is capable of providing mass storage for the computing device 2400. In one implementation, the storage device 2406 is a computer-readable medium. In various different implementations, the storage device 2406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 2404, the storage device 2406, or memory on processor 2402.

The high speed controller 2408 manages bandwidth-intensive operations for the computing device 2400, while the low speed controller 2412 manages lower bandwidth-intensive operations. Such allocation of duties is exemplary only. In one implementation, the high-speed controller 2408 is coupled to memory 2404, display 2416 (e.g., through a graphics processor or accelerator), and to high-speed expansion ports 2410, which may accept various expansion cards (not shown). In the implementation, low-speed controller 2412 is coupled to storage device 2406 and low-speed expansion port 2414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 2400 may be implemented in a number of different forms, as shown in the figure. For example, it may be implemented as a standard server 2420, or multiple times in a group of such servers. It may also be implemented as part of a rack server system 2424. In addition, it may be implemented in a personal computer such as a laptop computer 2422. Alternatively, components from computing device 2400 may be combined with other components in a mobile device (not shown), such as device 2450. Each of such devices may contain one or more of computing device 2400, 2450, and an entire system may be made up of multiple computing devices 2400, 2450 communicating with each other.

Computing device 2450 includes a processor 2452, memory 2464, an input/output device such as a display 2454, a communication interface 2466, and a transceiver 2468, among other components. The device 2450 may also be provided with a storage device, such as a microdrive or other device, to provide additional storage. Each of the components 2450, 2452, 2464, 2454, 2466, and 2468, are interconnected using various buses, and several of the components may be mounted on a common motherboard or in other manners as appropriate.

The processor 2452 can process instructions for execution within the computing device 2450, including instructions stored in the memory 2464. The processor may also include separate analog and digital processors. The processor may provide, for example, for coordination of the other components of the device 2450, such as control of user interfaces, applications run by device 2450, and wireless communication by device 2450.

Processor 2452 may communicate with a user through control interface 2458 and display interface 2456 coupled to a display 2454. The display 2454 may be, for example, a TFT LCD display or an OLED display, or other appropriate display technology. The display interface 2456 may comprise appropriate circuitry for driving the display 2454 to present graphical and other information to a user. The control interface 2458 may receive commands from a user and convert them for submission to the processor 2452. In addition, an external interface 2462 may be provide in communication with processor 2452, so as to enable near area communication of device 2450 with other devices. External interface 2462 may provide, for example, for wired communication (e.g., via a docking procedure) or for wireless communication (e.g., via Bluetooth or other such technologies).

The memory 2464 stores information within the computing device 2450. In one implementation, the memory 2464 is a computer-readable medium. In one implementation, the memory 2464 is a volatile memory unit or units. In another implementation, the memory 2464 is a non-volatile memory unit or units. Expansion memory 2474 may also be provided and connected to device 2450 through expansion interface 2472, which may include, for example, a SIMM card interface. Such expansion memory 2474 may provide extra storage space for device 2450, or may also store applications or other information for device 2450. Specifically, expansion memory 2474 may include instructions to carry out or supplement the processes described above, and may include secure information also. Thus, for example, expansion memory 2474 may be provide as a security module for device 2450, and may be programmed with instructions that permit secure use of device 2450. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 2464, expansion memory 2474, or memory on processor 2452.

Device 2450 may communicate wirelessly through communication interface 2466, which may include digital signal processing circuitry where necessary. Communication interface 2466 may provide for communications under various modes or protocols, such as GSM voice calls, SMS, EMS, or MMS messaging, CDMA, TDMA, PDC, WCDMA, CDMA4000, or GPRS, among others. Such communication may occur, for example, through radio-frequency transceiver 2468. In addition, short-range communication may occur, such as using a Bluetooth, WiFi, or other such transceiver (not shown). In addition, GPS receiver module 2470 may provide additional wireless data to device 2450, which may be used as appropriate by applications running on device 2450.

Device 2450 may also communicate audibly using audio codec 2460, which may receive spoken information from a user and convert it to usable digital information. Audio codec 2460 may likewise generate audible sound for a user, such as through a speaker, e.g., in a handset of device 2450. Such sound may include sound from voice telephone calls, may include recorded sound (e.g., voice messages, music files, etc.) and may also include sound generated by applications operating on device 2450.

The computing device 2450 may be implemented in a number of different forms, as shown in the figure. For example, it may be implemented as a cellular telephone. It may also be implemented as part of a smartphone 2482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

While this disclosure contains many specific implementation details, these should not be construed as limitations on the scope of what may be claimed, but rather as descriptions of features that may be specific to particular embodiments. Certain features that are described in this disclosure in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for compressing a classical binary data input, the method comprising:
   obtaining a classical binary data input;
   performing classical operations on the classical binary data input to obtain metadata for the classical binary data input, the metadata comprising statistical operators, wherein the classical operations are based on the ensemble interpretation of quantum mechanics;
   applying swap gates to the metadata to compress the metadata, wherein the swap gates swap data as a one-way function and application of the swap gates is defined by values of the statistical operators; and
   providing the compressed metadata as a compressed classical binary data input.

2. The method of claim 1, wherein the compressed classical binary data input has a same entropy as the classical binary data input.

3. The method of claim 1, wherein the metadata comprises, for each of one or more predetermined sizes, the classical binary data input partitioned into multiple data packets with lengths equal to the predetermined size, wherein the one or more predetermined sizes correspond to respective virtual Hilbert spaces.

4. The method of claim 1, wherein the metadata comprises values representing data patterns occurring in the classical binary data input.

5. The method of claim 1, wherein the metadata comprises correlation values that represent virtual quantum entanglement measures of the classical binary data input.

6. The method of claim 1, wherein the metadata comprises values representing counts of occurrences of data patterns in the classical binary data input.

7. The method of claim 6, wherein the counts of occurrences of data patterns in the classical binary data input comprise counts representing unique data patterns in a proper or improper subset of the classical binary data input.

8. The method of claim 6, wherein the values of the statistical operators comprise statistical probabilities generated from the counts of occurrences of data patterns in the classical binary data input.

9. The method of claim 6, wherein applying swap gates to the metadata to compress the metadata comprises swapping occurrences of a data pattern with a highest count with a bit string that is shorter than the data pattern with the highest count, the bit string comprising a concatenation of i) a virtual quantum entanglement measure of the data pattern with the lowest count and ii) the remaining bits of the data pattern with the lowest count, excluding the last bit of the data pattern with the lowest count.

10. The method of claim 1, wherein the metadata comprises a classical quantum multi-element (CQME) system, wherein the CQME system comprises the classical binary data input partitioned into data packets, wherein each data packet comprises a correlation value that represents a virtual quantum entanglement measure and a data pattern defining a type of the data packet.

11. The method of claim 10, wherein the values of the statistical operators comprise probabilities defining statistical properties of the CQME.

12. The method of claim 1, wherein the metadata comprises an optimal arithmetic compound that characterizes the classical binary data input and stores the values of the statistical operators, wherein the optimal arithmetic compound is selected from multiple candidate arithmetic compounds, each of the multiple candidate arithmetic compounds corresponding to virtual quantum states in a respective virtual Hilbert space.

13. The method of claim 12, wherein the optimal arithmetic compound i) has a same length as the classical binary data input, ii) has a same entropy as the classical binary data input, and iii) comprises at least one singularity.

14. The method of claim 12, wherein the multiple candidate arithmetic compounds form a superposition plane of the virtual quantum states.

15. The method of claim 12, wherein the optimal arithmetic compound is selected from the multiple candidate arithmetic compounds through a virtual time measurement of the virtual quantum states.

16. The method of claim 1, further comprising:
outputting the compressed classical binary data input; or
iteratively processing the compressed classical binary data input until a target data compression ratio is achieved, the iterative processing comprising, for each iteration:
performing the classical operations on a classical binary data input for the iteration to generate metadata for the iteration;
applying swap gates to the metadata for the iteration to compress the metadata for the iteration;
providing the compressed metadata for the iteration as input for a subsequent iteration.

17. A system comprising one or more computers and one or more storage devices storing instructions that are operable, when executed by the one or more computers, to cause the one or more computers to perform operations according to the method of claim 1.

18. A computer-readable storage medium comprising instructions stored thereon that are executable by a processing device and upon such execution cause the processing device to perform operations according to the method of claim 1.

19. A computer-implemented method comprising:
obtaining a classical binary data input;
performing classical operations on the classical binary data input to obtain metadata for the classical binary data input, the metadata comprising statistical operators that generate outputs with characteristics of the classical binary data input, wherein the classical operations are based on the ensemble interpretation of quantum mechanics; and
providing the metadata for use in subsequent computations.

20. A system comprising one or more computers and one or more storage devices storing instructions that are operable, when executed by the one or more computers, to cause the one or more computers to perform operations according to the method of claim 19.

21. A computer-implemented method for decompressing a classical compressed binary data input, the method comprising:

obtaining a compressed classical binary data input;
generating candidate metadata for the compressed classical binary data input, the metadata comprising values of statistical operators for respective portions of the compressed binary data input, wherein the statistical operators are based on the ensemble interpretation of quantum mechanics;
applying, based on the values of the statistical operators, kernel filters to the candidate metadata to identify valid metadata for the classical compressed binary data input;
applying swap gates to the valid metadata to decompress the valid metadata, wherein the swap gates swap data as a one-way function and application of the swap gates is defined by values of the statistical operators for the valid metadata; and
providing the decompressed valid metadata as the decompressed compressed classical binary data input.

22. The method of claim 21, wherein the decompressed compressed classical binary data input has a same entropy as the classical compressed binary data input.

23. The method of claim 21, wherein providing the decompressed valid metadata as the decompressed compressed classical binary data input comprises performing logical reverse computing.

24. The method of claim 21, wherein applying the kernel filters to the candidate metadata comprises identifying metadata that corresponds to portions of the compressed binary data input that i) do not include a unique data pattern, ii) satisfy a condition of virtual quantum entanglement, and iii) have a largest bit length.

25. The method of claim 21, wherein applying swap gates to the valid metadata to decompress the valid metadata comprises:
identifying a second most unique data pattern in a portion of the compressed binary data input;
identifying a most unique data pattern in the portion of the compressed binary data input;
swapping occurrences of a data pattern representing a virtual quantum entanglement value that occur before the second most unique data pattern with a bit string that is longer than the virtual quantum entanglement value, wherein the bit string that is longer than the virtual quantum entanglement value corresponds to a data pattern with a highest number of repetitions; and
swapping occurrences of a data pattern representing the data pattern with a highest number of repetitions that occur before the second most unique data pattern and the most unique data pattern with a bit string that is longer than the data pattern with a highest number of repetitions, wherein the bit string that is longer than the data pattern with a highest number of repetitions corresponds to a concatenation of the virtual quantum entanglement value and an opposite of a pattern structure value.

26. The method of claim 21, wherein the metadata comprises, for each of one or more predetermined sizes, the classical binary data input partitioned into multiple data packets with lengths equal to the predetermined size, wherein the one or more predetermined sizes correspond to respective virtual Hilbert spaces.

27. The method of claim 21, wherein the metadata comprises values representing data patterns occurring in the classical binary data input.

28. The method of claim 21, wherein the metadata comprises correlation values that represent virtual quantum entanglement measures of the classical binary data input.

29. The method of claim 21, wherein the metadata comprises values representing counts of occurrences of data patterns in the classical binary data input.

30. The method of claim 29, wherein the counts of occurrences of data patterns in the classical binary data input comprise counts representing unique data patterns in a proper or improper subset of the classical binary data input.

31. The method of claim 29, wherein the values of the statistical operators comprise statistical probabilities and identifiers generated from the counts of occurrences of data patterns in the classical binary data input.

32. The method of claim 21, wherein the metadata comprises a classical quantum multi-element (CQME) system, wherein the CQME system comprises the classical binary data input partitioned into data packets, wherein each data packet comprises a correlation value that represents a virtual quantum entanglement measure and a data pattern defining a type of the data packet.

33. The method of claim 32, wherein the values of the statistical operators comprise probabilities defining statistical properties of the CQME.

34. The method of claim 21, wherein the metadata comprises an optimal arithmetic compound that characterizes the classical binary data input and stores the values of the statistical operators, wherein the optimal arithmetic compound is selected from multiple candidate arithmetic compounds, each of the multiple candidate arithmetic compounds corresponding to virtual quantum states in a respective virtual Hilbert space.

35. The method of claim 34, wherein the optimal arithmetic compound i) has a same length as the classical binary data input, ii) has a same entropy as the classical binary data input, and iii) comprises at least one singularity.

36. The method of claim 34, wherein the multiple candidate arithmetic compounds form a superposition plane of the virtual quantum states.

37. The method of claim 34, wherein the optimal arithmetic compound is selected from the multiple candidate arithmetic compounds through a virtual time measurement of the virtual quantum states.

38. The method of claim 21, further comprising:
outputting the decompressed classical compressed binary data input; or
iteratively processing the compressed classical binary data input until a target data decompression ratio is achieved, the iterative processing comprising, for each iteration:
generating candidate metadata for the classical compressed binary data input for the iteration;
applying kernel filters to the candidate metadata for the iteration to identify valid metadata for the iteration;
applying swap gates to the valid metadata to decompress the valid metadata for the iteration; and
providing the decompressed valid metadata for the iteration as input for a subsequent iteration.

39. A system comprising one or more computers and one or more storage devices storing instructions that are operable, when executed by the one or more computers, to cause the one or more computers to perform operations according to the method of claim 21.

40. A computer-readable storage medium comprising instructions stored thereon that are executable by a processing device and upon such execution cause the processing device to perform operations according to the method of claim 21.

41. A computer-implemented method for compressing a classical binary data input, the method comprising:

receiving metadata for the classical binary data input, the metadata comprising statistical operators, wherein the classical operations are based on the ensemble interpretation of quantum mechanics;
applying swap gates to the metadata to compress the metadata, wherein the swap gates swap data as a one-way function and application of the swap gates is defined by values of the statistical operators; and
providing the compressed metadata as a compressed classical binary data input.

42. A system comprising one or more computers and one or more storage devices storing instructions that are operable, when executed by the one or more computers, to cause the one or more computers to perform operations according to the method of claim 41.

43. A computer-readable storage medium comprising instructions stored thereon that are executable by a processing device and upon such execution cause the processing device to perform operations according to the method of claim 41.

44. A system comprising:
a first chipset, wherein the first chipset comprises a first data port to receive input data and comprises a second data port to provide a final arithmetic compound, and
wherein the first chipset is configured to perform operations comprising converting the input data into the final arithmetic compound, the final arithmetic compound comprising a first intermediate arithmetic element (IAE) dataset, a second IAE dataset, and a third IAE dataset, wherein the final arithmetic compound is a virtual quantum representation of the input data,
wherein the first IAE dataset comprises a first component value defining a virtual quantum entanglement of the input data and comprises a second component value defining a data pattern structure of the input data,
wherein the second IAE dataset comprises statistical operators that define data pattern counts associated with the data pattern of the input data first IAE dataset, and
wherein the third IAE dataset comprises an ancilla dataset defining statistical probabilities associated with the input data.

45. The system of claim 44, further comprising a second chipset, wherein the second chipset is arranged to receive, as an input to the second chipset, the final arithmetic compound, and wherein the second chipset is configured to compress at least a portion of the final arithmetic compound into a compressed dataset.

46. The system of claim 45, further comprising a third chipset, wherein the third chipset is arranged to receive, as an input to the third chipset, the compressed dataset, and wherein the third chipset is configured to decompress the compressed dataset into the input data.

47. The system of claim 45, wherein the first chipset and the second chipset are integrated on a single board.

48. The system of claim 44, wherein converting the input data into the final arithmetic compound comprises generating a plurality of candidate Hilbert space (HS) datasets from the input data.

49. The system of claim 48, wherein the first chipset is configured to instantiate a configuration table, wherein the first chipset further comprises:
a first memory;
a parallel address data bus; and
a plurality of HS storage modules, wherein generating the plurality of candidate HS datasets comprises:
obtaining, by the parallel address bus, the input data from the first memory;

obtaining a plurality of size parameters from the configuration table;

transmitting, in parallel, a plurality of copies of the input data, from the parallel address bus, to the plurality of HS storage modules, respectively, wherein each copy of the plurality of copies of the input data is transmitted in a different bit transmission size according to a respective size parameter from the plurality of size parameters.

50. The system of claim 48, comprising a second memory, wherein generating the plurality of candidate HS datasets comprises:

generating a plurality of intermediate arithmetic compounds, the plurality of intermediate arithmetic compounds being associated with different sizes, wherein each intermediate arithmetic compound comprises
a corresponding data pattern array across which the input data is distributed based on the size associated with the intermediate arithmetic compound,
a corresponding statistical operator matrix, and
a corresponding ancilla matrix comprising statistical probabilities for the corresponding data pattern array; and storing the plurality of intermediate arithmetic compounds as the plurality of candidate HS datasets in the second memory.

51. The system of claim 50, wherein, for each intermediate arithmetic compound, the input data is divided into one or more data patterns, wherein each data pattern of the one or more data patterns has the size associated with the intermediate arithmetic compound, and the one or more data patterns are stored across one or more elements of the corresponding data pattern array, respectively, wherein, for each intermediate arithmetic compound, the corresponding statistical operator matrix comprises, for each different data pattern in the corresponding data pattern array, a count of the data pattern and an index value corresponding to the data pattern.

52. The system of claim 51, wherein, for each data pattern of the one or more data patterns, a first bit of the data pattern is a virtual quantum entanglement and remaining one or more bits of the data pattern are a pattern structure.

53. The system of claim 52, wherein, for each intermediate arithmetic compound, the statistical probabilities of the corresponding ancilla matrix comprise a highest occurring data pattern in the corresponding data pattern array and a lowest occurring data pattern in the data pattern array.

54. The system of claim 50, wherein generating the plurality of intermediate arithmetic compounds comprises, for each copy of the input data of the plurality of copies of the input data that is transmitted from the parallel address bus to the plurality of HS storage modules:

detecting a pre-circuit breaker event;
detecting a final circuit breaker event; and
finalizing completion of an intermediate arithmetic compound corresponding to the copy of input data upon detecting the final circuit breaker event.

55. The system of claim 50, wherein converting the input data into the final arithmetic compound comprises:

combining the plurality of intermediate arithmetic compounds into a plurality of potential final arithmetic compounds; and
filtering the plurality of potential final arithmetic compounds to select the final arithmetic compound.

56. The system of claim 55, wherein filtering the potential final arithmetic compounds to select the final arithmetic compound comprises applying fuzzy logic rules to the plurality of potential final arithmetic compounds.

57. The system of claim 56, further comprising a second chipset, wherein the second chipset is arranged to receive, as an input to the second chipset, the final arithmetic compound, and wherein the second chipset is configured to compress at least a portion of the final arithmetic compound into a compressed dataset.

58. The system of claim 57, wherein the second chipset is configured to compress at least the portion of the final arithmetic compound into the compressed dataset based on the statistical probabilities associated with the first IAE dataset.

59. The system of claim 58, wherein the second chipset comprises a plurality of swap gates configured to compress the final arithmetic compound into the compressed dataset.

60. The system of claim 59, wherein the second chipset comprises a first error correction module configured to enable processing of data by the plurality of swap gates and disable processing of data by the plurality of swap gates.

61. The system of claim 60, wherein the first error correction module is configured to:

identify a least frequently occurring data pattern in the final arithmetic compound; and
disable processing of data when the least frequently occurring data pattern in the final arithmetic compound is identified.

62. The system of claim 61, wherein the second chipset comprises a second error correction module, wherein the second correction module is configured to:

determine when data is on an output port of the second chip set; and
allow the plurality of swap gates to read new data when it is determined that data is on the output port of the second chip set.

63. The system of claim 59, wherein the plurality of swap gates comprises a plurality of sub-modules, wherein the plurality of sub-modules comprises a first swap module configured to:

identify when a least frequently occurring data pattern of the final arithmetic compound is present; and
writes the least frequently occurring data pattern to the final arithmetic compound.

64. The system of claim 63, wherein the plurality of sub-modules comprises a second swap module configured to:

identify when a highest frequently occurring data pattern of the final arithmetic compound is present; and
perform a first swap operation on the final arithmetic compound to obtain at least one first swapped parameter, wherein performing the first swap operation comprises replacing a last bit of the least frequently occurring data pattern.

65. The system of claim 64, wherein the plurality of swap gates are configured to perform a second swap operation on the least frequently occurring data pattern in the final arithmetic compound to obtain at least one second swapped parameter, and wherein the plurality of sub-modules comprises a third swap module configured to:

identify when the least frequently occurring data pattern of the final arithmetic compound is present; and
store the at least one second swapped parameter in memory.

66. The system of claim 65, wherein the plurality of sub-modules comprises a fourth swap module configured to pass an else-case data pattern from the final arithmetic compound to the output port of the second chipset, wherein the else-case data pattern comprises a data pattern that has not been identified by the first sub-module, the second sub-module, and the third sub-module.

67. The system of claim 57, wherein the second chipset is configured to pass the compressed dataset back to the first chip set.

68. The system of claim 57, further comprising a third chipset, wherein the third chipset is configured to decompress the compressed dataset to obtain a decompressed dataset.

69. The system of claim 68, wherein the third chipset comprises a plurality of reverse one way swap gates configured to decompress the compressed dataset.

70. The system of claim 68, wherein the third chipset is configured to decompress the compressed dataset by performing operations comprising:
    receiving the compressed dataset as an input data stream;
    generating candidate metadata for the compressed dataset; and
    applying a plurality of kernel filters to the candidate metadata to identify valid metadata.

71. The system of claim 70, wherein applying the plurality of kernel filters to the candidate metadata comprises
    identifying portions of the compressed dataset that do not include a unique data pattern, that satisfy a virtual quantum entanglement condition, and that have a specified bit length.

72. The system of claim 70, wherein the operations of the third chipset further comprise:
    applying a plurality of reverse one way swap gates to the valid metadata to obtain the decompressed dataset.

73. The system of claim 72, wherein applying the plurality of reverse one way swap gates comprises:
    identifying an occurrence of a second most unique data pattern occurring in the compressed dataset as a first data event;
    swapping each occurrence of a data pattern corresponding to a virtual quantum entanglement value in the compressed dataset before the first data event with a first predefined bit string; and
    swapping each occurrence of a data pattern associated with a highest number of occurrences in the compressed dataset before the first data event with a second predefined bit string.

74. A chip set configured to perform operations comprising converting a classical dataset to a classical quantum multi-element (CQME) dataset and an ancilla matrix that contains statistical properties of the CQME dataset.

75. The chip set of claim 74, wherein the operations comprise compressing the CQME dataset.

76. The chip set of claim 75, wherein compressing the CQME dataset comprises applying at least one one-way swap gate to the CQME dataset.

77. The chip set of claim 75, wherein the operations comprise decompressing a compressed CQME dataset.

* * * * *